US010366361B1

(12) United States Patent
Sammarco

(10) Patent No.: US 10,366,361 B1
(45) Date of Patent: Jul. 30, 2019

(54) SYSTEMS AND METHODS FOR PERFORMING MULTI-TIER DATA TRANSFER IN A GROUP ASSESSMENT PROCESSING ENVIRONMENT

(71) Applicant: Definitive Business Solutions, Inc., Reston, VA (US)

(72) Inventor: John R. Sammarco, Reston, VA (US)

(73) Assignee: DEFINITIVE BUSINESS SOLUTIONS, INC., Reston, VA (US)

( * ) Notice: Subject to any disclaimer, the term of this patent is extended or adjusted under 35 U.S.C. 154(b) by 6 days.

(21) Appl. No.: 15/976,644

(22) Filed: May 10, 2018

(51) Int. Cl.
G06Q 10/06 (2012.01)
G06F 9/451 (2018.01)
G06F 16/28 (2019.01)

(52) U.S. Cl.
CPC ......... G06Q 10/0639 (2013.01); G06F 9/451 (2018.02); G06F 16/288 (2019.01)

(58) Field of Classification Search
None
See application file for complete search history.

(56) References Cited

U.S. PATENT DOCUMENTS 5,774,121 A * 6/1998 Stiegler ............... G06F 3/04847
706/46
5,844,817 A 12/1998 Lobley et al.
6,023,702 A * 2/2000 Leisten .................. G06Q 10/06

(Continued)

FOREIGN PATENT DOCUMENTS

CN 102781072 A 11/2012
JP 2004038325 A 2/2004

(Continued)

OTHER PUBLICATIONS

Ho, Tania, and Pedro Antunes. "Developing a tool to assist electronic facilitation of decision-making groups." String Processing and Information Retrieval Symposium, 1999 and International Workshop on Groupware. IEEE, 1999 (Year: 1999).*

(Continued)

Primary Examiner — Thomas L Mansfield
Assistant Examiner — Derick J Holzmacher
(74) Attorney, Agent, or Firm — Kenealy Vaidya LLP

(57) ABSTRACT

An apparatus is provided to interface with users to perform group assessment processing and display of results in conjunction with selection of items. The apparatus may comprise a communication portion; a database; and a computer processor, the computer processor performing processing including: (A) storing first assessment architecture data associated with a first assessment architecture for group assessment processing; (B) storing second assessment architecture data associated with a second assessment architecture for group assessment processing; (C) interfacing with a user, to input linking data related to linking the first assessment architecture with the second assessment architecture; (D) based on the linking data, linking the first assessment architecture with the second assessment architecture; (E) identifying a data content change in the first assessment architecture or the second assessment architecture; (F) mapping the data content change to an action item; and (G) performing the action item in the other of the assessment architectures.

13 Claims, 56 Drawing Sheets

(56) References Cited

U.S. PATENT DOCUMENTS

| | | | |
|---|---|---|---|
| 6,151,565 A | 11/2000 | Lobley et al. | |
| 6,807,583 B2* | 10/2004 | Hrischuk | G06F 9/542 702/182 |
| 6,850,891 B1* | 2/2005 | Forman | G06Q 10/063 705/7.11 |
| 7,321,883 B1* | 1/2008 | Freedy | G06Q 10/00 706/45 |
| 7,542,952 B2 | 6/2009 | Yang et al. | |
| 7,593,910 B1* | 9/2009 | Owen | G06N 20/00 706/46 |
| 7,624,069 B2 | 11/2009 | Padgette | |
| 8,065,174 B2 | 11/2011 | Bonk et al. | |
| 8,160,988 B1 | 4/2012 | Owen et al. | |
| 8,239,338 B1 | 8/2012 | Adams et al. | |
| 8,315,971 B1 | 11/2012 | Adams et al. | |
| 8,341,103 B2 | 12/2012 | Adams et al. | |
| 8,346,681 B2 | 1/2013 | Lauritsen | |
| 8,423,500 B1 | 4/2013 | Adams et al. | |
| 8,429,115 B1 | 4/2013 | Adams et al. | |
| 8,447,820 B1* | 5/2013 | Gay | G06Q 10/10 709/206 |
| 8,554,713 B2 | 10/2013 | Adams et al. | |
| 8,595,169 B1 | 11/2013 | Adams et al. | |
| 8,660,982 B1 | 2/2014 | Adams et al. | |
| 8,725,664 B1 | 5/2014 | Adams et al. | |
| 8,731,455 B2* | 5/2014 | Colby | G09B 7/02 434/350 |
| 8,732,115 B1 | 5/2014 | Adams et al. | |
| 8,832,013 B1 | 9/2014 | Adams et al. | |
| 9,058,354 B2 | 6/2015 | Dolan et al. | |
| 9,135,574 B2* | 9/2015 | Matignon | G06N 5/02 |
| 9,299,032 B2 | 3/2016 | Amid et al. | |
| 9,324,027 B2 | 4/2016 | Mills et al. | |
| 2003/0069868 A1 | 4/2003 | Vos | |
| 2003/0069870 A1 | 4/2003 | Ras | |
| 2003/0233274 A1* | 12/2003 | Urken | G06Q 30/02 705/12 |
| 2004/0133457 A1* | 7/2004 | Sadiq | G06Q 10/06311 705/7.13 |
| 2005/0256818 A1* | 11/2005 | Sun | G06Q 10/06316 705/301 |
| 2006/0074980 A1* | 4/2006 | Sarkar | G06F 16/958 |
| 2006/0184482 A1* | 8/2006 | Flinn | G06N 7/005 706/45 |
| 2006/0224530 A1 | 10/2006 | Riggs et al. | |
| 2007/0288250 A1* | 12/2007 | Lemcke | G06Q 10/101 705/300 |
| 2008/0103880 A1 | 5/2008 | Saaty | |
| 2008/0256054 A1 | 10/2008 | Saaty | |
| 2010/0145715 A1* | 6/2010 | Cohen | G06Q 30/02 705/1.1 |
| 2010/0306157 A1 | 12/2010 | Onuchin et al. | |
| 2013/0198207 A1* | 8/2013 | Dolan | G06Q 50/22 707/749 |
| 2013/0204674 A1 | 8/2013 | Arun | |
| 2013/0282626 A1* | 10/2013 | White | G06Q 30/0201 706/11 |
| 2015/0160811 A1* | 6/2015 | Shah | G06F 17/24 715/855 |
| 2015/0213388 A1* | 7/2015 | Munakata | G06Q 10/06316 705/7.26 |
| 2017/0181685 A1 | 6/2017 | Lee et al. | |

FOREIGN PATENT DOCUMENTS

| | | | | |
|---|---|---|---|---|
| JP | 5370840 B2 | 12/2013 | | |
| WO | WO-0108070 A1 * | 2/2001 | | G06Q 10/06 |
| WO | 0120530 A1 | 3/2001 | | |
| WO | WO-2009065211 A1 * | 5/2009 | | G06Q 10/00 |
| WO | WO-2010024929 A1 * | 3/2010 | | G06N 5/042 |
| WO | WO-2012058718 A1 * | 5/2012 | | G06Q 30/0201 |

OTHER PUBLICATIONS

Lopez, Ana V., et al."Embedding facilitation in group support systems to manage distributed group behavior." System Sciences, 2002. HICSS. Proceedings of the 35th Annual Hawaii International Conference on. IEEE, 2002. (Year: 2002).*

Ngwenyama, Ojelanki K., Noel Bryson, and Ayodele Mobolurin. "Supporting facilitation in group support systems: techniques for analyzing consensus relevant data." Decision Support Systems 16.2 (1996): 155-168. (Year: 1996).*

Condon, Edward, Bruce Golden, and Edward Wasil. "Visualizing group decisions in the analytic hierarchy process." Computers & Operations Research 30.10 (2003):1435-1445. (Year: 2003).*

Bryson, Noel. "Group decision-making and the analytic hierarchy process: Exploring the consensus-relevant information content." Computers & Operations Research 23.1 (1996): 27-35. (Year: 1996).*

Lai, Vincent S., Bo K. Wong, and Waiman Cheung. "Group decision making in a multiple criteria environment: A case using the AHP in software selection." European Journal of Operational Research 137. 1 (2002): 134-144. (Year: 2002).*

Ngwenyama, Ojelanki K., and Noel Bryson. "Eliciting and mapping qualitative preferences to numeric rankings in group decision making." European Journal of Operational Research 116.3 (1999): 487-497. (Year: 1999).*

Song, et al., "A Method of Assigning Weights Using a Ranking and Nonhierarchy Comparison", Advances in Decision Sciences, vol. 2016 (2016), Article ID 8963214, 9 pages, Received Sep. 4, 2015; Accepted Apr. 6, 2016.

Multimedia—Video, "Free Analytic Hierarchy Process (AHP) Software", "https://www.youtube.com/watch?v=0PAbhdOf4xE", YouTube, Published on Feb. 17, 2017.

Oyatoye, et al., "A Prototype AHP System for Contractor Selection Decision", in Applications and Theory of Analytic Hierarchy Process—Decision Making for Strategic Decisions, 15 pages, Published by InTech, 2016.

"ABC AHP Decision Tool Manual", Project No. TPF-5(221), 19 pages, Published in Mar. 2012.

Salomon, et al., "Analytic Hierarchy Process Applied to Supply Chain Management", in Applications and Theory of Analytic Hierarchy Process—Decision Making for Strategic Decisions, 10 pages, Published on Aug. 31, 2016.

Goepel, "BPMSG's AHP Online System—Rational Decision Making Made Easy", Business Performance Management Singapore, Reg. No. 53357427K, 20 pages, Latest Update on May 25, 2017.

Azevedo, "Developing a Performance Measurement System for a Public Organization", "https://www2.gwu.edu/~ibi/minerva/Spring1999/Luiz.Carlos.Azevedo/Luiz.Carlos.Azevedo.html", Minerva Program, Spring 1999, 7 pages, Accessed on Sep. 19, 2017.

"EasyAHP—Simple tool for making decisions using AHP methodology", "http://www.easyahp.com#features", EasyAHP, 4 pages, Accessed on Sep. 19, 2017.

"Features—Collaborative Decision Making Software—MakeItRational", "http://makeitrational.com/features", MakeItRational, 12 pages, Accessed on Sep. 19, 2017.

"MyDecision—Smart Comparisons—Android Apps on Google Play", "https://play.google.com/store/apps/details?id=com.acquasys.mydecision", Google Play Store, 3 pages, Accessed on Sep. 19, 2017.

"Priority Estimation Tool (AHP) download | SourceForge.net", "https://sourceforge.net/projects/priority/", SourceForge.net, 3 pages, Accessed on Sep. 19, 2017.

"Results and making your decision—Tutorial on TransparentChoice AHP Collaborative Decision Making Software", "https://www.slideshare.net/TransparentChoice/results-and-making-your-decision-tutorial-on-transparentchoice-ahp-decision-making-software", TransparentChoice, 20 pages, Published on May 14, 2015.

"Risk Leveling in Program Environment: A Structured Approach for Program Risk Management", 6 pages.

* cited by examiner

GUI 1400 for Pairwise Comparison Processing Results

3300 Participant User GUI display

After clicking the dynamic team formation URL, http://go.dpro1.com/ the participant lands on this page, requesting a session code that is provided to give access to a specific decision model.

Fig. 55

| Calculating a Group Rating for Criteria and Measures ||
|---|---|
| Mean Score | Group Rating |
| > 2.75 | High |
| > 2.25 and <= 2.75 | Medium-High |
| > 1.75 and <= 2.25 | Medium |
| > 1.25 and <= 1.75 | Medium-Low |
| > .75 and <= 1.25 | Low |
| > .25 and <= .75 | Very Low |
| <= .25 | Negligible |

Display 5500

Fig. 56

Acronym List 5600

| Acronym | Description |
|---|---|
| AHP | analytic hierarchy process |
| ASIC | application specific integrated circuit |
| ASR | alternative scoring rating |
| ASRD | alternative scoring rating definition |
| CA | criteria-alternative (i.e. considered alternatives) |
| CPP | central processing portion |
| CSIC | consumer specific integrated circuit |
| DC | decision criteria |
| DC-Alt | decision criterion-alternative |
| DCR | decision criteria ratings |
| DG | decision goal |
| DP | database portion |
| DPS | Definitive Pro system |
| FPGA | field-programmable gate arrays |
| GUI | graphical user interface |
| MDT | multi-tier data transfer |
| PAL | programmable array logic |
| PLA | programmable logic array |
| PLD | programmable logic device |
| URL | uniform resource locator | ents

SYSTEMS AND METHODS FOR PERFORMING MULTI-TIER DATA TRANSFER IN A GROUP ASSESSMENT PROCESSING ENVIRONMENT

FIELD

The systems and methods described herein relate to the collection, aggregation and display of data via graphical user interface in the context of a group decision model. The systems and methods described herein also relate to dynamic team formation in the context of a group decision model. The systems and methods described herein also relate to multi-tier data transfer in the context of group decision models.

BACKGROUND

In the present technological environment, various systems and methods are known to assist in the collection, aggregation and display of data related to alternative assessment processing. In particular, such alternative assessment processing may relate to the input, processing, and display of diverse data associated with alternative assessment of consensus data. However, known systems and methods lack in the technical approach and efficiency with which alternative assessment data is input, processed and displayed.

Therefore, technical improvements and solutions are needed to overcome these shortcomings. The systems and methods of the present disclosure provide such technical improvements.

SUMMARY

The systems and methods of the disclosure provide an innovative technical solution to a technical problem of effectively inputting, effectively processing and effectively displaying data related to the generation of alternative assessment data, such as group consensus data, and/or the generation of multi-criteria decisions, in accordance with at least one embodiment of the disclosure. In particular, the systems and methods of the disclosure generate and effectively output, through novel graphical user interface, consensus data through a collaborative, consistent, and transparent process. The apparatus of the disclosure may be utilized for a wide variety of purposes including personnel selection and item selection, for example.

The systems and methods of the disclosure may utilize aspects of the known "analytic hierarchy process" (AHP). However, the disclosure is not limited to such particulars. Rather, the systems and methods of the disclosure may be utilized to effectively process and graphically represent what might be characterized as second level parameters related to a first level parameter—and relatedly what might be characterized as third level parameters related to the second level parameters. In turn, further levels of parameters might be processed and graphically represented by the system. Accordingly, the systems and methods of the disclosure address a technical problem of effectively synthesizing diverse parameters that are believed to affect an ultimate first level parameter—in conjunction with effectively graphically representing the synthesis of such diverse parameters. The processing of the disclosure provides an efficient and effective technical approach to synthesizing and displaying data associated with assessment processing. The processing of the invention allows and provides for functionality that is lacking in the art—in that needed syntheses and presentation of data is not satisfactorily provided in known assessment processing. Additionally, the processing of the invention allows and provides functionality in a manner to conserve computer processing requirements of a processing portion implementing the methods of the disclosure. The systems and methods of the invention provide for detailed assessment processing related data to be displayed in an efficient and effective manner so as to conserve computer resources and so as to limit the needed transfer of data.

In accordance with at least one embodiment of the graphical representation of data provided by the disclosure, the disclosure provides what is herein characterized as the "Definitive Pro System" (DPS) "facilitator interface" and related processing that provides a technical approach to presenting and manipulating consensus data and other group generated data, in accordance with at least one aspect of the disclosure.

The systems and methods of the disclosure provide an innovative technical solution to a technical problem of effectively inputting, effectively processing and effectively displaying data related to the generation of assessment data, such as group consensus data, and/or the generation of multi-criteria decisions from a group of persons, in accordance with at least one embodiment of the disclosure. In particular, the systems and methods of the disclosure allow a facilitator user to dynamically form a team to generate and effectively output, through novel graphical user interface, consensus data through a collaborative, consistent, and transparent process. The apparatus of the disclosure may be utilized for a wide variety of objectives including personnel selection and item selection, for example.

In accordance with at least one embodiment of the disclosure, the disclosure utilizes dynamic team formation in conjunction with the "Definitive Pro System" (DPS) "facilitator interface" and related processing that provides a technical approach to presenting and manipulating consensus data and other group generated data, in conjunction with forming a team to assess such consensus data in accordance with at least one aspect of the disclosure.

The systems and methods of the disclosure provide an innovative technical solution to a technical problem of effectively inputting, effectively processing and effectively displaying data related to the generation of assessment data, such as group consensus data, and/or the generation of multi-criteria decisions from a group of persons across multiple assessment architectures, in accordance with at least one embodiment of the disclosure. In particular, the systems and methods of the disclosure provide for efficient and seamless multi-tier data transfer between assessment architectures, so as to allow group decision-making across such assessment architectures. The apparatus and methods of the disclosure may be utilized for a wide variety of objectives including personnel selection and item selection, for example.

In accordance with at least one embodiment of the disclosure, the disclosure utilizes multi-tier data transfer across multiple assessment architectures in conjunction with the "Definitive Pro System" (DPS) "facilitator interface", "dynamic team formation" processing, and related processing that provides a technical approach to presenting and manipulating consensus data and other group generated data, in conjunction with forming a team to assess such consensus data in accordance with at least one aspect of the disclosure.

BRIEF DESCRIPTION OF THE DRAWINGS

The present disclosure will be better understood on reading the following detailed description of non-limiting embodiments thereof, and on examining the accompanying drawings, in which:

FIG. 55 is a table showing mapping between "mean score" windows or ranges and a "group rating" in accordance with at least one embodiment of the disclosure.

FIG. 56 is a table of acronyms used in this disclosure, in accordance with at least one embodiment of the disclosure.

DETAILED DESCRIPTION

Figure 1:
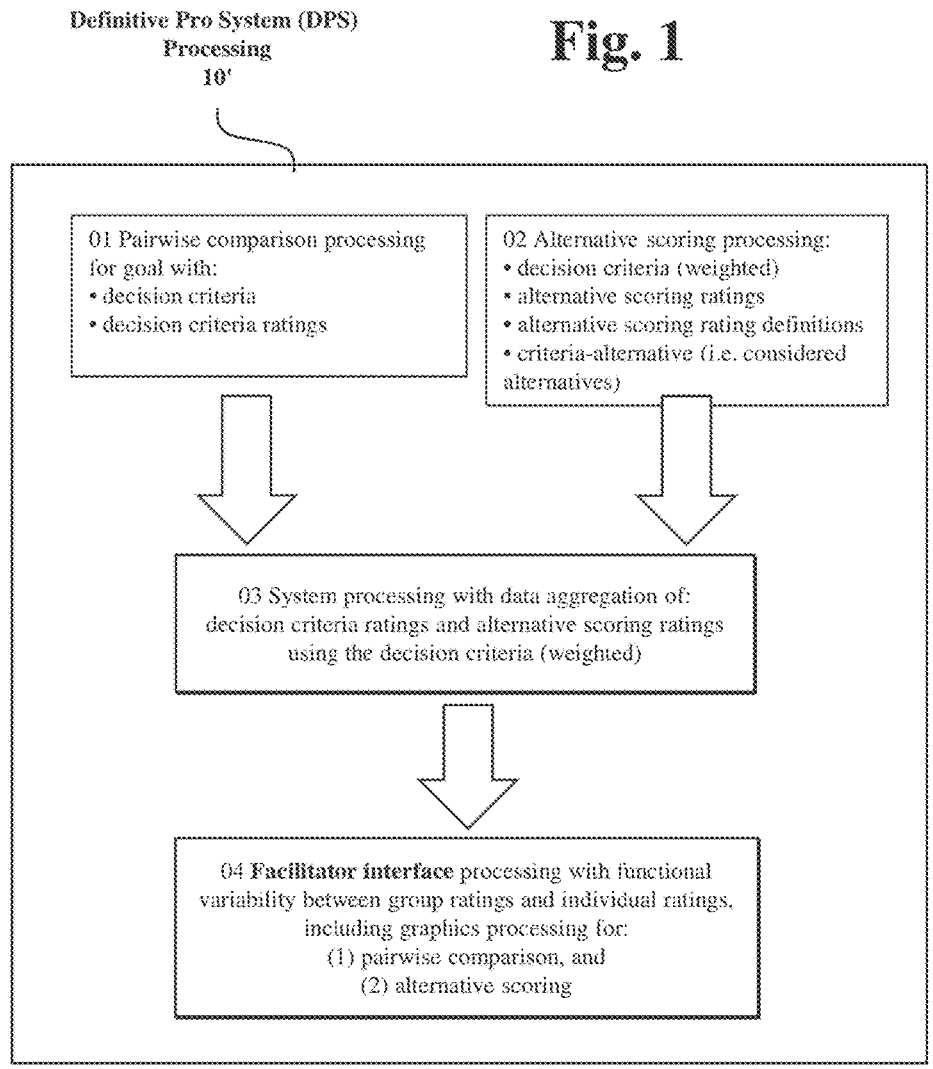
FIG. 1 is a high-level diagram showing the DPS processing, in accordance with at least one embodiment of the disclosure.

Hereinafter, aspects of the systems and methods of the disclosure will be described in accordance with various embodiments.

The systems and methods of the disclosure provide an innovative technical solution to a technical problem of effectively inputting, effectively processing and effectively displaying data related to the generation of group consensus data and/or the generation of multi-criteria decisions, in accordance with at least one embodiment of the disclosure. In particular, the systems and methods of the disclosure generate and effectively output, through novel graphic user interface, consensus data through a collaborative, consistent, and transparent process. The apparatus of the disclosure may be utilized for a wide variety of purposes including personnel selection and item selection, for example.

The systems and methods of the disclosure may utilize aspects of the known "analytic hierarchy process" (AHP). However, the disclosure is not limited to such particulars. Rather, the systems and methods of the disclosure may be utilized to effectively process and effectively graphically represent what might be characterized as second level parameters related to a first level parameter—and relatedly what might be characterized as third level parameters related to the second level parameters. In turn, further levels of parameters might be processed and effectively graphically represented by the system. Accordingly, the systems and methods of the disclosure address a technical problem of effectively synthesizing diverse parameters that are believed to affect an ultimate first level parameter—in conjunction with effectively graphically representing the synthesis of such diverse parameters.

In accordance with at least one embodiment of the graphical representation provided by the disclosure, the disclosure provides what is herein characterized as a "facilitator interface" and related processing that provides a technical approach to presenting and manipulating assessment data, such as consensus data, and other group generated data, in accordance with at least one aspect of the disclosure.

In at least one embodiment of the disclosure, a facilitator interface enables a team, for example, to review judgments provided by a group of decision participants and determine a level of consensus that exists within the group of decision participants. The disclosure provides a technical solution to capturing judgment data and displaying that judgment data utilizing a technical methodology in the environment of a graphical user interface.

Illustratively, the facilitator interface of the disclosure supports pairwise comparison processing. In pairwise comparison processing, the relative importance (i.e., weighting) of decision criteria is determined. With the disclosure, a facilitator user can choose to display judgments received by participants in what may be characterized as a bar graph format, such as by selecting what may be characterized as a response graph option. Alternatively, with the disclosure, a facilitator user can choose to display judgments received by participants in what may be characterized as a grid format that shows each participant users' response, such as by selecting what may be characterized as a response grid option. Various technical processing of such features is described further below.

Various additional display options are provided by the systems and methods of the disclosure. For example, a display option is provided that shows which judgments have not yet been submitted. A further display option is provided that displays a group rating that provides, through the processing of the disclosure, what is deemed the most important criterion and the degree to which such most important criteria is more important than the other criteria. For example, degree may be characterized by the gradations of: "Slightly", "Moderately", "Strongly", and "Extremely", for example. Such display may be invoked by a facilitator user selecting a suitable icon on a GUI generated by the system. Further, the system of the disclosure may generate and display "mean score" data as described further below. Additionally, the system of the disclosure may provide a "participant list" display option that provides a list of relevant participants. As described below, such display options may be invoked by suitable buttons, or more generally icons, on a GUI (i.e., facilitator interface) generated by the system.

Illustratively, the facilitator interface of the disclosure also supports alternative scoring processing. In alternative scoring processing, in accord with at least one embodiment of the disclosure, alternatives are scored and presented to a facilitator user. With the system of the disclosure, a facilitator can choose to display judgments received by participants in what may be characterized as a bar graph format, such as by selecting what may be characterized as a "response graph" option on a GUI generated by the system. In addition, a facilitator can choose to display judgments received by participants in what may be characterized as a grid format that is provided to show each participant's response. Such display may be invoked by selecting a suitable icon, such as what may be characterized as a "response grid" option.

Various additional display options are provided by the systems and methods of the disclosure. For example, with alternative scoring processing, the system provides a display option that shows which judgments have not yet been submitted, by selecting a suitable icon. Additionally, with alternative scoring processing, the system provides a display option that displays a group rating that provides, through the processing of the disclosure, the degree to which the selected alternative contributes to the criterion. For example, degree may be characterized by gradations of: "Does Not Contribute", Low, Medium, and High, for example. Such display may be invoked by a facilitator user selecting a suitable icon on a GUI generated by the system. Further, the system of the disclosure may generate and display "mean score" data as described further below. Additionally, the system of the disclosure may provide a "participant list" display option that provides a list of relevant participants. Additionally, the system of the disclosure may provide a "strategic alignment assessment score and rating" option is described further below.

The systems and methods of the disclosure provide a technical approach to the synthesis and presentation of group and/or consensus data, in accordance with at least one embodiment of the disclosure. In particular, the disclosure provides a methodical, technical approach to synthesizing and presenting data that is difficult to otherwise present, through graphical user interface.

FIG. 1 is a high-level diagram showing what is herein characterized as "Definitive Pro System" (DPS) processing 10', in accordance with at least one embodiment of the disclosure. Accordingly, as noted, the processing depicted in FIG. 1 is a high-level representation of the disclosure. Various further details are described in the disclosure below. As illustratively shown in FIG. 1, processing of the disclosure may, in at least one aspect, include pairwise comparison processing (01) for a particular goal with decision criteria and decision criteria ratings that are used to calculate the weighting factors (expressed in percentages) associated with such decision criteria (i.e., decision criteria (weighted)), for example. As illustratively shown in FIG. 1, processing of the disclosure may, in at least one aspect, further include alternative scoring processing (02) utilizing decision criteria (weighted) assessed against criteria-alternatives using alternative scoring ratings. Criteria-alternative may also be characterized as "considered alternatives".

The DPS processing of the disclosure, in accordance with embodiments, performs a variety of system processing (03) that includes various data aggregation of decision criteria ratings, and alternative scoring ratings using decision criteria, which may be weighted in such processing. In particular, as reflected at (04) the systems and methods of the disclosure provide what is herein characterized as "facilitator interface processing" with functional variability between group ratings and individual (i.e., participant) ratings, for example. In particular, as described in detail below, the disclosure provides graphics processing for both pairwise comparison processing and alternative scoring processing.

Figure 2:
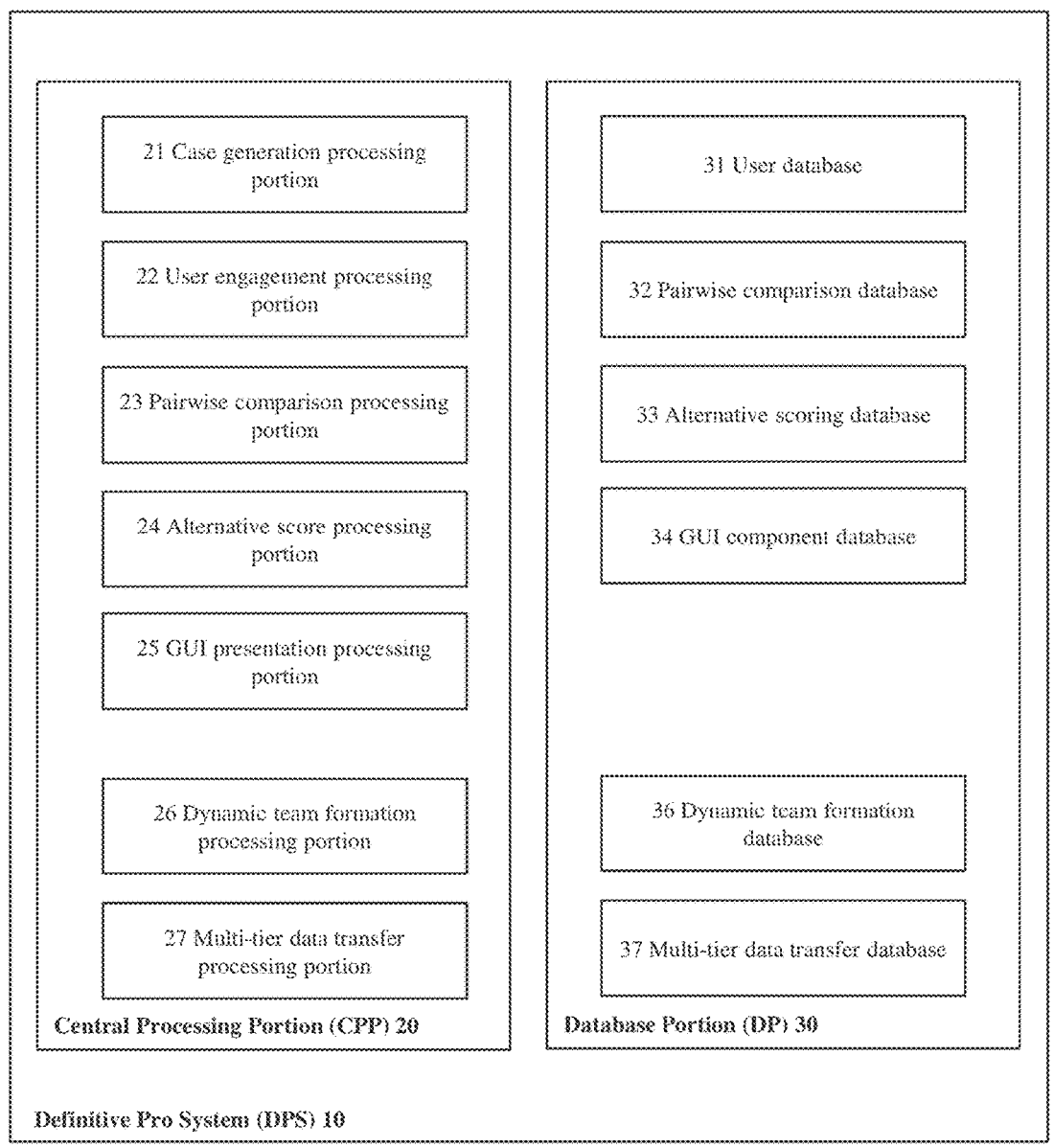
FIG. 2 is a block diagram showing a DPS, in accordance with at least one embodiment of the disclosure.

FIG. 2 is a block diagram showing a "DPS 10, in accordance with at least one embodiment of the disclosure. As shown, the DPS 10 includes a central processing portion (CPP) 20. Additionally, the DPS 10 includes a database portion (DP) 30.

The CPP 20, as shown in FIG. 2, may include a variety of specialized processing components to perform the various processing described herein. Specifically, the CPP 20 may include a case generation processing portion 21 that performs processing associated with the generation of a case, as described herein. A user engagement processing portion 22 handles various processing associated with user engagement. For example, such processing portion 22 may handle the on-boarding of new users to the system including both facilitator users and participant users. Additionally, processing portion 22 may handle the processing of user credentials and access to various cases and other data provided by such user credentials. The CPP 20 also includes a pairwise comparison processing portion 23 that handles the various aspects of pairwise comparison processing as described in detail below. The CPP 20 also includes an alternative score processing portion 24 that handles various aspects of alternative score processing as described in detail below.

Further, the CPP 20 may include a Facilitator GUI presentation processing portion 25. In particular, such processing portion 25 may perform processing associated with various innovative aspects of the facilitator interface of the systems and methods of disclosure.

The CPP 20 of FIG. 2 also includes a dynamic team formation processing portion 26 and a multi-tier data transfer processing portion 27. The dynamic team formation processing portion 26 handles various dynamic team formation processing as described herein. The multi-tier data transfer processing portion handles various dynamic team formation processing as described herein.

The database portion (DP) 30 may include a variety of specialized database portions as shown. A user database 31 may be provided that stores a variety of user data. A pairwise comparison database 32 may be provided to store data that is both utilized and generated in connection with the various pairwise processing described herein. An alternative scoring database 33 may be provided to store data that is both utilized and generated in connection with the various alternative scoring processing described herein. Lastly, the DP 30 may include a Facilitator GUI component database 34. The Facilitator GUI component database 34 may store a variety of data associated with the generation of the GUIs of the facilitator interface processing of the disclosure. In particular, such Facilitator GUIs of the disclosure are illustratively shown in FIG. 3 and in FIG. 4, in accordance with at least one embodiment of the disclosure.

The DP 30 also includes a dynamic team formation database 36 and a multi-tier data transfer database 37. The dynamic team formation database 36 includes various data used and generated by dynamic team formation processing, in accordance with at least one embodiment of the disclosure. The multi-tier data transfer database 36 includes various data used and generated by multi-tier data transfer processing, in accordance with at least one embodiment of the disclosure. Various further details are described below.

Figure 3:
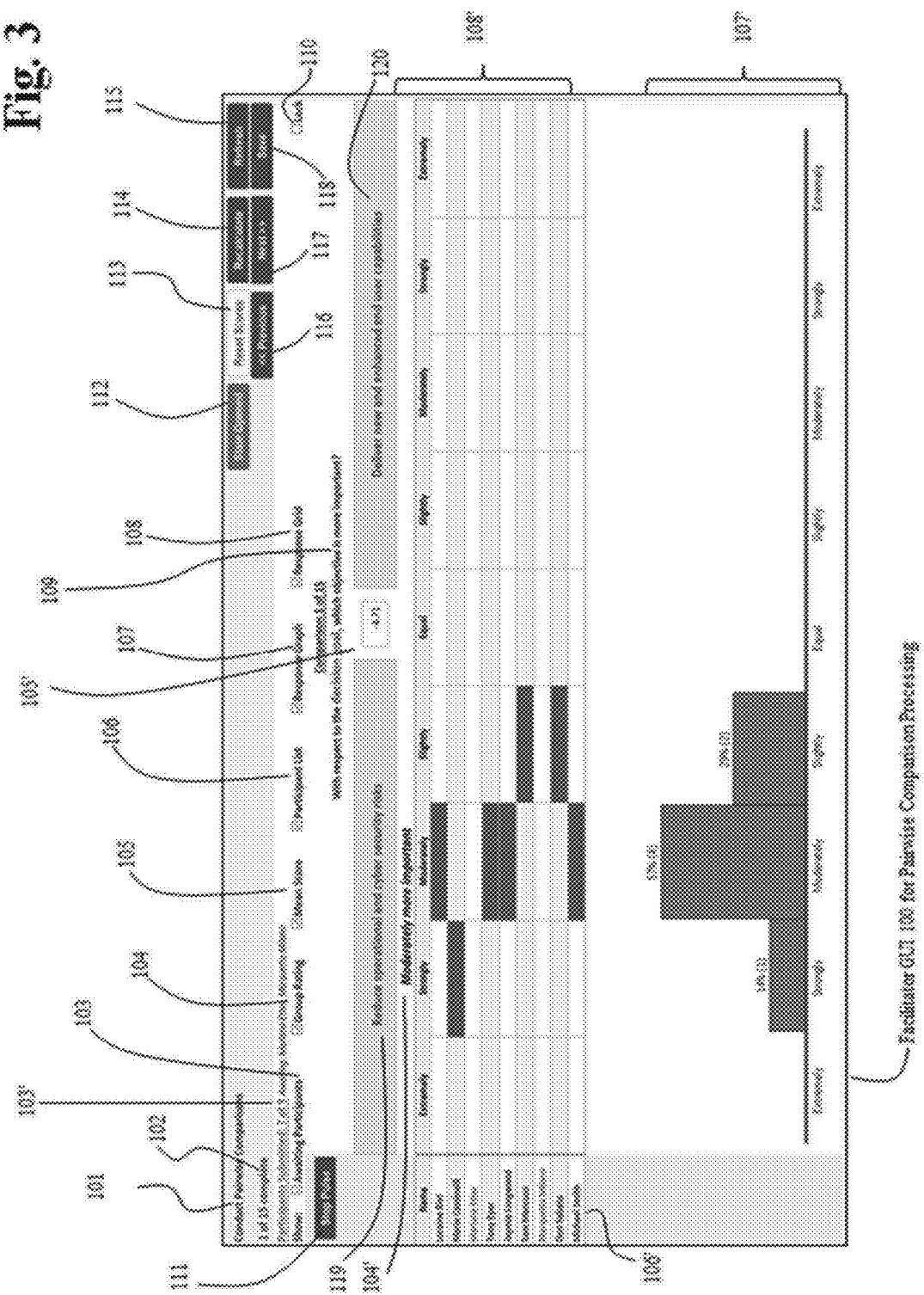
FIG. 3 shows a DPS facilitator graphical user interface (GUI) for pairwise comparison processing, in accordance with at least one embodiment of the disclosure.

FIG. 3 shows a Facilitator GUI 100 for pairwise comparison processing, in accordance with at least one embodiment of the disclosure. The Facilitator GUI 100 includes various content, icons, and other graphics as shown. Content 101, as shown, is a screen name reflecting the nature of Facilitator GUI 100 and the processing provided by Facilitator GUI 100. Content 102 reflects a number of "pairwise" comparisons completed out of a total of pairwise comparisons solicited. Content 103' shows a number of participants who have submitted a judgment. Checkbox icon 103 may be utilized by a facilitator user to control attributes of the listing of participants. For example, when checkbox icon 103 is checked, the DPS distinguishes between the participants who have submitted a judgment and those participants who have not yet responded (i.e., awaiting participants). Relatedly, the Facilitator GUI includes a listing of participants 106'. In the list 106', participants who have completed his or her pairwise comparisons may be distinguished from participants who have not completed his or her pairwise comparisons by different coloration, different bolding, or some other graphical distinction. Functionality may also be provided for a user to not show the listing of participants 106', as may be desired. Various additional functionality provided by the DPS via the Facilitator GUI 100 is described below with reference to FIG. 19.

In general, the Facilitator GUI 100 provides various pairwise comparison processing functionality to a user that is provided by the processing performed by the DPS 10. In accordance with at least one aspect of the disclosure, two objectives are efficiently and effectively compared (with respect to a decision goal) and judgments are provided through the GUI of FIG. 3. Various further aspects of functionality are described in detail below. However, prior to such aspects of functionality (of the Facilitator GUI) being described, related aspects of processing performed by the DPS will be described with reference to FIG. 4, FIG. 5 and subsequent figures. This further processing serves to support the functionality provided by the Facilitator GUI of FIG. 3.

Figure 4:
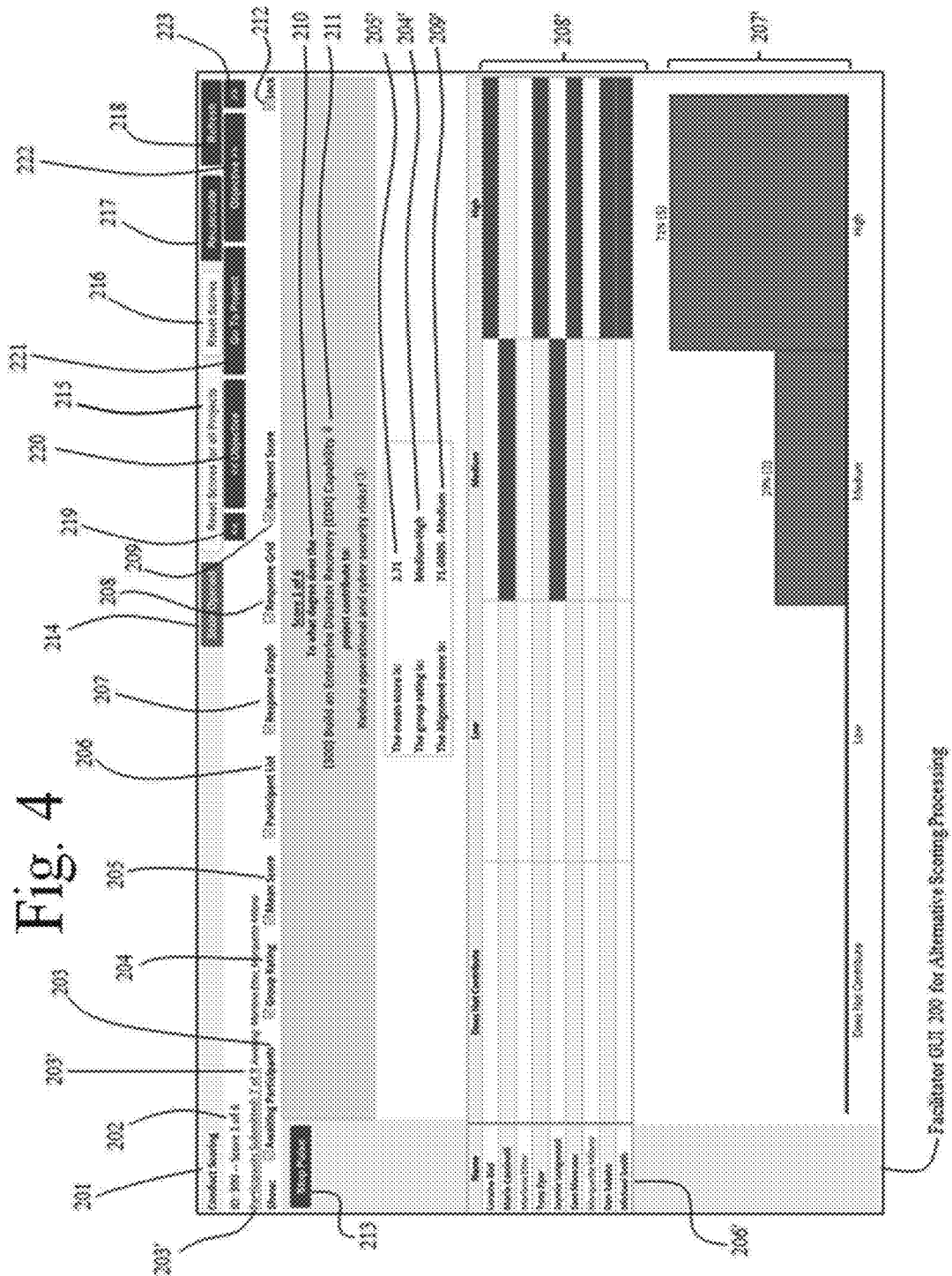
FIG. 4 shows a DPS facilitator GUI for alternative scoring processing, in accordance with at least one embodiment of the disclosure.

FIG. 4 shows a Facilitator GUI 200 for alternative scoring processing, in accordance with at least one embodiment of the disclosure. The Facilitator GUI 200 includes various content and icons as shown. Content 201, as shown, is a screen name "conduct scoring" reflecting the nature of Facilitator GUI 200 and the processing provided by Facilitator GUI 200. Content 202 provides identification of the alternative and the particular criterion that the alternative is being evaluated against. For example, identification of the alternative may be provided by an alternative identification number. Additionally, the particular criterion (that the alternative is being evaluated against) may be identified in some suitable manner such as "criterion 1 of 6" as is shown. Content 203' reflects a number of participants who have submitted a judgment. Checkbox icon 203 may be utilized by a user to control attributes of a listing of participants. For example, when checkbox icon 203 is checked, the DPS distinguishes between a number of participants who have submitted a judgment and those participants who have not yet responded (i.e., awaiting participants). Relatedly, the Facilitator GUI 200 includes a listing of participants 206'. In the list 206', participants who have completed his or her pairwise comparisons may be distinguished from participants who have not completed his or her pairwise comparisons by different coloration, different bolding, or some other graphical distinction. Functionality may also be provided for a facilitator user to not show the listing of participants 206', as may be desired. In accordance with at least one aspect of the disclosure, alternatives are efficiently and effectively evaluated against criterion using a rating scale with definitions for high, medium, low, not applicable, for example. Each participant user may submit a judgment using a device of his or her choice. Various additional functionality provided by the DPS via the Facilitator GUI 200 is described below.

In general, the Facilitator GUI 200 provides various pairwise processing functionality to a facilitator user that is provided by the processing performed by the DPS 10. These further aspects of functionality are described in detail below. However, prior to such aspects of functionality (of the Facilitator GUI) being described, aspects of related processing performed by the DPS will be described with reference to FIG. 5 and subsequent figures.

Figure 5:
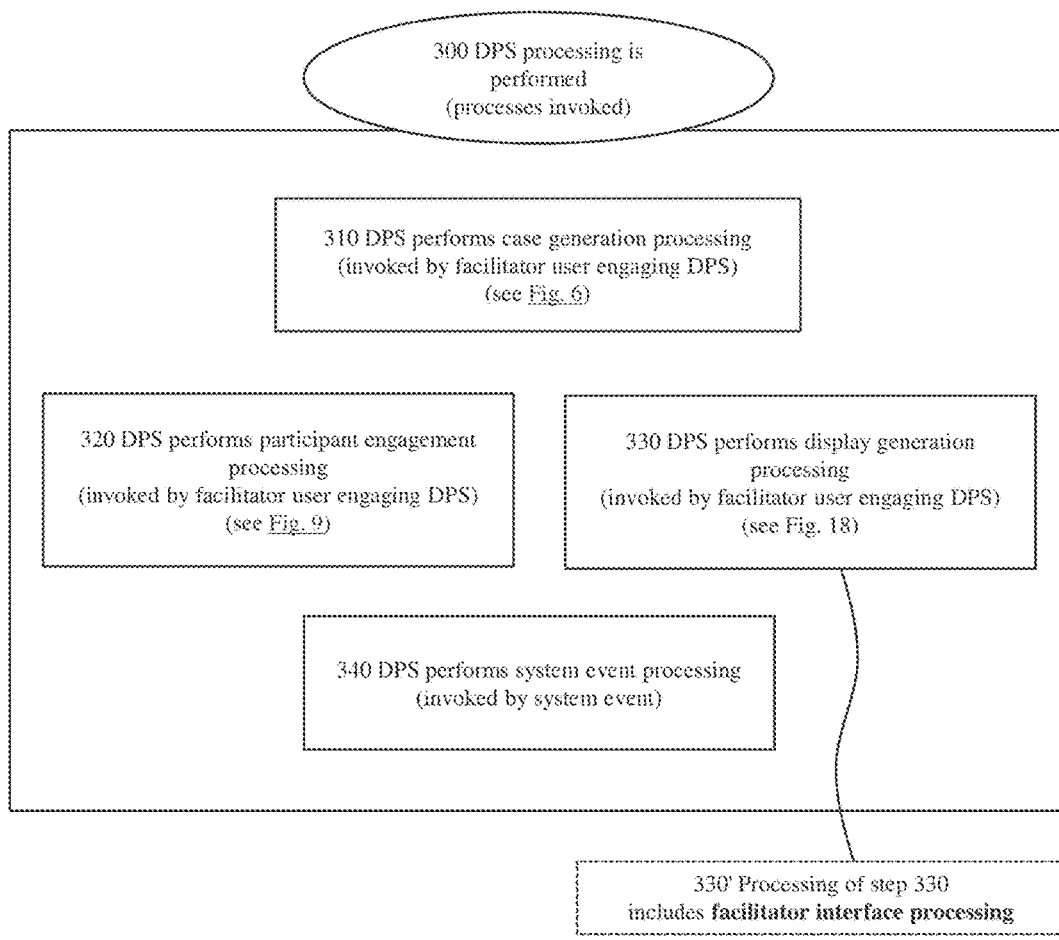
FIG. 5 is a high-level flowchart showing processing performed by the DPS, in accordance with at least one embodiment of the disclosure.

As described herein, quantifiers such as rating, weight, scale, and similar quantifiers are used herein. It is appreciated that one (or more) of such quantifier may be used in lieu of one (or more) of another of such quantifiers, as may be desired and/or that such quantifiers may be interchanged as may be desired, in accordance with at least one embodiment of the disclosure, FIG. 5 is a high-level flowchart showing processing performed by the DPS, in accordance with at least one embodiment of the disclosure. The initial step 300 of FIG. 5 reflects that "DPS processing is performed" that includes invoking various processes as shown. The high-level processes that may be invoked, in this illustration of the processing, include step 310, 320, 330, and 340. In step 310, the "DPS performs case generation processing". Such step 310 may be invoked by a facilitator user engaging the DPS. In accord with one embodiment of the disclosure, it is in step 310 that a facilitator user inputs the various data for a particular case. Further details are described below with reference to FIG. 6.

As shown in FIG. 5, in step 320, the "DPS performs participant engagement processing". Such participant engagement processing may be invoked by a participant user engaging the DPS.

Further details are described below with reference to FIG. 9. In particular, it is in the processing of step 320 that a participant user may engage the system in conjunction with both pairwise comparison processing and alternative score processing.

As shown in FIG. 5, in step 330, the "DPS performs display generation processing". The processing of step 330 may be invoked by a facilitator user engaging the DPS. In particular, in the processing of step 330, a facilitator user may engage the DPS to display data associated with the input received from the participant users. In particular, the processing of step 330 relates to the innovative facilitator interface processing of the disclosure as reflected at 330' in FIG. 5.

Lastly, as shown in FIG. 5, in step 340, the "DPS performs system event processing". The processing of step 340 may be invoked by various system events. Illustratively, system events may utilize time windows and/or thresholds in which to perform tasks in a predetermined manner. In addition, system events may include predetermined processing that is performed upon the observed completion of predetermined tasks, for example.

It is noted that features of the disclosure are described herein as being performed by a user, a facilitator user, and/or a participant user, for example. However, it is appreciated that such terminology, with reference to a human user, and a particular type of human user, are merely used for purposes of illustration regarding the functionality provided by the system. Indeed, such users need not be human users. Rather, for example, the functionality described herein as being performed in conjunction with interface with a user (be that a facilitator user or a participant user or other type of user) may, if desired, indeed be performed through interface with another computer processing machine. Accordingly, in embodiments of the disclosure, a user may be constituted by a human user and/or another machine.

Figure 6:
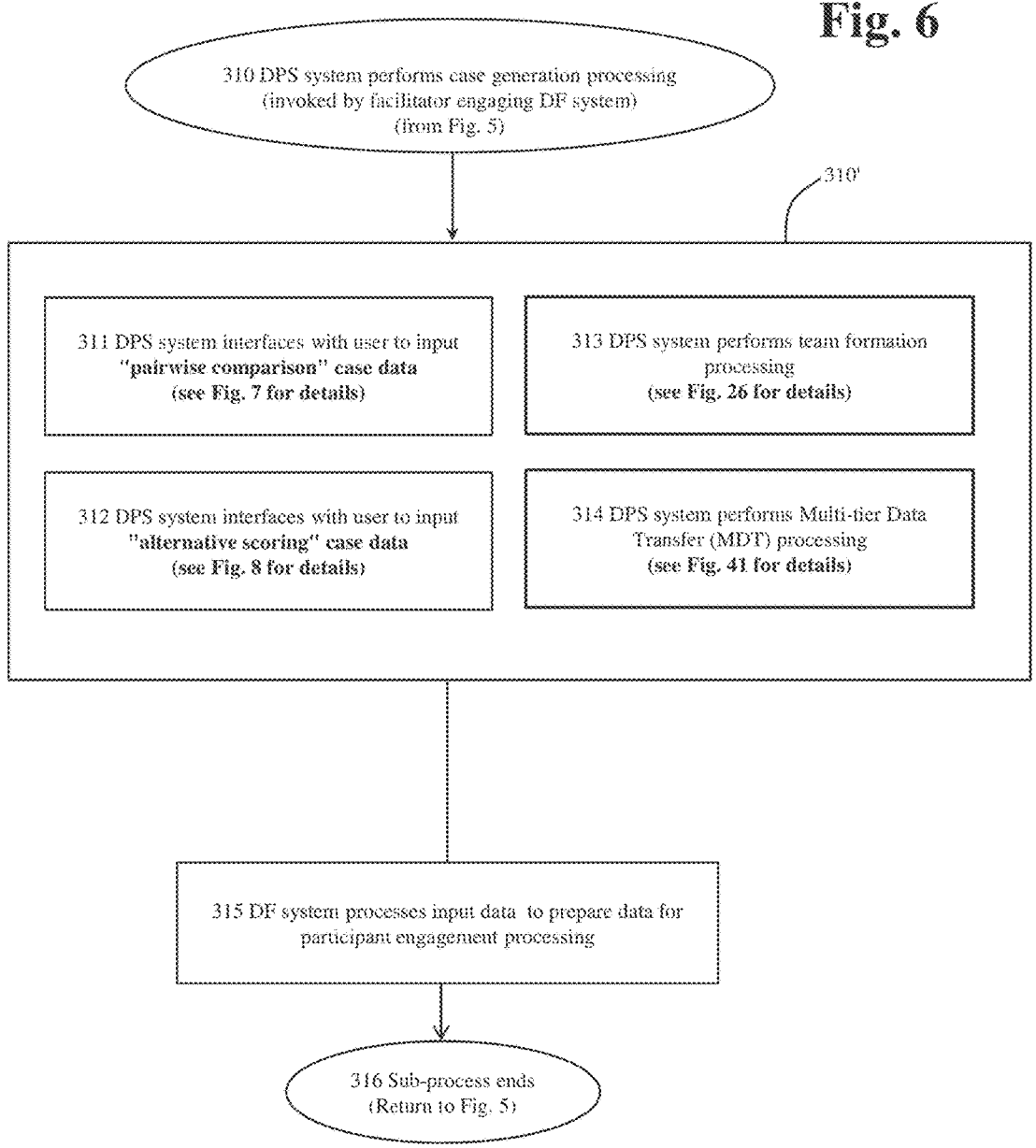
FIG. 6 is a flowchart showing in further detail the "DPS performs case generation processing" (step 310 of FIG. 5), in accordance with at least one embodiment of the disclosure.

FIG. 6 is a flowchart showing in further detail the "DPS performs case generation processing" step 310 of FIG. 5, in accordance with at least one embodiment of the disclosure. The processing of FIG. 6 starts in step 310 and passes to step 310'. Step 310' illustratively shows different types of case generation processing as well as other processing that may be performed, in this illustration, by the DPS.

Specifically, in step 311, the "DPS interfaces with the facilitator user to input pairwise comparison case data". As described below with reference to FIG. 7 and other figures, such pairwise comparison data is utilized in pairwise comparison processing of the disclosure. As shown in FIG. 6, in step 312, the "DPS interfaces with the facilitator user to input alternative scoring case data". As described below, such alternative scoring case data is utilized by the DPS in alternative scoring processing of the disclosure. Further details are described below with reference to FIG. 8 and subsequent figures.

FIG. 6 also includes the processing of step 313. In step 313, the DPS system performs dynamic team formation processing. Such processing provides a technical approach to presenting and manipulating consensus data and other group generated data, in conjunction with forming a team to assess such consensus data, in accordance with at least one aspect of the disclosure. Further details are described below with reference to FIG. 26 and related figures.

FIG. 6 also includes the processing of step 314. In step 314, the DPS system performs Multi-tier Data Transfer (MDT) processing. Such processing provides a technical approach to presenting and manipulating consensus data and other group generated data, in conjunction with associating different models, and in particular a parent model and a child model, in accordance with at least one aspect of the disclosure. Further details are described below with reference to FIG. 41 and related figures. It is appreciated that processing of the disclosure is not limited to vertical linearity or any other order as illustrated in FIG. 6 between the processing of steps 311, 312, 313, and/or 314. Rather, for example, in embodiments of the disclosure, the interfacing performed in step 312 may be performed in advance of the interfacing performed in step 311. Further, such interfacing of step 311 and step 312, so as to input data utilized by the system, may be intermixed and/or integrated in some manner. Further, in accordance with at least one embodiment of the disclosure, the processing of any, some, or all of steps 311, 312, 313, and/or 314 may be performed as desired.

Upon completion of the processing of step 310', the process passes to step 315. In step 315, the DPS processes the case data or other data that was input in steps 311, 312, 313, and/or 314. In particular, the data may be processed, by the DPS, so as to prepare for participant engagement processing. Such processing of data may include the population of data records utilized in pairwise comparison processing and/or alternative scoring processing, in accordance with embodiments of the disclosure. Such data records, as well as other data described herein, may be stored in suitable data records and/or on a suitable server, such as an SQL server database, for example.

After step 315, the process passes to step 316. In step 316, the processing ends—and processing returns to FIG. 5.

Figure 7:
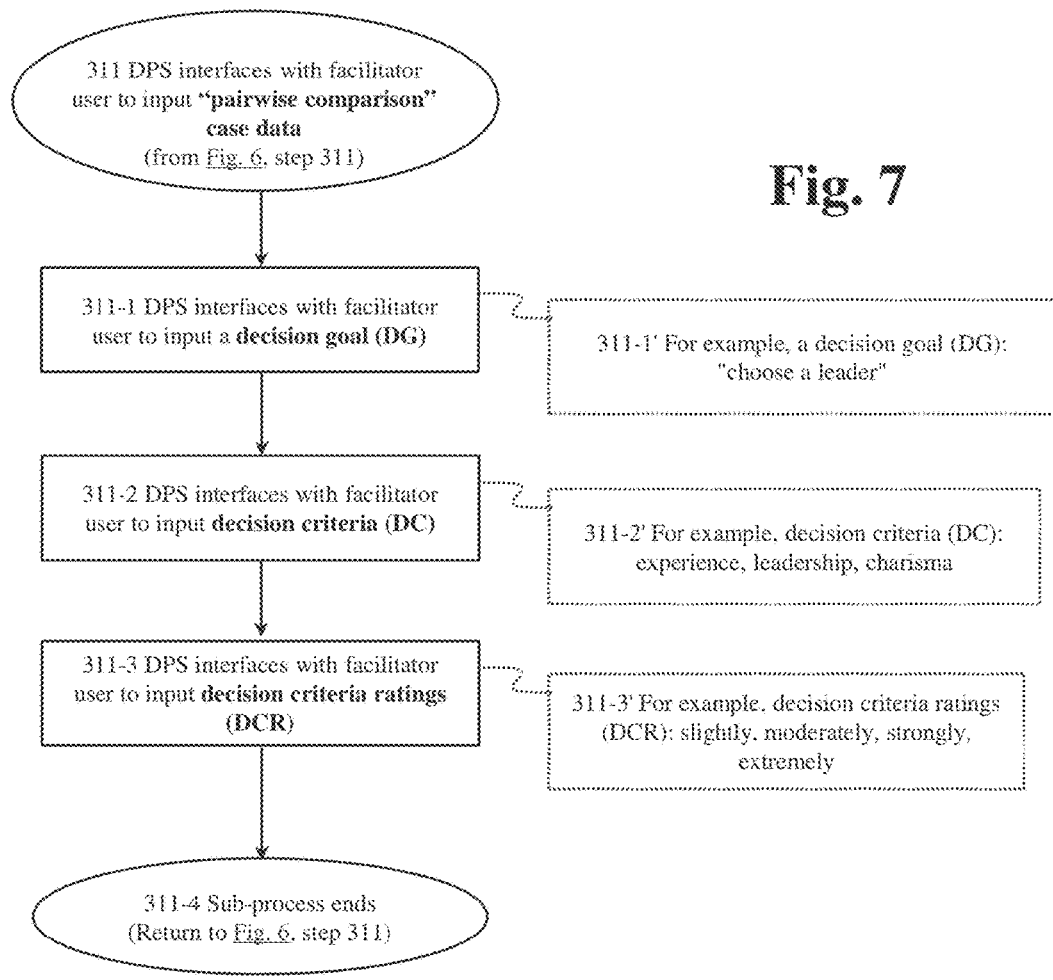
FIG. 7 is a flowchart showing in further detail the "DPS interfaces with facilitator user to input pairwise comparison case data and enter decision criteria ratings" step of FIG. 6, in accordance with this one embodiment of the disclosure.
Figure 21:
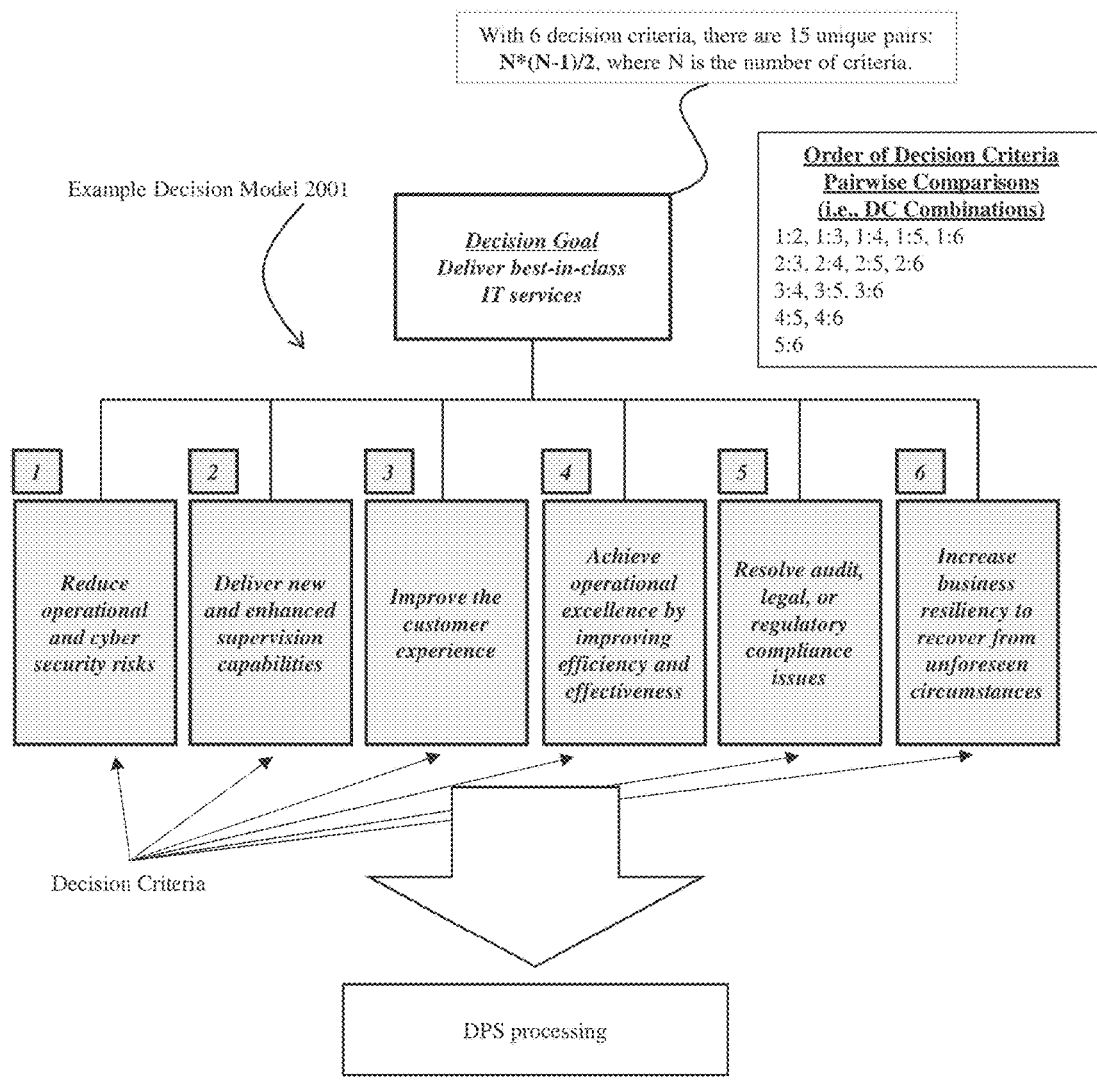
FIG. 21 is a diagram showing a decision model that may be utilized in the processing of the disclosure, in accordance with at least one embodiment of the disclosure.

FIG. 7 is a flowchart showing in further detail the "DPS interfaces with facilitator user to input pairwise comparison case data" in step 311 of FIG. 6, in accordance with this embodiment of the disclosure. Illustratively, FIG. 21 is a diagram showing a decision model 2001 that may be utilized in the processing of the disclosure, in accordance with at least one embodiment of the disclosure.

As shown in FIG. 7, processing starts in step 311 and passes to step 311-1. In step 311-1, the "DPS interfaces with the facilitator user to input a designated decision goal (DG)". For example, as reflected in step 311-1', a DG may be constituted by a parameter such as "choose a leader".

After the processing of step 311-1, the process passes to step 311-2. In step 311-2, the "DPS interfaces with the facilitator user to input decision criteria (DC)". As is shown at 311-2', for example, such DC might be constituted by parameters such as experience, leadership, and/or charisma.

After the processing of step 311-2, the process passes to step 311-3. In step 311-3, the "DPS interfaces with the participant user to input decision criteria ratings (DCR)". As reflected at 311-3', for example, DCR might be constituted by such parameters as "Slightly", "Moderately", "Strongly", and "Extremely". In accordance with a technical aspect of the disclosure, natural language type parameters of FIG. 7 are substantively captured digitally, in the form of data, hand in hand with effectively graphically displaying such captured data.

After the processing of step 311-3 in FIG. 7, the process passes to step 311-4. In step 311-4, the sub process ends—and processing returns to step 311 in FIG. 6. It is appreciated that the linearity of the processing illustrated in FIG. 7 is not limiting. Indeed, the order of the processing between steps 311-1, 311-2, and 311-3 may be adjusted in order as desired.

Figure 8:
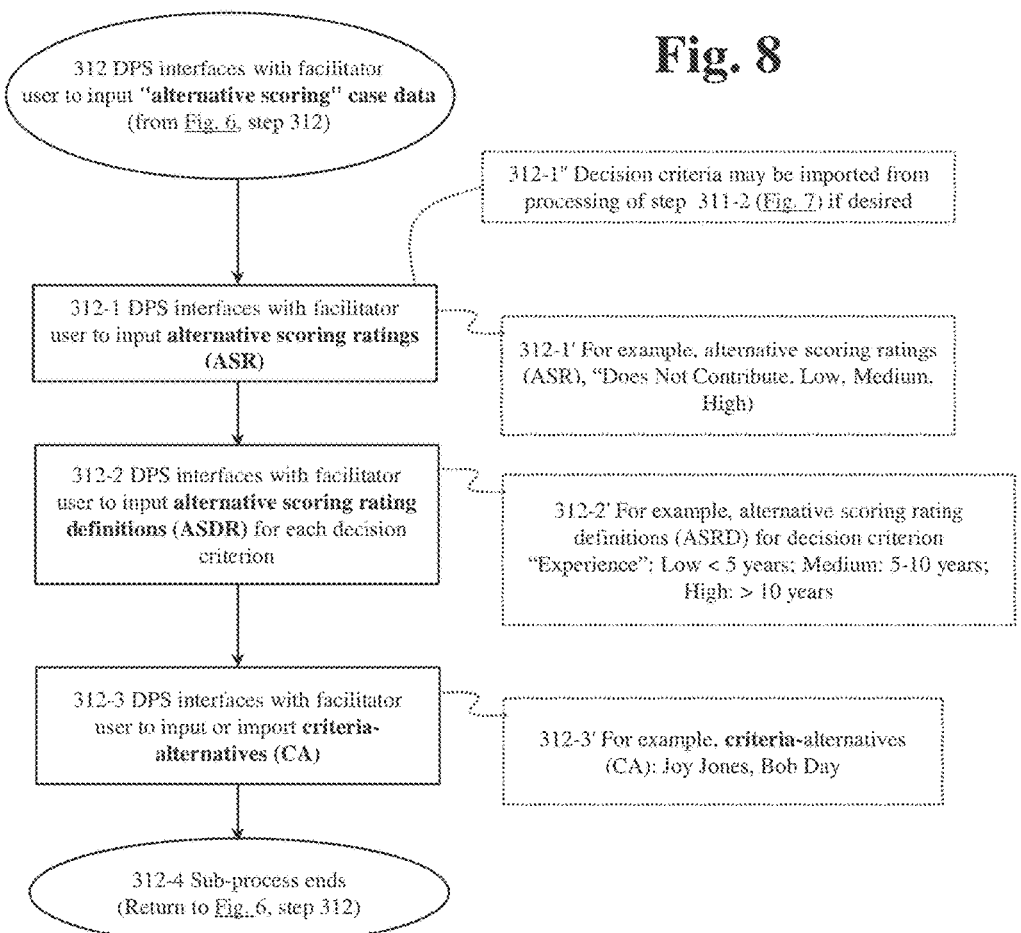
FIG. 8 is a flowchart showing in further detail the "DPS interfaces with facilitator user to input alternative scoring case data" (step 312 of FIG. 6), in accordance with at least one embodiment of the disclosure.

FIG. 8 is a flowchart showing in further detail the "DPS interfaces with facilitator user to input alternative scoring case data" step 312 of FIG. 6, in accordance with at least one embodiment of the disclosure. The processing starts in step 312 and passes to step 312-1. In step 312-1, the "DPS interfaces with the facilitator user to input alternative scoring ratings (ASR)". As is shown at 312-1', for example, such ASR might be constituted by such parameters as "Does Not Contribute", "Low", "Medium", and "High".

After the processing of step 312-1, the process passes to step 312-2. In step 312-2, the "DPS interfaces with the facilitator user to input alternative scoring rating definitions (ASRD) for each decision criterion". As is shown at 312-2', for example, such ASRD might be constituted by low, medium and high experience parameters.

Then the process passes to step 312-3. In step 312-3, the "DPS interfaces with the facilitator user to input or import criteria-alternatives (CAs)". In accordance with one aspect of the disclosure, the criteria-alternatives may be constituted by the alternatives that are presented to satisfy the decision goal input in step 311-1 (FIG. 7). In the example of FIG. 8, for example as reflected at 312-3', criteria-alternatives (CAs) might be constituted by two alternatives illustratively represented as Joy Jones and Bob Day.

Relatedly, as reflected at 312-1", the CAs may also be imported from the processing of step 311-2 of FIG. 7, if desired. Accordingly, as described throughout this disclosure, alternative scoring of the disclosure may be performed, in some embodiments, in conjunction with the DPS performing pairwise comparison processing. However, such is not necessarily required. That is, in embodiments of the disclosure, alternative scoring processing may be performed independently and separately from pairwise comparison processing. Further, in embodiments of the disclosure, pairwise comparison processing may be performed independently and separately from alternative scoring processing.

After the processing of step 312-3, the process passes to step 312-4. In step 312-4, the sub-process ends. Processing then returns to step 312 in FIG. 6 and proceeds as described above.

Figure 9:
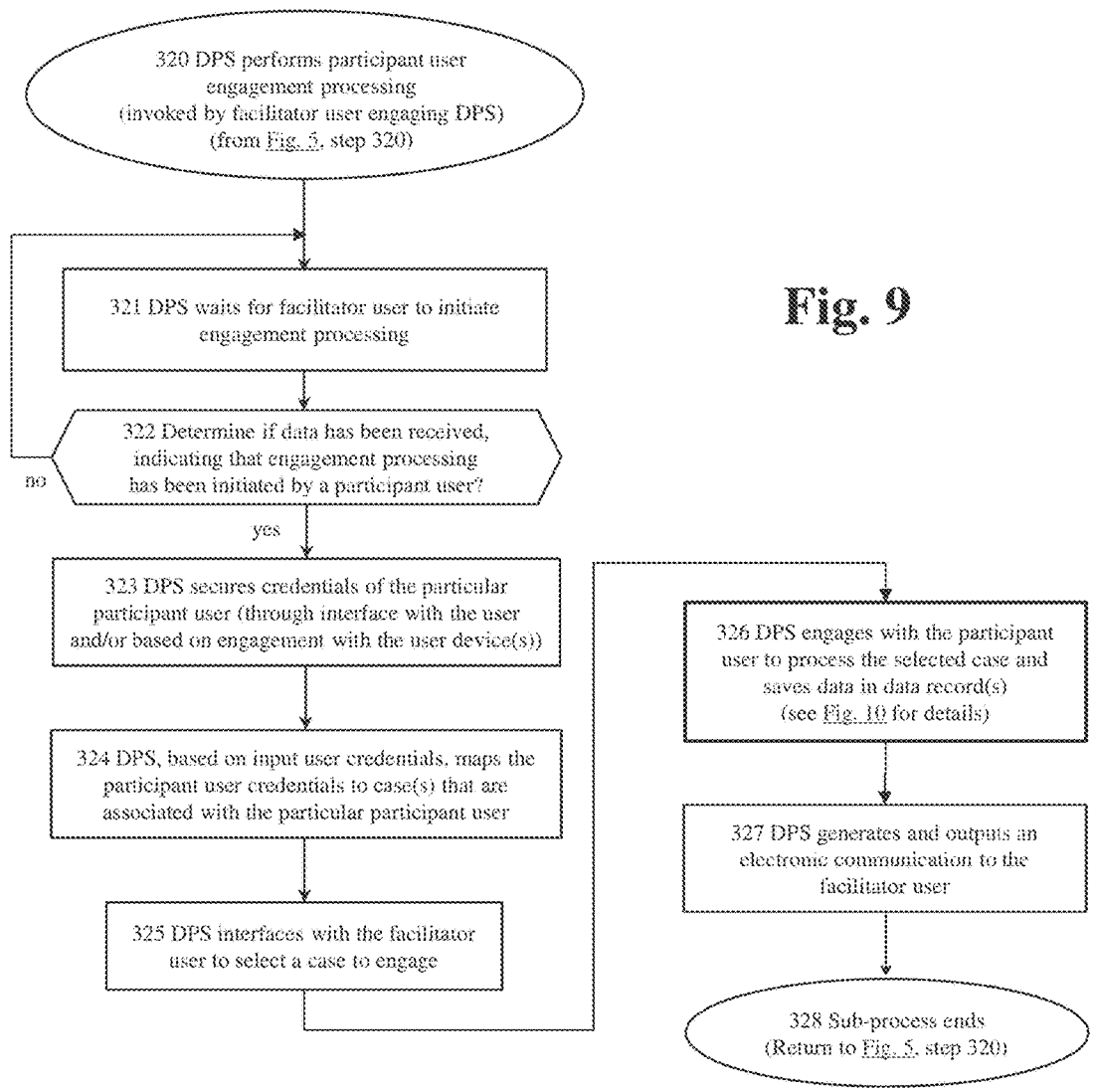
FIG. 9 is a flowchart showing in further detail the "DPS performs facilitator user engagement processing" (step 320 of FIG. 5), in accordance with at least one embodiment of the disclosure.

FIG. 9 is a flowchart showing in further detail the "DPS performs participant user engagement processing" step 320 of FIG. 5, in accordance with at least one embodiment of the disclosure. As described above, the processing of step 320 might be invoked by a facilitator user engaging the DPS. As shown, the processing starts in step 320 and passes to step 321. In step 321, the "DPS waits for the facilitator user to initiate engagement processing". Relatedly, in step 322, the DPS determines if data has been received indicating that engagement processing has been initiated by a participant user". If "no", the processing loops back to step 321 and continues to wait. On the other hand, if "yes" in step 322, then the processing passes to step 323.

In step 323, the "DPS secures credentials of the particular participant user" being engaged. For example, the credentials might be obtained through input by the participant user, such as credentials in the form of a username and/or password and/or the credentials might be obtained through engagement with the participant user's device itself, such as leveraging unique attributes of the participant user's device so as to authenticate the particular participant user. Then, the process passes to step 324.

In step 324, the "DPS, based on the input participant user credentials, maps the participant user credentials to case(s) that are associated with the particular participant user". In the processing of step 324, it may be that only one case is associated (i.e., to be acted upon) by the participant user. On the other hand, a particular participant user may be associated with multiple cases that he or she has been requested to provide feedback. Relatedly, in step 325, the "DPS interfaces with the facilitator user to select a case to engage". Then, processing passes to step 326.

In step 326, the "DPS engages with the facilitator user to process the selected case". In conjunction with the processing of the selected case, the DPS saves a variety of data related to the processing. Various further details are described below with reference to FIG. 10 and related figures. After the processing of step 326, the process passes to step 327.

In step 327, the "DPS generates and outputs an electronic communication to the facilitator user". This communication might be in the form of an alert indicating that a participant user has engaged with the system. Additionally, such electronic communication may be in the form of updated data to the Facilitator GUI 100 of FIG. 3 and/or the Facilitator GUI 200 of FIG. 4.

After the processing of step 327, the process passes to step 328. In step 328, the sub-process of FIG. 9 ends. Accordingly, processing returns to step in FIG. 5.

Figure 10:
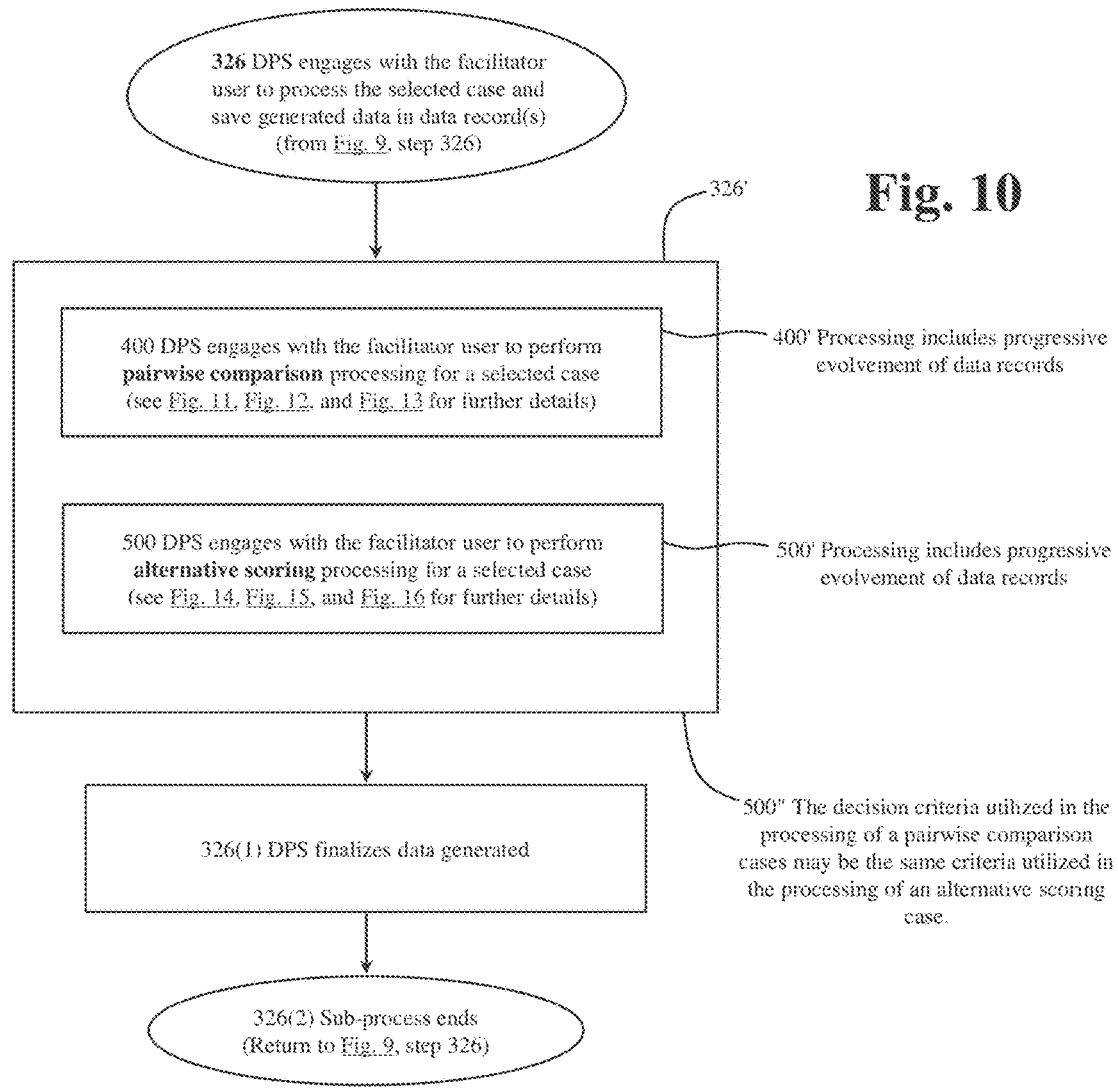
FIG. 10 is a flowchart showing in further detail the "DPS engages with the facilitator user to process the selected case and save generated data in data records" (step 326 of FIG. 9), in accordance with at least one embodiment of the disclosure.

FIG. 10 is a flowchart showing in further detail the "DPS engages with the facilitator user to process the selected case and save generated data in data record(s)" in step 326 of FIG. 9, in accordance with at least one embodiment of the disclosure. As shown, the process starts in step 326 and passes to step 326'. Step 326' includes and invokes the processing of step 400 and/or step 500, as shown in FIG. 10.

In the processing of step 400, the "DPS engages the facilitator user to perform pairwise comparison processing for a selected case". Various details of such processing are described below with reference to FIG. 11, as well as FIG. 12 and FIG. 13. As reflected at 400', the processing of step 400 includes progressive evolvement of one or more data records.

In the processing of step 500, the "DPS engages the facilitator user to perform alternative scoring processing for a selected case". Various details of such processing are described below with reference to FIG. 14, as well as related FIG. 15 and FIG. 16. As reflected at 500', the processing of step 500 includes progressive evolvement of one or more data records.

As reflected at 500", shown in FIG. 10, the decision criterion utilized in the processing of pairwise comparison cases may be the same criteria utilized in the processing of an alternative scoring case.

After the processing of step 400 and/or step 500 (in step 326' of FIG. 10) the processing passes to step 326(1). In step 326(1), the DPS finalizes the various data generated in the processing of step 400 and/or step 500. Then, the process passes to step 326(2). After such step 326(2), the processing returns to step 326 in FIG. 9.

Figure 11:
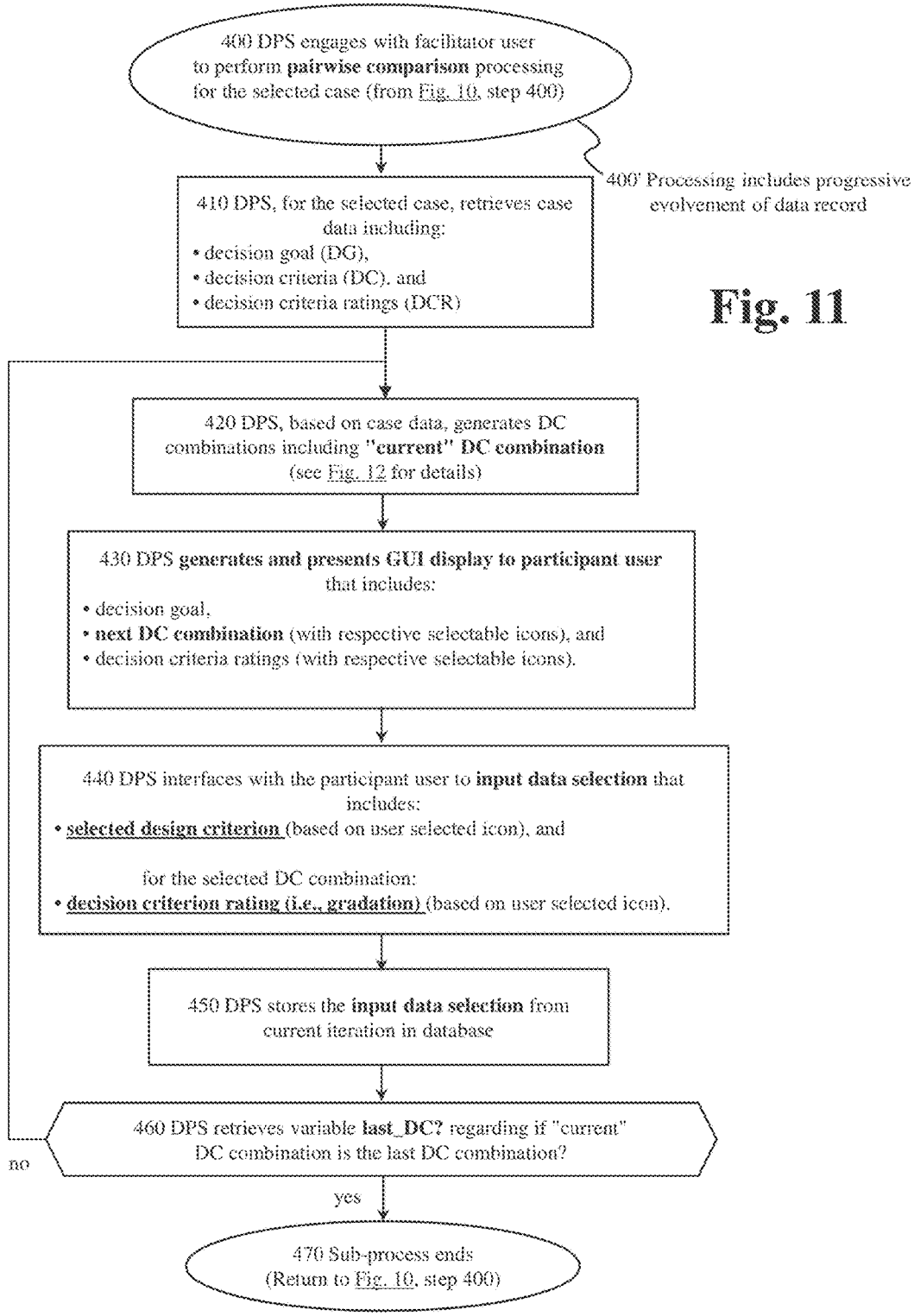
FIG. 11 is a flowchart showing in further detail the "DPS engages with facilitator user to perform pairwise comparison processing for selected case" (step 400 of FIG. 10), in accordance with at least one embodiment of the disclosure.

FIG. 11 is a flowchart showing in further detail the "DPS engages with user to perform pairwise comparison processing for the selected case" step 400 of FIG. 10, in accordance with at least one embodiment of the disclosure. As shown, the process starts in step 400 and passes to step 410.

In step 410, the "DPS, for the selected case, retrieves case data associated with the particular case". In particular, in accord with one embodiment of the disclosure, the case data includes decision goal (DG) data, decision criteria (DC) data, and decision criteria ratings (DCR) data.

After step 410, the process passes to step 420. In step 420, the "DPS, based on the case data, generates decision criteria (DC) combinations". In accordance with one embodiment of the disclosure, the DC combinations are constituted by the various permutations of the decision criteria. The system processes each of these permutations in turn—and designates each permutation progressively as a "current" DC combination. Accordingly, the processing of step 420 iteratively provides a "current" DC combination for processing in step 430 and step 440. Accordingly, after the processing of step 420, the process passes to step 430.

Figure 22:
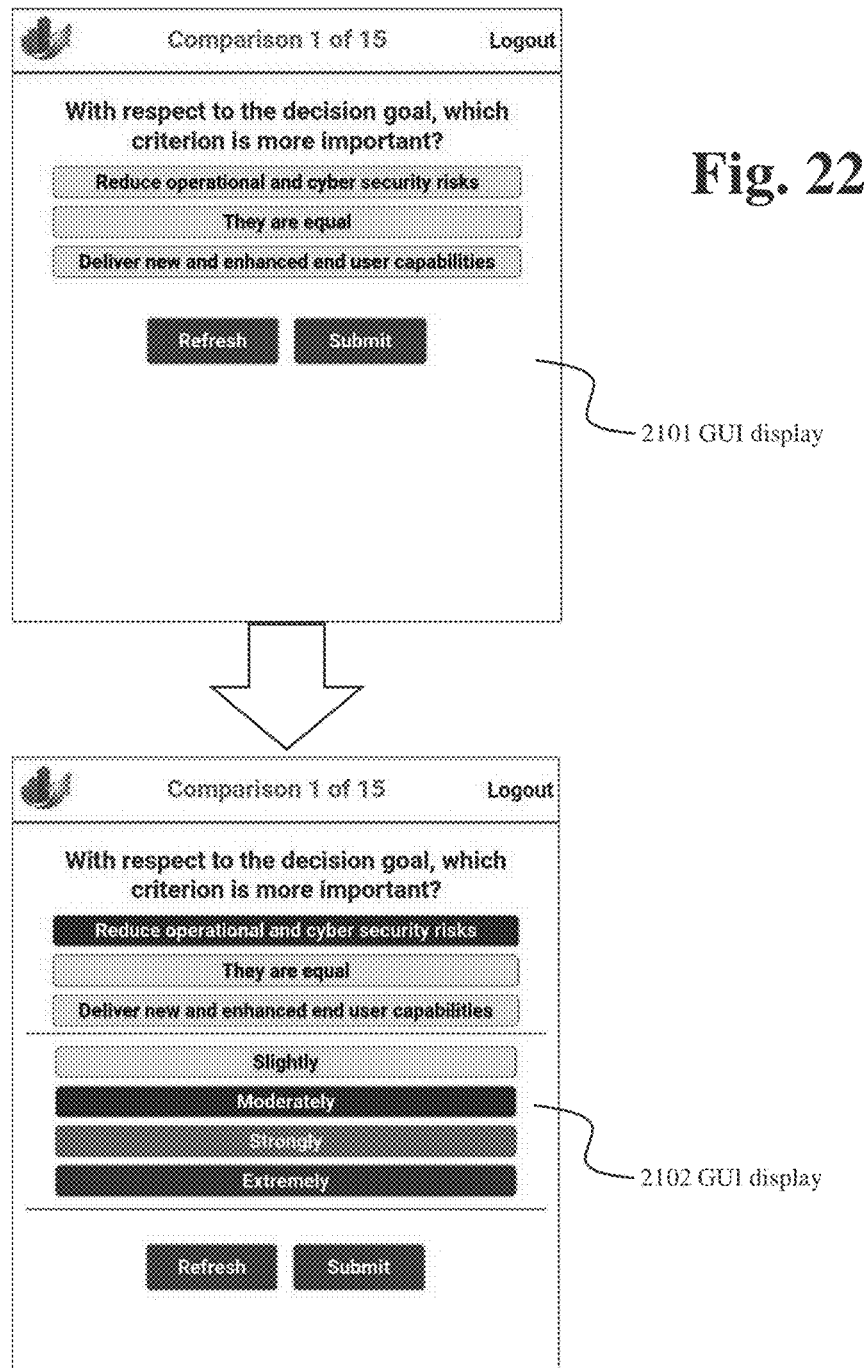
FIG. 22 is a diagram showing user interface windows related to pairwise comparison processing, in accordance with at least one embodiment of the disclosure.

In step 430, the "DPS generates and presents a GUI display to the participant user that includes both the decision goal, the next DC combination, and decision criteria ratings associated with such next DC combination. In one embodiment of the disclosure, the participant user may be presented with a DC combination with respective selectable icons for each decision criterion in the DC combination. The participant user then chooses (step 440 of FIG. 11) one of the decision criteria out of two decision criteria in this example. Subsequent to such selection, the participant user may then be presented with decision criteria ratings (with respective selectable icons) (step 440) so that the participant user is provided the opportunity to "rate" the selected criterion. Alternatively, the DC combination (presented to the participant user for selection of one of the decision criteria of the combination) may be presented to the participant user along with ratings for a selection. FIG. 22 illustrates processing with GUI display 2101 by which a participant user selects a decision criterion, as well as GUI display 2102 by which a participant user selects a rating associated with the selected decision criterion. Accordingly, FIG. 22 is a diagram showing participant user interface windows related to pairwise processing, in accordance with at least one embodiment of the disclosure. The systems and methods of the disclosure are not limited to those shown in FIG. 22, and other GUI representations may be used.

In summary, in step 440 of FIG. 11, the "DPS interfaces with the participant user to input data selection". Such input of data includes (1) a selected decision criterion of the combination, and (2) a rating for the selected DC. Such rating may also be characterized as a decision gradation— that measures a spectrum of degree of the decision as opposed to merely the conclusory end decision of the selection.

After the process of step 440, the process passes to step 450. In step 450, the "DPS stores the input data selection from the current iteration", that is the current iteration constituted by step 430 and step 440. Then, the process passes to step 460.

In step 460, the DPS retrieves data to determine if the current iteration of the processing of FIG. 11 indeed processed the last DC combination (i.e., the last permutation of the decision criteria). In this illustrative example, to perform this determination in step 460, the DPS retrieves a variable that dictates if the "current" DC combination is indeed the last DC combination. Such a variable is illustratively denoted last_DC? in this example. If the system determines in step 460 that the current DC combination is not the last DC combination (i.e., "no" in step 460), the processing then returns to step 420 and continues as described above.

On the other hand, the determination in step 460 may be "yes" indicating that the system determines that the "current" DC combination is the last DC combination. Accordingly, processing passes from step 460 to step 470. In step 470, the processing ends. Accordingly, the process returns to step 400 in FIG. 10.

Figure 12:
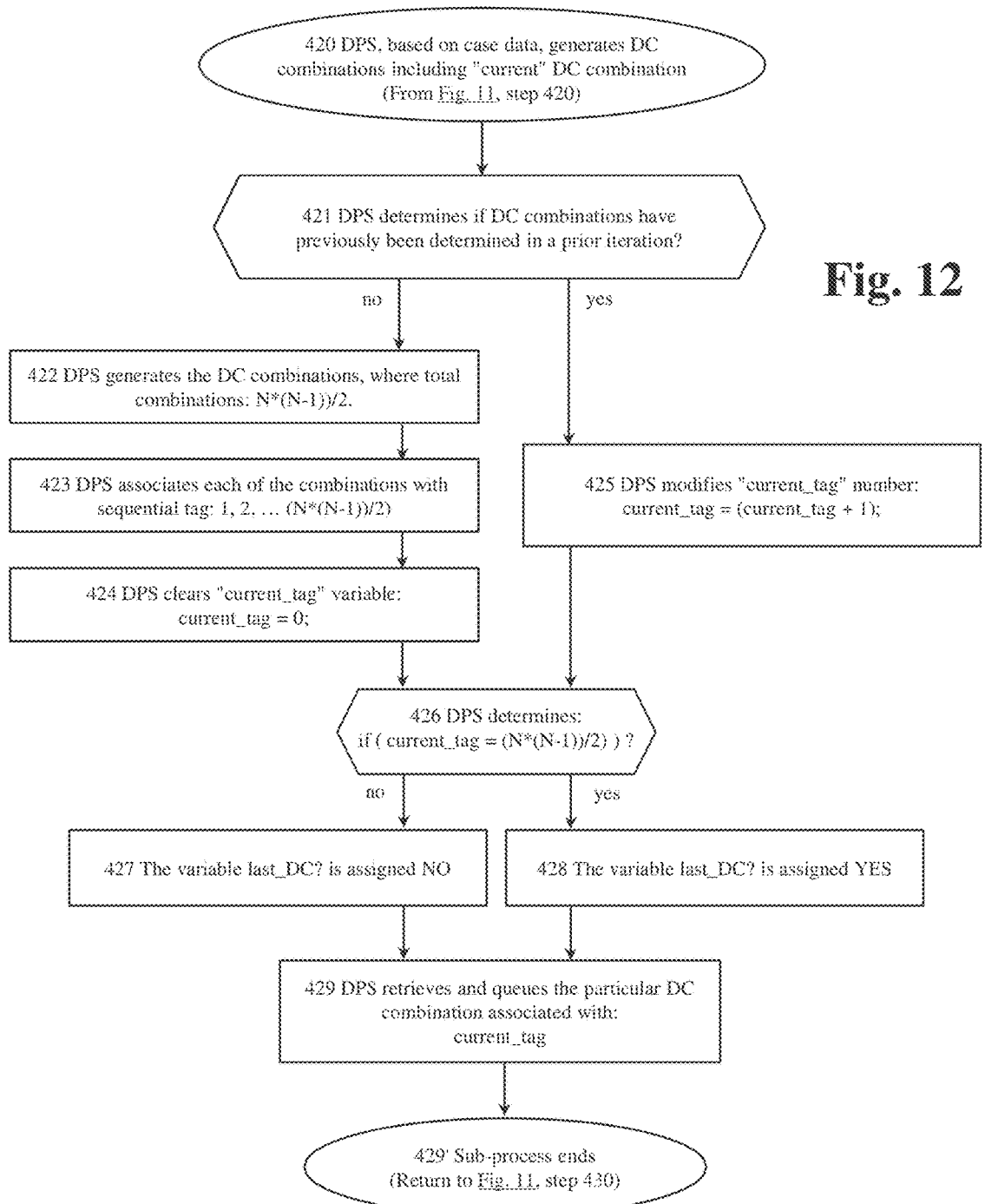
FIG. 12 is a flowchart showing the "DPS generates DC combinations including "next" DC combination" (step 420 of the FIG. 11), in accordance with at least one embodiment of the disclosure.

FIG. 12 is a flowchart showing the "DPS generates DC combinations including "current" DC combination" step 420 of FIG. 11, in accordance with at least one embodiment of the disclosure. As shown, the process starts in step 420 and passes to step 421.

Figure 16:
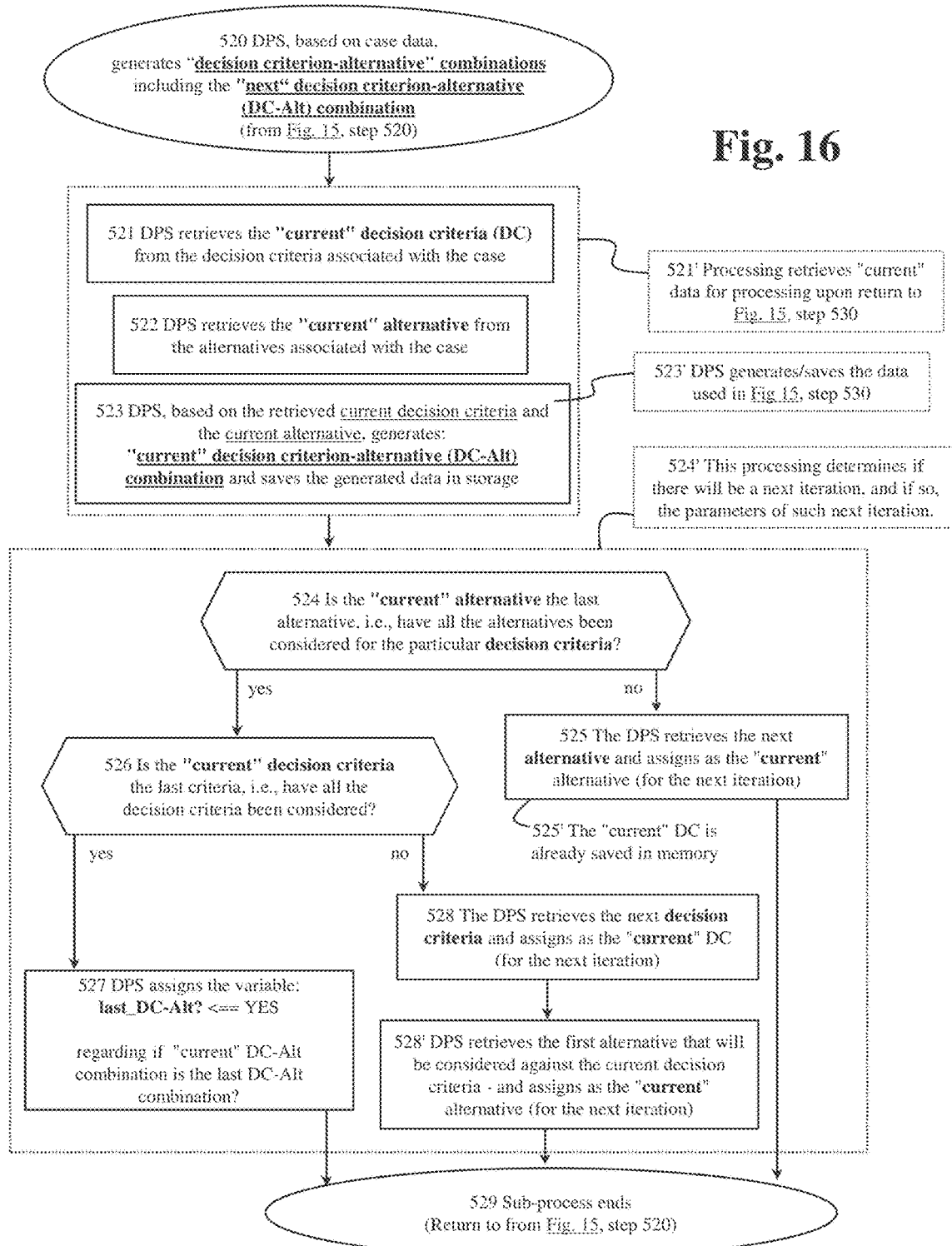
FIG. 16 is a flowchart showing "DPS, based on case data, generates "criteria-alternative" combinations including "next" criteria-alternative (CA) combination" (step 520 of FIG. 14), in accordance with at least one embodiment of the disclosure.

In step 421 of FIG. 12, the DPS determines if the various DC combinations have previously been determined in a prior iteration, and specifically such will be determined in the first iteration of processing of case data. Accordingly, in the methodology of this example, the various DC combinations are generated in conjunction with the first iteration. Accordingly, if the DPS determines that the DC combinations have not previously been determined, then the processing passes from step 421 to step 422. In step 422, the DPS generates the DC combinations using a suitable methodology. The total number of DC combinations may be determined by the formula (N*(N−1)/2), where N is the number of criteria. For example, there are 15 DC combinations when there are 6 decision criteria (6*(6−1)/2=30/2=15). Relatedly, the disclosure provides effective and efficient processing in the manner that the DC combinations or permutations are generated and processed by the system of the disclosure, as such processing is illustrated in FIG. 12, for example. Additionally, the disclosure provides effective and efficient processing in the manner that DC-Alt combinations or permutations are generated and processed by the system of the disclosure, as such processing is illustrated in FIG. 16, for example. Accordingly, in particular, the disclosure provides novel processing that generates and displays GUIs with substantial content. Such processing conserves computer processing resources and requires less data transfer in operation—in that, for example, a user does not have to switch between multiple screens to secure and/or review data of interest, i.e. in that data represented in the GUIs may be substantial.

Then, in step 423, the DPS associates each of the combinations with a sequential tag: 1, 2, . . . up to the tag of number (N*(N−1))/2). Then, the process passes to step 424. In step 424, the DPS clears the "current_tag" variable so as to be populated with an initiation value such as 0 (i.e., current_tag=0). Then, the process passes to step 426.

On the other hand, if yes in step 421, i.e. the DC combinations have been determined in a prior iteration, the process then passes to step 425. In step 425, the DPS modifies "current_tag" number to (current_tag+1). Such reflects processing of a further permutation. Then, the process passes to step 426.

In step 426, the DPS determines: if (current_tag=(N*(N−1))/2)). In other words, the processing of step 426 determines if the last iteration to process the current case has been attained (i.e., since in the last iteration, the sequential tag associated with a particular DC combination would indeed be the same as the value (N*(N−1))/2). If the determination in step 426 is "no", then the processing passes to step 427. In step 427, the variable last_DC? is assigned "no". On the other hand, if the determination in step 426 is "yes", then processing passes to step 428. In step 428, the variable last_DC? is assigned "yes".

After either of step 427 or step 428 FIG. 12, the process passes to step 429. In step 429, the DPS retrieves and queues the particular DC combination associated with current_tag—as such DC combination will subsequently be processed (in further processing of FIG. 11). Accordingly, even if the DPS determines in step 428 that the last decision criteria combination has been attained, such last decision criteria combination remains to be processed by the processing of FIG. 11. Accordingly, in step 429 of FIG. 12, such DC combination is effectively returned (from the subroutine of FIG. 12) for the processing of FIG. 11.

As shown in FIG. 12, after the processing of step 429, the process passes to step 429'. In step 429', the sub-process ends. Processing then returns to FIG. 11, step 430.

Figure 13:
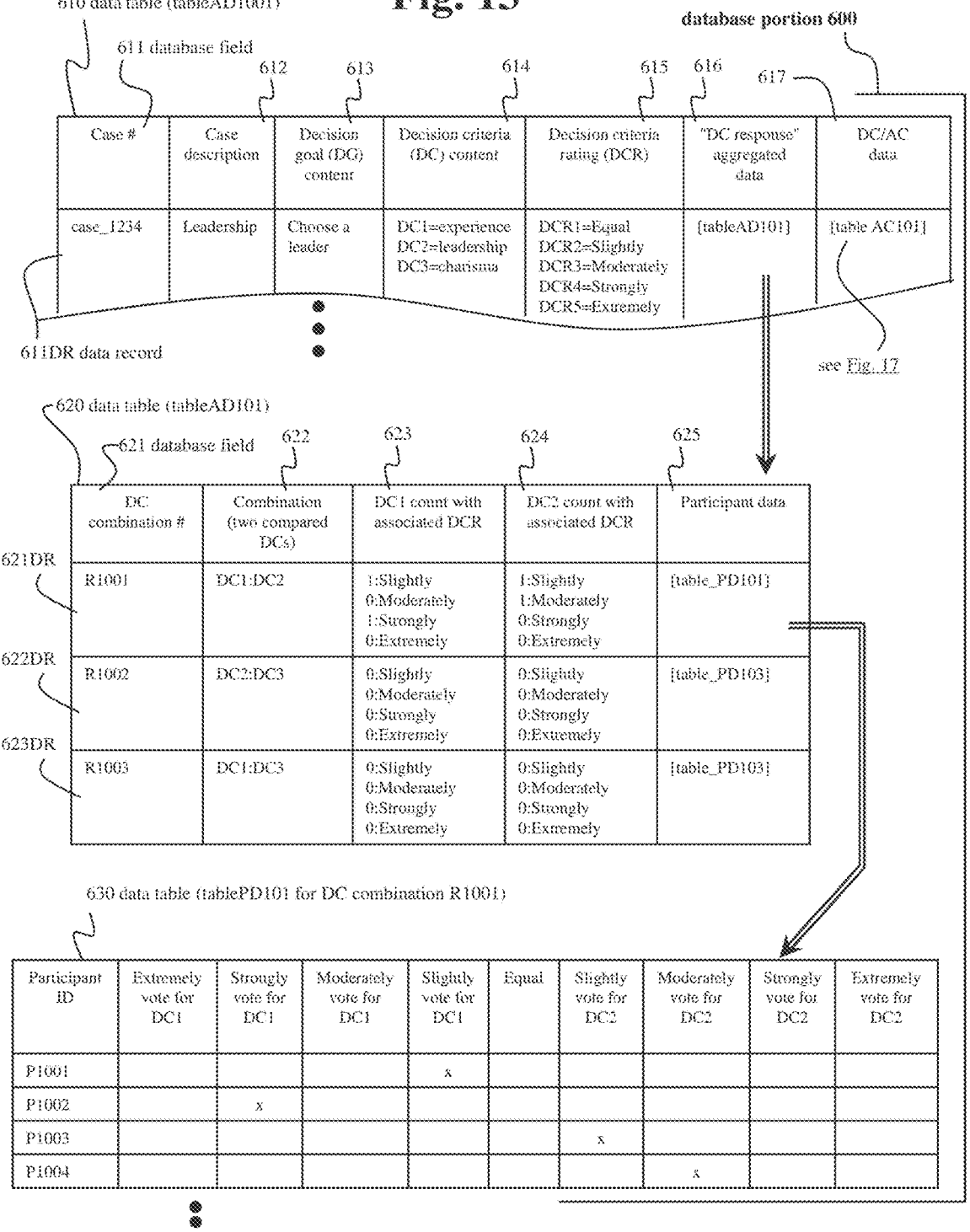
FIG. 13 is a diagram showing a database structure, in accordance with at least one embodiment of the disclosure.

FIG. 13 is a diagram showing a database structure, in accordance with at least one embodiment of the disclosure. The database structure may be provided on a computer readable medium in a database portion 600, in DP 30, for example. As shown, the database structure of FIG. 13 includes table 610 denoted by tableAD1001. The table 610 includes a plurality of data records 6111DR. While one data record 611DR is shown, in accord with one embodiment, the table 610 may include many data records 611 DR that respectively correspond to a particular case. Indeed, the number of data records in data table 610 may number in the hundreds, thousands, or more. Each data record 611DR includes a plurality of database fields. Such database fields includes database field 611, 612, 613, 614, 615, 616, 617. The database field 611 is populated with data of the particular case number. The database field 612 is populated with data of the particular case description. The database field 613 is populated with data of the decision goal for the particular case. The database field 614 is populated with data of the various decision criteria for the particular case. Further, the database field 615 is populated with data of the various decision criteria ratings of the particular case.

In contrast to the text content of database fields 611-615, the database field 616 contains data referencing a further table 620, which represents "DC response" aggregated data (i.e., tableAD101 620 as shown in FIG. 13). Such data in database field 616 may be in the form of a suitable pointer in the environment of a relational database, for example.

As is shown in FIG. 13, the data table 610 further includes database field 617. Database field 617 contains data referencing a yet further data table shown in FIG. 17 and described below. Such data in database field 617 may be in the form of a suitable pointer in the environment of a relational database, for example.

The data table 620 (denoted tableAD101) includes various aggregated data associated with pairwise comparison processing. In the processing of the DPS, in generation of the GUI of FIG. 3, in accord with one embodiment, the DPS "pulls" data from data table 610 and data table 620, such data tables being populated from source data in data table 630.

The data in table 620 may include a plurality of data records corresponding respectively to each DC combination number. Such data records are illustrated in FIG. 13 (table 620) as data record 621DR, data record 622DR, data record 623DR. Each data record includes a plurality of database fields. As shown, such database fields include database field 621, 622, 623, 624, 625. The database field 621 includes a DC combination number. The processing of step 423 (FIG. 12) may utilize such DC combination number and/or a variant of such DC combination number.

As also shown in FIG. 13, in data table 620, the database field 622 includes indicia reflecting the particular permutations of decision criteria. For example, the indicia DC1 may be mapped by the system to "experience" by the system—utilizing the data in database field 614 of data table 610.

As also shown in FIG. 13, in data table 620, the database fields 623 and 624 include what might be characterized as a "count" for the particular decision criteria (DC) with associated decision criteria ratings (DCR) for the particular DC. Relatedly, database field 625 includes participant data associated with respective DC combination numbers. More specifically, the participant data is constituted by data referencing the yet further data table 630. Such data in database field 625 may be in the form of a suitable pointer in the environment of a relational database, for example.

Lastly, the database structure of FIG. 13 includes the data table 630, in accordance with at least one embodiment of the disclosure. The data table 630 corresponds to DC combination R1001—of data record 621DR of data table 620. That is, the data table 630 provides source data to populate the data field 623 and field 624 of the data table 620. For the other DC combination numbers (including R1002 and R1003), there would be provided separate data tables akin to data table 630, in accordance with embodiments of the disclosure. As shown, the data table 630 includes a plurality of data records associated with each participant ID. Each data record includes a plurality of fields that contain data of the particular vote (i.e., judgment) of each respective participant in the particular case.

Figure 14:
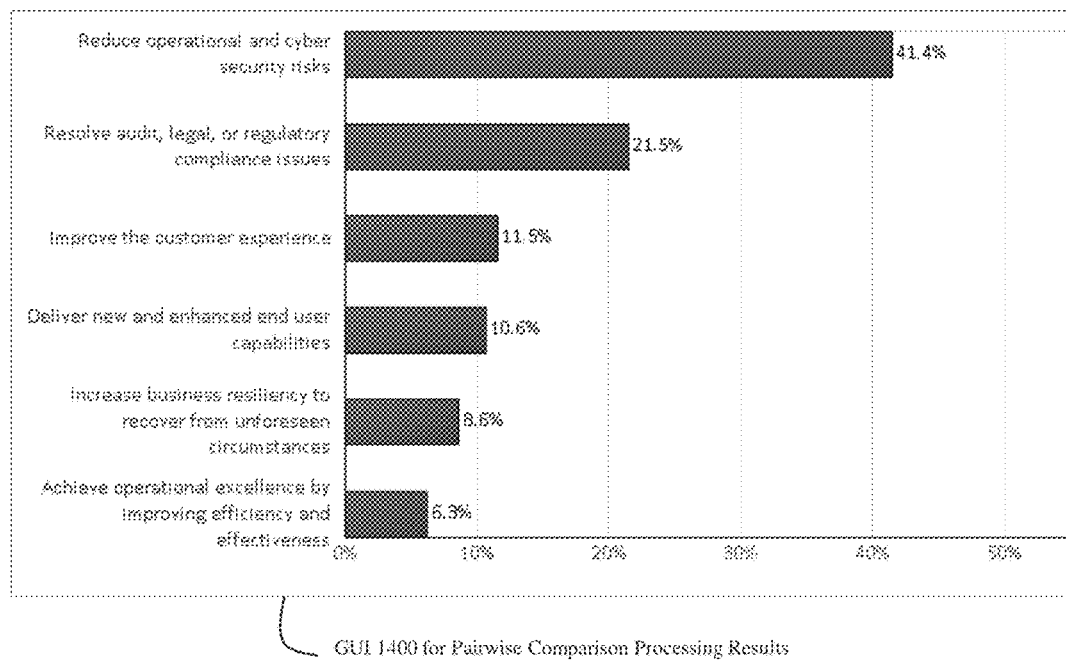
FIG. 14 shows a graphical user interface (GUI 1400) showing the results of the pairwise comparison processing, in accordance with at least one embodiment of the disclosure.

FIG. 14 shows a DPS facilitator graphical user interface (GUI 1400) showing the results of the pairwise comparison processing, in accordance with at least one embodiment of the disclosure. Such results may be graphically illustrated using a bar graph, as shown, or using other graphical representation.

Figure 15:
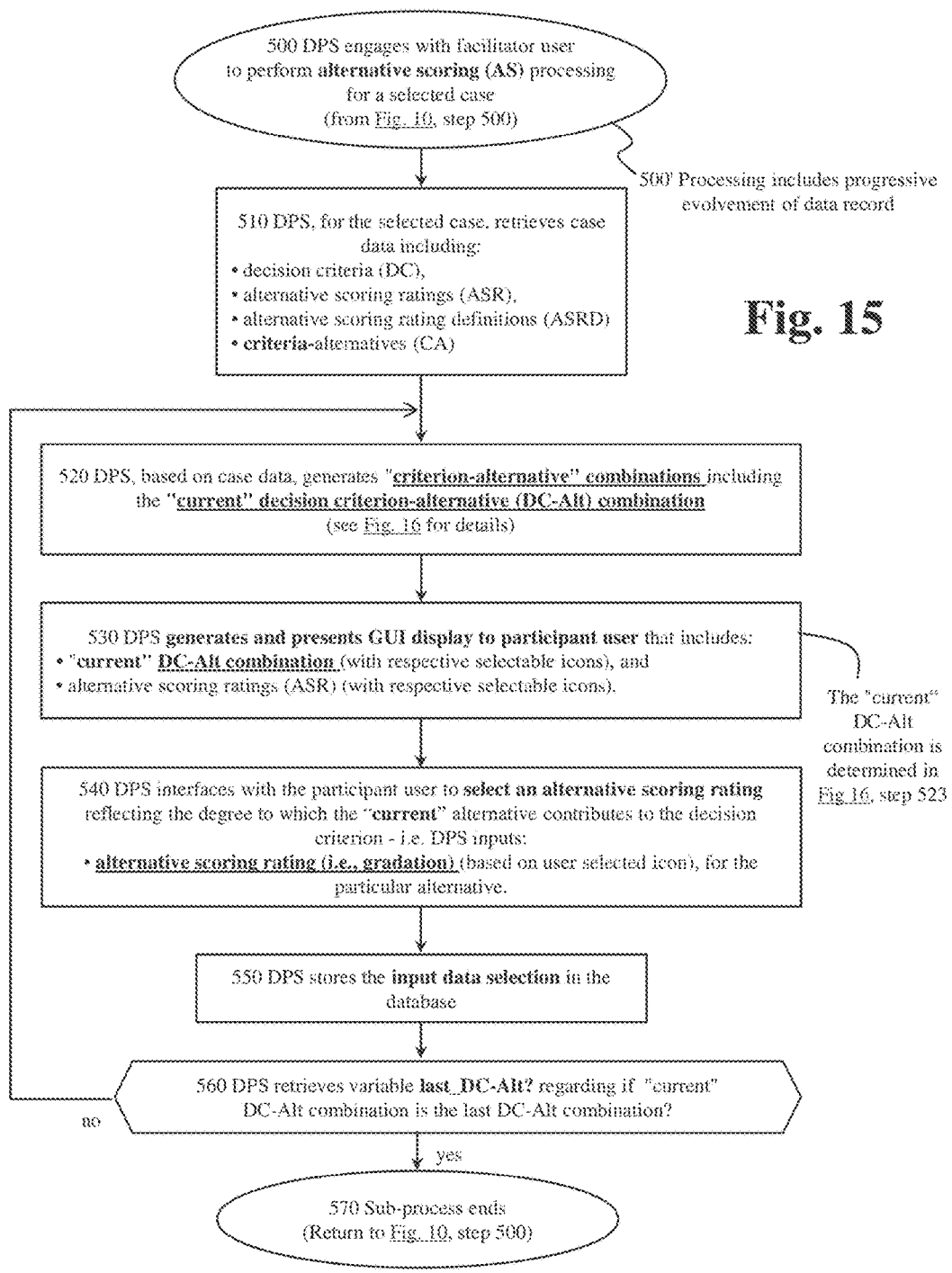
FIG. 15 is a flowchart showing in further detail the "DPS engages with facilitator user to perform alternative scoring processing for selected case" (step 500 of FIG. 10), in accordance with at least one embodiment of the disclosure.
Figure 17:
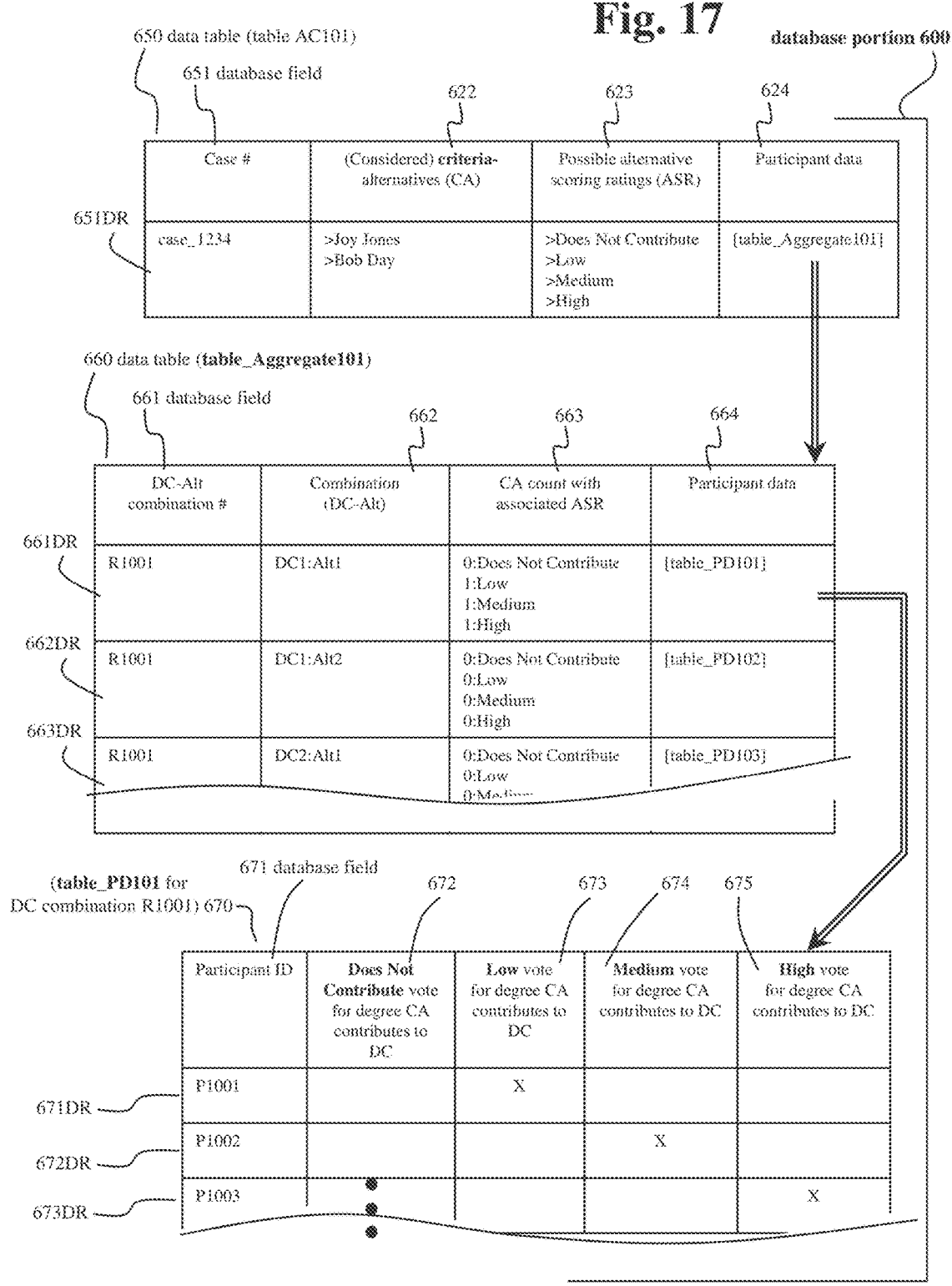
FIG. 17 is a diagram showing further database structure of the database portion, in accordance with at least one embodiment of the disclosure.

FIG. 15 is a flowchart showing in further detail the "DPS engages with facilitator user to perform alternative scoring processing for a selected case" step 500 of FIG. 10, in accordance with at least one embodiment of the disclosure. As reflected at 500', the processing of step 500 includes the progressive evolvement of data records as shown in FIG. 17. As shown, the processing of FIG. 15 starts in step 500 and passes to step 510. In step 510, the "DPS retrieves case data, for the particular case that has been selected by the facilitator user". In particular, in this example, the case data includes decision criteria (DC) data, alternative scoring ratings (ASR) data, alternative scoring rating definitions (ASRD) data, and criteria-alternatives (CA) data. Accordingly, in summary, the DPS retrieves various data utilized in the alternative scoring processing. After step 510, the process passes to step 520.

In step 520, the "DPS, based on case data, generates various decision criteria-alternative combinations". Further details (of the processing of step 520) are described below with reference to FIG. 16. In particular, the processing of step 520 provides the "current" decision criterion-alternative (DC-Alt) combination. After the processing of step 520, the data processing passes to step 530.

In step 530, the "DPS generates and presents a GUI display to the participant user. The GUI display includes the "current" DC-Alt combination, with respective selectable icons associated with each alternative. Additionally, the GUI presents alternative scoring ratings (ASR) (with respective selectable icons) that reflect a matter of degree to which the particular user deems the particular alternative relevant, for example, to the criteria to which the particular alternative is being compared. Accordingly, step 530 provides generation and display of such data to the participant user. As otherwise described herein, each alternative may be respectively presented to the participant user in conjunction with each decision criterion.

Relatedly, the processing of step 540 of FIG. 15 reflects the input of an ASR selection. Specifically, in step 540, the "DPS interfaces with the participant user to select an alternative scoring rating reflecting the degree to which the "current" alternative contributes to the decision criterion. In other words, the DPS inputs an alternative scoring rating, or in other words a decision gradation, for the particular alternative. The input of such data may be performed utilizing a suitable icon and/or multiple icons. After the processing of step 540, the process passes to step 550. In step 550, the DPS stores the input data selection (input in step 540) in a database. Specifically, such data may be stored in data table 670 of FIG. 17. After the processing of step 550, the process performed by the DPS passes to step 560.

In step 560, the DPS, illustratively, retrieves a variable last_DC-Alt? regarding if the "current" DC-Alt combination is the last DC-Alt combination. If the system determines a "no" determination in step 560, the processing passes back to step 520. That is, such "no" determination is indicative that the current DC-Alt combination is not the last DC-Alt combination—so that further processing is required so as to process all the DC-Alt combinations.

On the other hand, the system may determine "yes" in step 560 (i.e., the current DC-Alt combination is indeed the last DC-Alt combination). As a result, the process passes to step 570. In step 570, the sub-process of FIG. 15 terminates—with the return of the processing to FIG. 10.

FIG. 16 is a flowchart showing "DPS, based on case data, generates "decision criteria-alternative" combinations including the "next" decision criterion-alternative (DC-Alt) combination" step 520 of FIG. 15, in accordance with at least one embodiment of the disclosure. Accordingly, the functionality provided by the processing of FIG. 15 in step 520 is to generate various decision criteria-alternative combinations and respectively pass back such data to the higher-level processing of FIG. 15.

As shown in FIG. 16, the process starts in step 520 and passes to step 521. In step 521, the DPS retrieves the "current" decision criteria (DC) from the plurality of decision criteria associated with the case. Then, in step 522, the DPS retrieves the "current" alternative from the alternatives associated with the case. The current decision criterion retrieved in step 521 and the current alternative data retrieved in step 522 are determined (as described below) in the processing identified at 524'.

After step 522, the process passes to step 523. In step 523, the DPS utilizes the retrieved current decision criterion (DC) and the retrieved current alternative (Alt) so as to generate a DC-Alt combination. Specifically, utilizing the current decision criterion and current alternative, the DPS generates the "current" criteria-alternative combination and saves such generated data in storage. That is, as reflected at 523', in step 523 the DPS generates and saves the data that is later used in step 530 of FIG. 14. In general, as reflected at 521', the processing of steps 521, 522, 523 retrieves "current" data for processing of such data upon return to FIG. 15, and specifically in step 530.

After the processing of step 523 of FIG. 16, the process passes to step 524. More generally, the processing block identified as 524' shows processing to determine if there will be a next iteration, and if so, the parameters of such next iteration. Such "next" iteration is distinct from the "current" iteration (i.e., the current iteration with current values will be performed upon return to the processing of FIG. 14) even if the processing of step 524' determines that there will not be a further iteration (after the current iteration).

As shown in FIG. 16, in step 524 the DPS determines if the "current" alternative is the last alternative. In other words, have all the alternatives been considered for the particular decision criteria. To explain further, in this embodiment, each alternative is presented, respectively, with a particular decision criteria-prior to the processing moving on to the next decision criteria. However, the systems and methods of the disclosure are not limited to such particular processing, and the particular manner in which processing is progressed through the various decision criteria-alternative permutations may be varied as desired.

The system may determine in step 524 that the current alternative is not the last alternative. That is, a "no" determination is returned in the determination processing of step 524. As a result, the process passes from step 524 to step 525. In step 525, the DPS retrieves a next alternative and assigns such next alternative as the "current" alternative (for the next iteration). As reflected at 525', given the methodology of the processing of FIG. 16, the "current" decision criteria (DC) is already saved in memory-since it is the same DC that was utilized in the last iteration of the processing of FIG. 16. Thus, step 525 reflects that both a current DC and a current alternative have been attained. As a result, the process passes from step 525 to step 529. In step 529, the sub-process ends with a return to FIG. 15 step 530.

On the other hand, it may be determined in the determination processing of step 524 that the "current" alternative is indeed the last alternative for the particular decision criteria. In other words, step 524 determines that all the alternatives under consideration have been presented to the user in combination with the particular decision criteria. As a result, a "yes" is determined in step 524—and the process passes to step 526. Advancement of the processing to step 526 reflects processing to determine a new "current" decision criteria. Thus, in step 526, the DPS determines whether or not the "current" decision criteria is the last criteria. In other words, have all the decision criteria been considered. It may be determined in step 526 that the current decision criterion is not the last decision criteria. Accordingly, the process passes from step 526 on to step 528.

In step 528, the DPS retrieves the next decision criteria and assigns such next decision criteria as the "current" DC (for the next iteration). Relatedly, in step 528', the DPS retrieves what may be characterized as a first alternative that will be considered against the now "current" decision criteria. This first alternative is tagged as the "current" alternative (for the next iteration). Thereafter, the processing again passes to step 529. In step 529, with a current DC and a current alternative in store, the processing returns to FIG. 15.

On the other hand, it may be determined in the processing of step 526, that the "current" DC is indeed the last criteria. That is, a determination is made by the system that all decision criteria have been considered. As a result a "yes" determination is achieved in step 526—and the process passes to step 527. In step 527, the system toggles a variable such that a "yes" determination will be found in the processing of step 560 (FIG. 15). More specifically, the DPS assigns the variable last_DC-Alt? as "yes"—regarding if the "current" DC-Alt combination is the last DC-Alt combination. With such determination in store, the processing passes to step 529 of FIG. 16. Processing then continues as described above.

FIG. 17 is a diagram showing further database structure of the database portion 600, in accordance with at least one embodiment of the disclosure. As described above with reference to FIG. 13, data table 610 includes database field 617. Database field 617 contains data referencing the further data table shown in FIG. 17. As noted above, such data in database field 617 may be in the form of a suitable pointer in the environment of a relational database, for example.

Accordingly, FIG. 17 includes a data table 650 (i.e., the table AC101 as referenced in the data field 617 of the data table 610 of FIG. 13). The data table 650 contains various data associated with alternative scoring processing of the disclosure. Specifically, the data of FIG. 17 results from the processing of, in particular, steps 520, 530 and 540 of FIG. 15. Relatedly, the storage of data in step 550 of FIG. 15 may be constituted by the storage of data in the data structure of FIG. 17.

The data table 650 includes a data record 651DR that corresponds to a particular case. That is, the data record 651DR holds data corresponding to one case in which alternative scoring is performed. As shown in FIG. 17, such data record may be indexed in a suitable manner, such as referenced by the same case number (here case_1234) as is displayed in database field 611 of the data table 610 (FIG. 13).

The data table 650 includes a plurality of other database fields associated with alternative scoring processing. Database field 651 is populated with the case number, as described above. Database field 622 is populated with data of the criteria-alternatives. In this illustrative example, the criteria-alternatives include participant's Joy Jones and Bob Day. It is these criteria-alternatives in the field 622 that will be considered against the decision criteria shown in data field 614 (of the data table 610 of FIG. 13).

Database field 623 is populated with data of alternative scoring ratings of which a participant user may choose in performing alternative scoring processing. In this illustrative example, possible alternative scoring ratings provided include "Does Not Contribute", Low, Medium, and High. In accordance with embodiments of the disclosure, the participant user utilizes such ratings so as to convey a rating of a particular criteria-alternative vis-á-vis particular decision criteria.

The data table 650 of FIG. 17 further includes database field 624 that includes participant data. Database field 624 contains data referencing a yet further data table (i.e., table_Aggregate101). Such data in database field 624 may be in the form of a suitable pointer in the environment of a relational database, for example.

Relatedly, FIG. 17 shows such data table (table_Aggregate101) as data table 660, in accordance with at least one embodiment of the disclosure. Data table 660 includes a plurality of data records 661DR, 662DR, and 663DR. Each of such data records respectively correspond to a particular decision criterion—alternative (DC-Alt) combination. Database field 662 is populated with the particular decision criteria/criteria-alternative combination. Such data may be represented as indicia (as shown in the field 662) that is in turn associated with the actual decision criteria/criteria-alternatives. Alternatively, the field 662 in the data table 660 may be populated with the actual decision criteria—alternative. Note that the content of field 662 shows or reflects data records in which a particular decision criteria (DC1) is being considered respectively against three alternatives (Alt1, Alt2, Alt3).

As shown in FIG. 17, the data table 660 further includes database field 663. Database field 663 is populated with data regarding the judgments for a particular considered alternative for the corresponding combination shown in field 662.

The data table 650 of FIG. 17 further includes database field 664 that includes participant data relating to alternative scoring processing. Database field 664 contains data referencing a yet further data table, e.g. table_PD101. Such data in database field 664 may be in the form of a suitable pointer in the environment of a relational database, for example.

Such illustrative referenced table_PD101 is constituted by data table 670 of FIG. 17. Such data table 670 contains data of the judgments for DC/Alt combination number R1001 (of table 660), in accordance with at least one embodiment of the disclosure. The other DC-Alt combination numbers (shown in field 661 of table 660) may be associated with respective participant data tables akin to table 670.

Illustrative data table 670 includes a plurality of records 671DR, 672DR, 673DR for respective participants. Further, the data table 670 includes various database fields. Database field 671 is populated with data identifying a particular participant. Database fields 672, 673, 674, and 675 are populated with actual judgment content associated with judgment of the particular participant user. That is, for example, for the particular DC-Alt combination for which table 670 represents—the participant with ID P1001 opted for a "low" vote or judgment for the degree that the particular criteria-alternative, i.e. considered alternative, contributed to the particular decision criteria. Accordingly, table 670 provides the source data utilized to populate field 663 of table 660 (as shown in FIG. 17).

In accord with embodiments of the disclosure, various aspects of the systems and methods of the disclosure are described above relating to the input of data by a facilitator user to perform one or more cases for pairwise comparison processing and/or alternative scoring processing; the engagement of participant users to participate in pairwise comparison processing and/or alternative scoring processing, as well as the generation and display of data resulting from such engagement processing. In particular, various details are described above regarding the innovative facilitator interface of the disclosure and the illustrative GUIs of FIG. 3 and FIG. 4.

Figure 18:
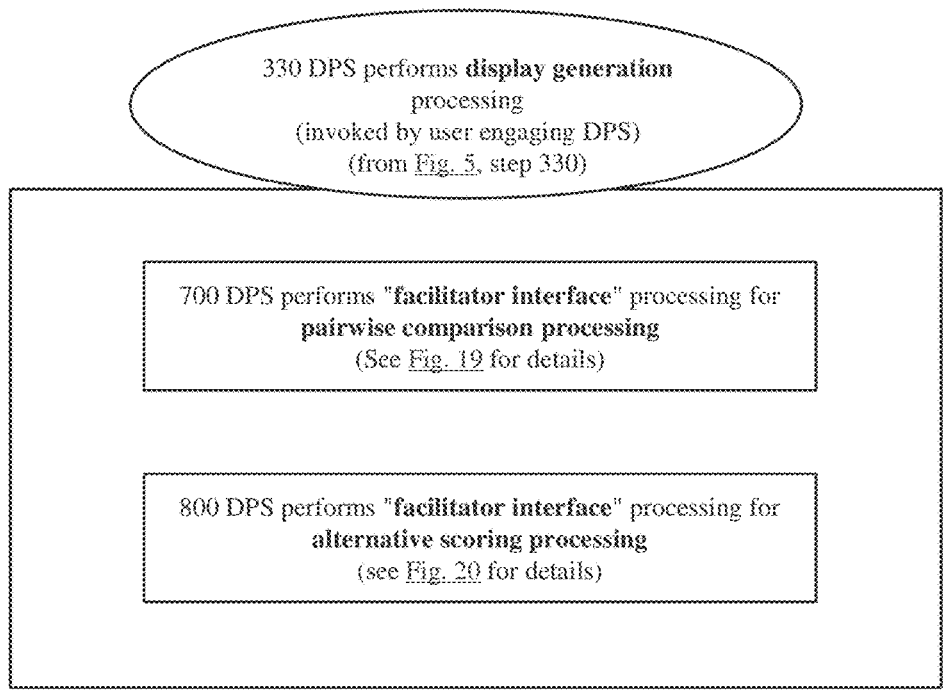
FIG. 18 is a flowchart showing in further detail "DPS performs display generation processing" (step 330 of FIG. 5), in accordance with at least one embodiment of the disclosure.

Relatedly, FIG. 18 is a flowchart showing in further detail "DPS performs display generation processing" step 330 of FIG. 5, in accordance with at least one embodiment of the disclosure. The processing step 330 may be invoked by a user engaging the DPS. The processing of step 330 may include the illustrated step 700 and/or step 800.

In step 700, the DPS performs facilitator interface processing for pairwise comparison processing. Further details are described below with reference to FIG. 19. In an embodiment, it is the processing of step 700 in part that renders the GUI of FIG. 3.

In step 800, the DPS performs facilitator interface processing for alternative scoring processing. Further details are described below with reference to FIG. 20. In an embodiment, it is the processing of step 800 in part that renders the GUI of FIG. 4.

Figure 19:
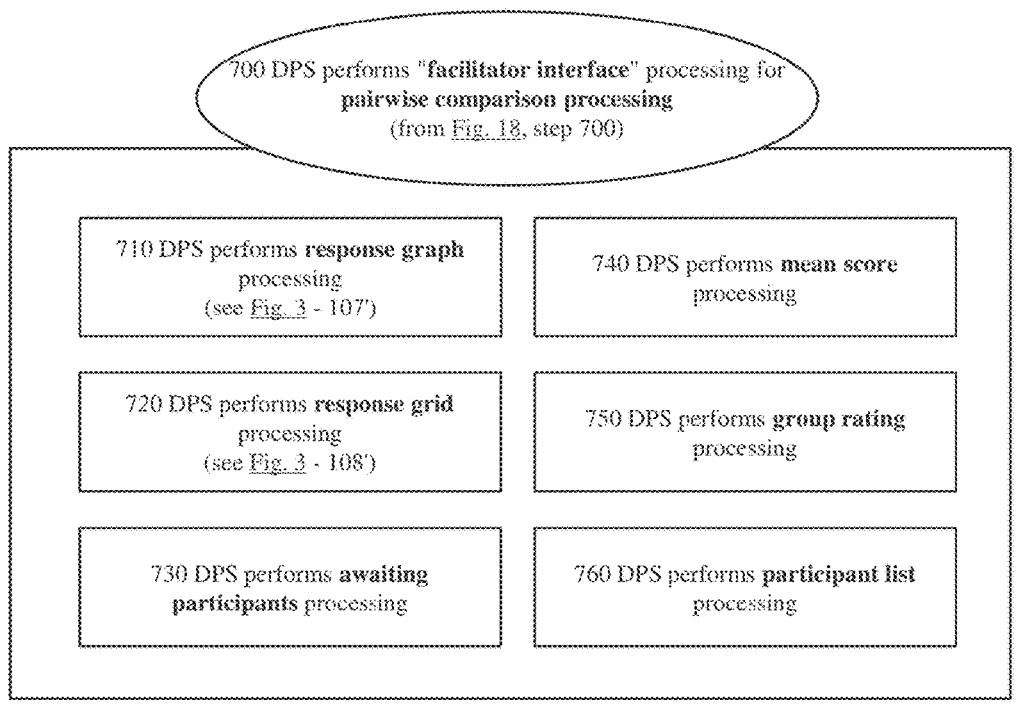
FIG. 19 is a flowchart showing in further detail "DPS performs facilitator interface processing for pairwise comparison processing" (step 700 of FIG. 18), in accordance with at least one embodiment of the disclosure.

FIG. 19 is a flowchart showing in further detail "DPS performs facilitator interface processing for pairwise comparison processing" step 700 of FIG. 18, in accordance with at least one embodiment of the disclosure. The processing of step 700 may be constituted by a variety of processing as shown in FIG. 19. Such processing of FIG. 19 need not be performed in any particular linear manner and/or in any particular order.

Step 710 of FIG. 19 shows the DPS may perform response graph processing. Step 720 of FIG. 19 shows the DPS may perform response grid processing. Further details are described below and otherwise herein.

Various other processing may be performed by the DPS. In step 730, the DPS performs awaiting participants processing. In step 740, the DPS performs mean score processing. In step 750, the DPS performs group rating processing. In step 760, the DPS performs participant list processing. Various further details of such processing are described below with further reference to the GUI of FIG. 3, in accordance with at least one embodiment of the disclosure.

As described above, the GUI 100 of FIG. 3 provides various "pairwise comparison" processing functionality to a facilitator user that is provided by the processing performed by the DPS 10. In general, the DPS performs various processing so as to support the innovative facilitator interface as illustratively shown in FIG. 3, as well as FIG. 4.

In addition to the various features of the FIG. 3 GUI 100, as described above, the processing of the disclosure provides additional features to perform synthesis of the various diverse data collected in operation of the DPS. The example of the GUI of FIG. 3 illustrates decision criteria 119 and decision criteria 120.

In accordance with at least one embodiment, functionality provided includes the generation and display of a group rating. That is, the GUI 100 of FIG. 3 includes checkbox icon 104. When checked, the DPS generates and displays a group rating 104'. In accordance with at least one embodiment of the disclosure, for example, the group rating may be characterized as a group result expressed in verbal terms. In the example shown, "reduce operational and cyber security risks" is "Moderately more important" then "deliver new and enhanced and user capabilities".

The GUI 100 also includes checkbox icon 105. When checked, the DPS displays an arithmetic mean score as shown at 105'. In general, the checkbox icon 105 may prompt the generation of mathematical relationship information that may be helpful to understand and synthesize information. For example, a scoring regime may be utilized by the system that is constituted by: (Scoring: Slightly: −3/+3, Moderately: −5/5; Strongly: −7/+7; Extremely: −9/9). In other words, for example, an observed response of "Slightly" for decision criteria 119 (FIG. 3) from a particular participant user will result, by the processing of the DPS, in a −3 value that reflects a favor toward the particular decision criteria 119. In the example of FIG. 3, all judgments were in favor of decision criteria 119. Utilizing the facilitator interface of the disclosure, the DPS effectively and efficiently, from a processing perspective in particular, conveys a synthesis of such varied information by providing the data 105'. Accordingly, in this example: 2 responses×(−3)+4 responses×(−5)+1 response×(−7)=(−33)/7=−4.71 (as is reflected at 105'). Accordingly, less processing and data transfer are needed to provide the novel functionality and presentation of desired content—as compared to known systems.

The facilitator GUI 100 also includes checkbox icon 106. When such is checked, the DPS displays a list of participants. Relatedly, in accord with one embodiment of the disclosure, when checkbox icon 103 is checked along with checkbox icon 106 being checked, the DPS displays a list of participants—including a differentiator for those participants who have not yet engaged with the particular case (i.e., have not submitted the responses). Such differentiator might be color coding or some other mechanism and/or indicia.

The facilitator GUI 100 also includes checkbox icon 107. Upon the checkbox icon 107 being checked, the DPS displays a response graph in bar chart format as reflected at 107' of FIG. 3. Such functionality provides highly diverse data in a very effective and efficient manner, from a processing perspective in particular.

The facilitator GUI also includes checkbox icon 108. Upon the checkbox icon 108 being checked, the DPS displays what is herein characterized as a response grid that shows the responses by each participant. Such functionality is illustrated in FIG. 3 at 108'. Such functionality serves to provide a substantial amount of information in a highly efficient and effective manner (from a processing perspective in particular), due to the processing of the DPS. As shown, in this illustrative example, no participants deemed that the decision criteria 120 was more important than the decision criteria 119.

As shown in FIG. 3, content 109 may be provided to further illustrate the nature of the data generated in the facilitator GUI 100.

The GUI 100 further includes checkbox icon 110 (i.e., a "lock" icon). When checkbox icon 110 is checked, the "show" options (checkbox icons 103-108) stay selected (i.e., locked) when moving to the previous pairwise comparison and/or remain the same when moving to the next pairwise comparison. That is, in the latter embodiment, some checkbox icons may be checked and some checkbox icons may not be checked—and the icon 110 allows such to remain unchanged when moving to a previous or next pairwise comparison, in accordance with one embodiment.

The GUI 100 also includes button 111, in accordance with one embodiment. The button 111 may toggle between selected and not selected. The status of such toggle may be conveyed to the user by varied coloration and/or "grey-out" of the button 111. The button 111, when selected, provides functionality to stop the DPS from checking for new judgments that have been entered, in accordance with one embodiment. For example, this functionality might be utilized when all scores or a desired number of scores have been entered. Such may be desirable in conjunction with discussions regarding a particular case.

The GUI 100 also includes button 112 that reflects whether the particular decision model is open or closed for pairwise comparison (i.e., for the criteria prioritization of the disclosure). Accordingly, such button 112 may provide functionality to provide the ability to toggle the criteria prioritization state—between a first state in which pairwise processing is not provided for the particular case vis-á-vis a second state in which pairwise processing is provided for the particular case.

The GUI 100 is also provided with button 113 denoted "reset scores". The button 113 provides functionality to clear all pairwise comparison judgments from the particular model (i.e., from the particular case). Further, the GUI 100 includes button 114. In accord with an embodiment, the button 114 re-calculates the weighting factors of the various criteria based on all the judgments received. Further, the GUI 100 includes button 115. Button 115 is provided to refresh the screen (of the GUI 100) if desired and/or necessary. Further, the GUI 100 includes button 116. The button 116 provides functionality to return to the previous pairwise comparison. In accord with one embodiment, the button 116 may also serve to automatically save data as viewed at a particular point in time. Button 117 may provide functionality to advance to a next pairwise comparison. Button 117 may also invoke a save process if desired. Lastly, button 118 of the GUI 100 may be provided to save judgments, as displayed on the GUI 100, at a particular point in time, as may be desired.

Figure 20:
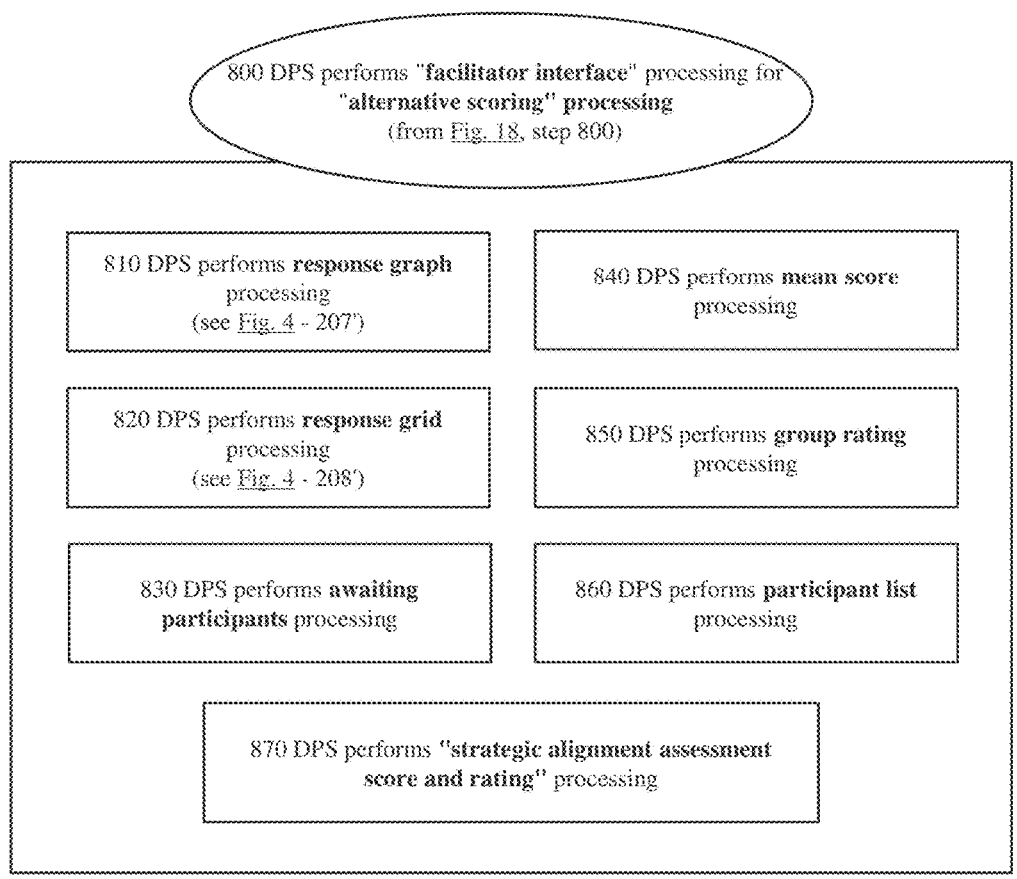
FIG. 20 is a flowchart showing in further detail "DPS performs facilitator interface processing for alternative scoring processing" (step 800 of FIG. 18), in accordance with at least one embodiment of the disclosure.

FIG. 20 is a flowchart showing in further detail "DPS performs facilitator interface processing for alternative scoring processing" step 800 of FIG. 18, in accordance with at least one embodiment of the disclosure. The processing of step 800 may be constituted by a variety of processing as shown in FIG. 20. Such processing of FIG. 20 need not be performed in any particular linear manner and/or in any particular order.

Step 810 of FIG. 20 shows the DPS may perform response graph processing. Step 820 FIG. 20 shows the DPS may perform response grid processing. Further details are described below and otherwise herein.

Various other processing may be performed by the DPS. In step 830, the DPS performs awaiting participants processing. In step 840, the DPS performs mean score processing. In step 850, the DPS performs group rating processing. In step 860, the DPS performs participant list processing. In step 870, the DPS performs "strategic alignment assessment score and rating" processing. Various further details of such processing are described below with further reference to the GUI of FIG. 4, in accordance with at least one embodiment of the disclosure.

In general, the GUI 200 of FIG. 4 provides various alternative scoring processing functionality to a facilitator user that is provided by the processing performed by the DPS 10. Various aspects of functionality are described above. Additional functionality is described below.

Processing performed by the DPS further includes providing group rating functionality. Such group rating functionality may be invoked by a facilitator user checking the checkbox icon 204 of FIG. 4. When checked, the checkbox icon 204 displays a group rating 204', which may be characterized as a group result expressed in verbal terms. In this example, the "Build an Enterprise Disaster Recovery (EDR) Capability" alternative scored "Medium-High" when evaluated against the "Reduce operational and cyber security risks" criterion.

The facilitator GUI 200 further includes checkbox icon 205. When this icon is checked, the DPS displays the arithmetic mean score in accord with a predetermined regime such as: (Scoring: Does Not Contribute: 0; Low: 1; Medium: 2; High: 3). In this example at graphic 208': 2 mediums×(2)+5 highs×(3)=(193)/7=2.71. Such is displayed and illustrated at 205' in FIG. 4.

The facilitator GUI 200 further includes checkbox icon 206. In accordance with one embodiment, when this icon is checked, the system displays a color-coded list (or other indicative indicia) of participants (206')—with color coding indicating participants who have contributed their judgments vis-á-vis participants who have not contributed their judgments.

The facilitator GUI 200 further includes checkbox icon 207. When this icon is checked, the system displays the response graph in bar chart format, as shown at 207' in FIG. 4.

The facilitator GUI 200 further includes checkbox icon 208. When this icon is checked, displays the response grid which shows the responses by each participant, as shown at 208' in FIG. 4.

The facilitator GUI 200 further includes checkbox icon 209, (i.e., characterized as an "alignment score"). When this icon 209 is checked, the DPS displays the total weighted score for the particular alternative—as indicated at 209' of FIG. 4.

The GUI 200 may include a variety of content related to the data that is presented on such GUI. Illustratively, the GUI 200 may include content 210 that reflects that scoring of the alternative "Build an Enterprise Disaster Recovery (EDR) Capability" relates to the degree to which it contributes to the criterion "Reduce operational and cyber security risks".

Functionality may be provided whereby documents and/or other media are associated with the GUI 200 and/or icons disposed on the GUI 200. For example, an icon 211, here illustratively in the form of a paperclip, when clicked, will display an uploaded document associated with the particular alternative.

The GUI further includes checkbox icon 212 (i.e., a "lock" icon). When checkbox icon 212 is checked, the "show" options (checkbox items 203-209) stay selected (i.e., locked) when moving to the previous or next criterion or maintain some other status, in accordance with at least one embodiment of the disclosure.

The GUI 200 provides further functionality, in accordance with at least one embodiment of the disclosure. A button 213 may be provided to stop the system from checking for new judgments that have been entered. Such may address a possible problem of the GUI 200 "pulsing" as additional participants contribute to the data associated with the case. Such "pulsing" provides a technical solution to such pulsing problem (and is also addressed by checkbox icon 110 in the processing of the facilitator GUI 100 of FIG. 3). For example, this functionality may be used when all scores or sufficient number of scores have been entered and the team is having a discussion, in accordance with at least one embodiment of the disclosure.

The GUI 200 provides further functionality, in accordance with at least one embodiment of the disclosure. The GUI 200 further includes button 214 that reflects whether the decision model is open or closed for alternative scoring, and that can be used to change the status of the "Alternative Scoring State" by clicking it. The GUI 200 further includes button 215 that will clear all alternative scores from the model. The GUI 200 further includes button 216 that will clear the scores for the current alternatives from the model. The GUI 200 further includes button 217 that recalculates the alternative scores based on all of the judgments received. The GUI 200 further includes button 218 to refresh the screen, should it become necessary.

The GUI 200 further includes button 219 to return to the previous alternative, and that also performs a save, in accordance with at least one embodiment of the disclosure. The GUI 200 further includes button 220 to return to the previous criterion for the current alternative, and that also performs a save. The GUI 200 further includes button 221 to go to a specific alternative by selecting from a pop-up list of alternatives. The GUI 200 further includes button 222 to advance to the next criterion for the current alternative, and that also performs a save. The GUI 200 further includes button 223 to advance to the next alternative, and that also performs a save, in accordance with at least one embodiment of the disclosure.

Figure 23:
FIG. 23 is a diagram showing user interface windows related to alternative scoring processing, in accordance with at least one embodiment of the disclosure.
Figure 24:
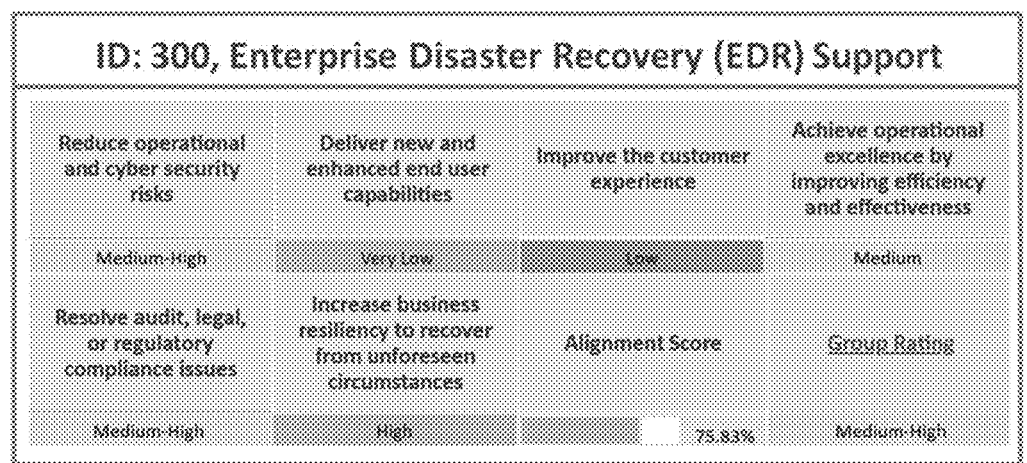
FIG. 24 shows a graphical user interface (GUI 2400') showing results of the alternative scoring processing, in accordance with at least one embodiment of the disclosure.

FIG. 23 is a diagram showing a user interface window 2300 related to alternative scoring processing, in accordance with at least one embodiment of the disclosure. FIG. 24 shows a graphical user interface (GUI 2400') showing the results of the alternative scoring processing, in accordance with at least one embodiment of the disclosure.

Various details of group assessment processing are described throughout this disclosure. The group assessment processing of the disclosure may include, in particular, a decision model. To perform the group assessment processing of the disclosure, in accordance with at least one embodiment of the disclosure, participant users in the group assessment processing must be selected in some manner.

In accordance with at least one aspect of the disclosure, a facilitator user may identify the participant users for a particular decision model and/or for multiple decision models. A facilitator user may identify participant users by selecting them if they are already in the particular system/database being utilized, and/or by adding them to the system/database by entering their name, contact information such as email address and/or other information associated with the particular participant. In other words, participant users (i.e., decision participants) may be added manually—so as to be associated with one or more decision models. In such manner, a facilitator user associates each decision participant with the specific decision model. However, the systems and methods of the disclosure also provide for what is herein characterized as "dynamic team formation." For example, dynamic team formation, may be utilized for situations where a team (associated with the particular decision model) is being formed dynamically and there is a large number of participants, and insufficient time to add the decision participants manually. In such a situation and other similar situations dynamic team formation may be utilized. In dynamic team formation, in accordance with at least one embodiment, the decision participants are provided with a suitable Uniform Resource Locator (URL) (e.g. https://go.dpro1.com/) and a unique session code to access a specific decision model. As described in detail below, the participant users can then self-register and participate. Participation can be done anonymously if so allowed by selection of the facilitator user. In particular, for example, dynamic team formation allows a facilitator user to post an invitation to a decision model on social media for open participation, or to spontaneously facilitate a decision with a large group decision (i.e., with a large number of participants).

Figure 25:
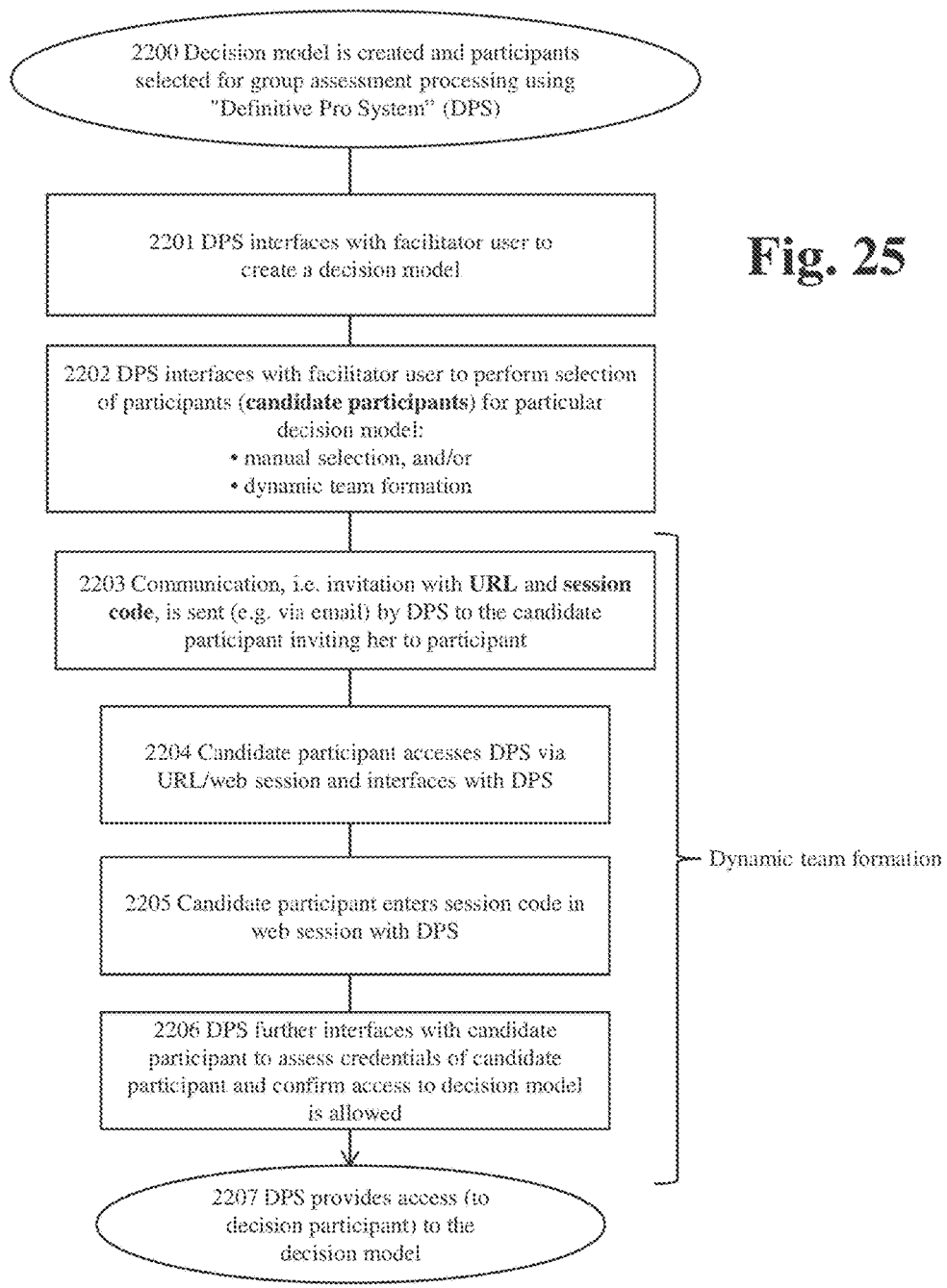
FIG. 25 is a high-level flowchart showing aspects of dynamic team formation, in accordance with at least one embodiment of the disclosure.

FIG. 25 is a high-level flowchart showing aspects of dynamic team formation, in accordance with at least one embodiment of the disclosure. In particular, as reflected at 2200, the processing of FIG. 25 includes creation of a decision model and the selection of participants for group assessment processing utilizing the decision model. In this embodiment, processing is performed by the DPS.

The processing starts in step 2200 and passes to step 2201. In step 2201, the DPS interfaces with a facilitator user to create the decision model, as is described in detail above. Then, in step 2202, the DPS interfaces with the facilitator user to perform manual selection of participant users for the particular decision model. The DPS may also display the unique session code for the decision model. In accord with one aspect of the disclosure, as characterized herein, a "candidate participant" is used to designate a participant who is in process to engage with a particular decision model but has not yet been authorized, authenticated, or otherwise cleared to access and participate in the particular decision model.

Figure 26:
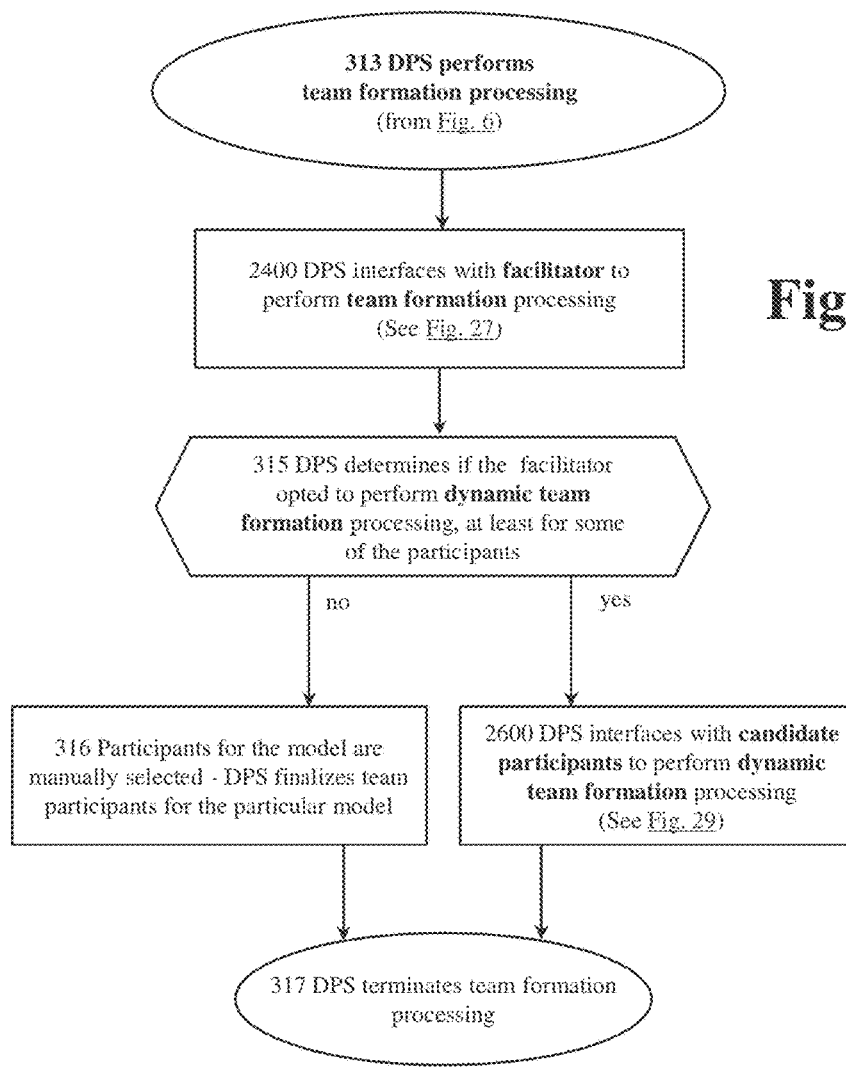
FIG. 26 is a flowchart showing further details of the DPS performs team formation processing (step 313 of FIG. 6), in accordance with at least one embodiment of the disclosure.

Selection of participants may be performed manually as described above. FIG. 26, on the other hand, relates in particular to dynamic team formation of participants for a decision model.

After step 2202 of FIG. 25, the process passes to step 2203. In step 2203, the facilitator user shares the URL and the unique session code with the candidate participants. For example, the URL and unique session code may be emailed, displayed electronically at a conference or posted on social media, for example. Then, in step 2204, the candidate participant accesses the DPS in a web session utilizing the predetermined URL.

In the web session, as reflected in step 2205, the candidate participant enters the session code, which the candidate participant previously received. Then, in step 2206, the DPS further interfaces with the candidate participant to assess credentials of the candidate participant. In particular, the DPS assesses whether the candidate participant is allowed access to the particular decision model. This assessment may be performed based both on attributes of the particular decision model as well as attributes of the particular candidate participant.

After step 2206, the process passes to step 2207. In step 2207, the DPS provides access, to the decision participant, to the particular decision model. Further details of dynamic team formation are described below.

As described above, FIG. 26 is a flowchart showing further details of the DPS performs team formation processing step 313 of FIG. 6, in accordance with at least one embodiment of the disclosure. As shown, the process starts in step 313 and passes to step 2400. In step 2400, the DPS interfaces with the facilitator user to perform team formation processing. Further details are described below with reference to FIG. 27. After the processing step 2400, the process passes to step 315 FIG. 26.

In step 315 of FIG. 26, the DPS determines if the facilitator user opted to perform dynamic team formation processing, for at least some of the desired participants. That is, the DPS provides the option for a facilitator user to manually select some decision participants in conjunction with selecting other participants using the dynamic team formation capabilities of the system. It may be the case that the facilitator user did not opt to perform dynamic team formation for any participants. Accordingly, the process passes from step 315 to step 316. In step 316, participant users for the model are selected manually by the facilitator user. The DPS then finalizes the team participants for the particular decision model.

Then, the process passes to step 317. In step 317, the DPS terminates team formation processing.

On the other hand, in the processing of step 315, the DPS may determine that the facilitator user did indeed opt to perform dynamic team formation for at least some of the participants in the particular decision model. Accordingly, the processing passes to step 2600. In step 2600, the DPS interfaces with candidate participants to perform dynamic team formation processing. Further details are described below with reference to FIG. 29.

After the processing of step 2600, the processing performed by the DPS passes to step 317. As described above, in step 317, the system terminates the information processing.

Figure 27:
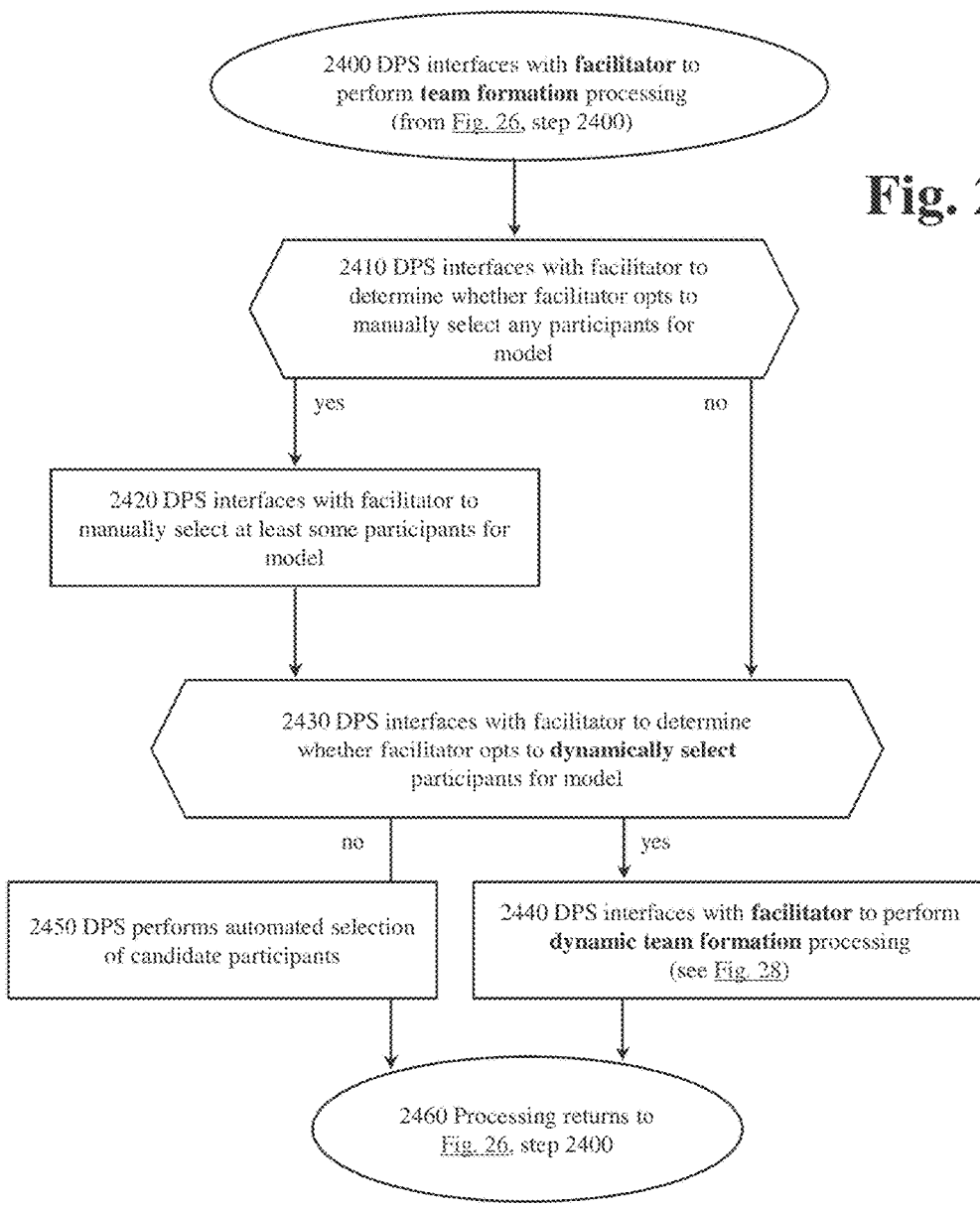
FIG. 27 is a flowchart showing in further detail the DPS interfaces with the facilitator user to perform team formation processing (step 2400 of FIG. 26), in accordance with at least one embodiment of the disclosure.

FIG. 27 is a flowchart showing in further detail the DPS interfaces with the facilitator user to perform team formation processing step 2400 of FIG. 26, in accordance with at least one embodiment of the disclosure. As shown, process starts in step 2400 and passes to step 2410.

In step 2410, the DPS interfaces with the facilitator user to determine whether the facilitator user opts to "manually" select any participants for the particular decision model. If yes, the process passes to step 2420. In step 2420, the DPS interfaces with the facilitator to manually select at least some participants for the model. Then, the process passes to step 2430.

On the other hand, it may be the case that the facilitator user (in step 2410) determines that the facilitator did not opt to manually select any participants for the model. Accordingly, the process passes directly from step 2410 to step 2430. It is appreciated that the linearity illustratively described with reference to FIG. 27, as well as with other processing described herein, is not a requisite. That is, as may be desired, the particular order of processing may be adjusted and/or varied.

In step 2430, the DPS interfaces with the facilitator user to determine whether the facilitator user opts to dynamically select participants for the model. If no, then the processing passes to step 2450. Step 2450 reflects that selection of decision model participants may indeed be performed in some automated manner based on attributes of the particular decision model and/or attributes of particular participants. Accordingly, selection of participants might be performed without manual selection or dynamic team formation processing. After step 2450, the process passes to step 2460.

On the other hand, in step 2430, the DPS determines that the facilitator user did indeed opt to dynamically select participants for the particular decision model. As a result, processing passes to step 2440. In step 2440, the DPS interfaces with the facilitator user to perform dynamic team formation processing. Further details are described below with reference to FIG. 28. After the process of step 2440, the process passes to step 2460.

In step 2460, the processing returns to FIG. 26—and specifically passes to step 317 of FIG. 26 which reflects that the decision participants for the particular decision model have been determined and/or that processing as been initiated so as to determine such decision participants.

Figure 28:
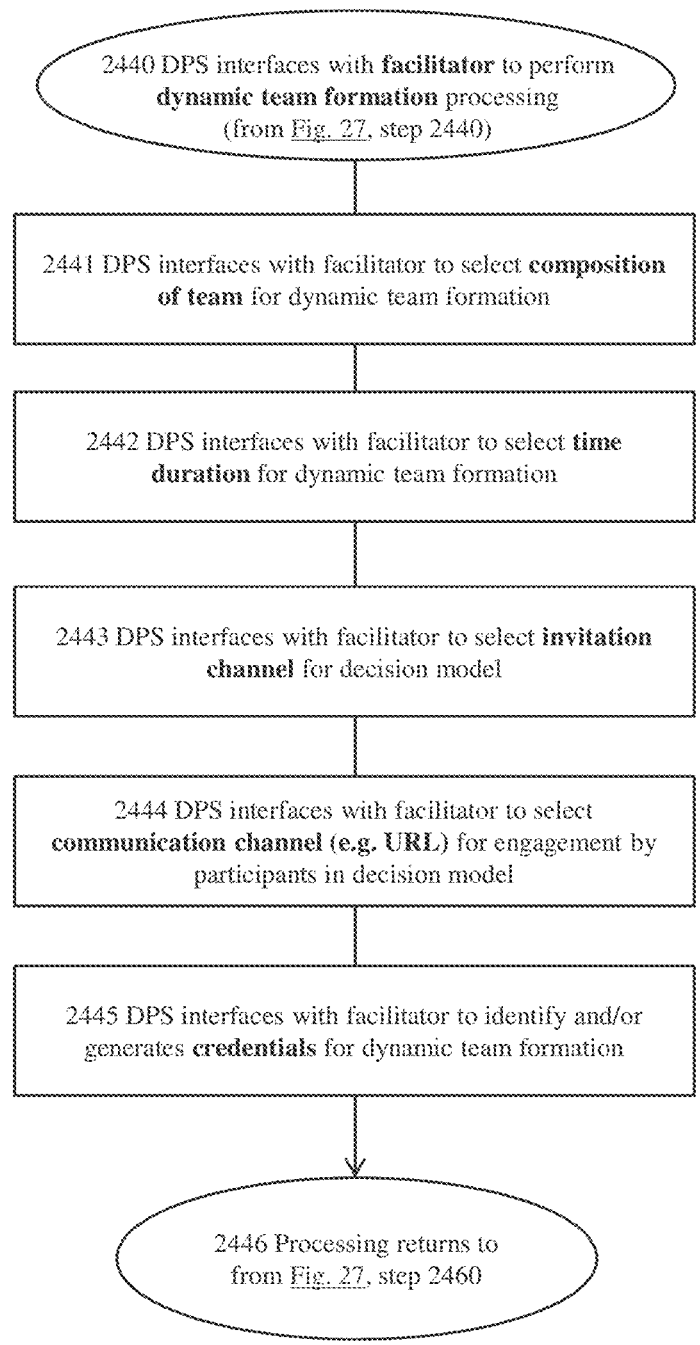
FIG. 28 is a flowchart showing in further detail the DPS interfaces with the facilitator user to perform dynamic team formation processing (step 2440 of FIG. 27), in accordance with at least one embodiment of the disclosure.

FIG. 28 is a flowchart showing in further detail the DPS interfaces with the facilitator user to perform dynamic team formation processing step 2240 of FIG. 27, in accordance with at least one embodiment of the disclosure.

As shown, the process starts in step 2440 and passes to step 2441. In step 2441, the DPS interfaces with the facilitator user to select the composition of the team for dynamic team formation. Composition of a team of participants for a particular decision model might be based on an association with a particular group or organization, for example. On the other hand, or in addition to, composition of a team of participants might be based on certain requisite attributes of persons and/or constrained in a desired manner. Certain requisite attributes might include: age, sex, organization, role, and geographic location, for example. Accordingly, the processing may include tagging or associating a person or a group of persons to a particular decision model based on attributes of those persons. Additionally, such attributes might leverage particular available data reflecting association of a person to a particular group and/or a particular permutation of available data reflecting association of a particular person. Such processing may provide the further technical benefit that available data is effectively leveraged, as opposed to requiring further data to be retrieved and/or input, i.e. thus requiring the transmission and/or input of less data in order to perform processing to attain a desired result and/or provide novel functionality, in accordance with at least one further embodiment of the disclosure.

On the other hand, a particular decision model might simply be open to the public.

After step 2441 of FIG. 28, the process passes to step 2442. In step 2442, the DPS interfaces with the facilitator user to select a time duration for the dynamic team formation. In other words, step 2442 reflects that a time constraint may be imposed to engage with a particular decision model. One or more time-constraints might be imposed for an invited participant to initially engage with a particular decision model and/or for an invited participant to complete a particular decision model, for example.

Then, in step 2443 of FIG. 28, the DPS interfaces with the facilitator user to select an invitation channel for the particular decision model. Such invitation channel relates to the particular mode of communication on which the initial invitation is transmitted to invite a candidate participant to participate in a particular decision model. In accordance with one embodiment, such invitation channel might be via email or may be via web browser from a smartphone, tablet, laptop, desktop computer, or other device, for example. However, other electronic communication channels may be utilized. For example, the invitation channel might be via telephonic transmission, pop-up such as via a smart phone, text messaging, social media (e.g., LinkedIn, Facebook, and Twitter) and/or some other form of electronic communication. Then, after step 2443, the process passes to step 2444.

In step 2444, the DPS interfaces with the facilitator user to select a communication channel for engagement by participants in the decision model. In this processing of step 2444, a facilitator user is provided the ability to control the one or more communication channels through which participants engage with a decision model. One communication channel that might be utilized is via URL so that the participant may engage the DPS via a web browser session over the Internet or other network. For example, an internal network and/or closed network may be an internal intranet, such as a government classified intranet or other intranet. Various attributes of such engagement might be controllable by the facilitator, such control being provided by the DPS. For example, the communication channel afforded to engage with a particular decision model might be limited to a particular internal network and/or closed network. For example, the particular network used may be behind a firewall such that the particular decision model would not be accessible to external candidate participants. After step 2444 of FIG. 28, the process passes to step 2445.

In step 2445, the DPS interfaces with the facilitator user to identify and/or generate credentials for the dynamic team formation. For example, the processing of step 2445 may include the generation of a session code. The DPS may then require the session code for engagement with the particular decision model. However other credentials and/or alternative credentials may be utilized and/or required. After step 2445, the process passes to step 2446. In step 2446, processing returns to FIG. 27.

Figure 29:
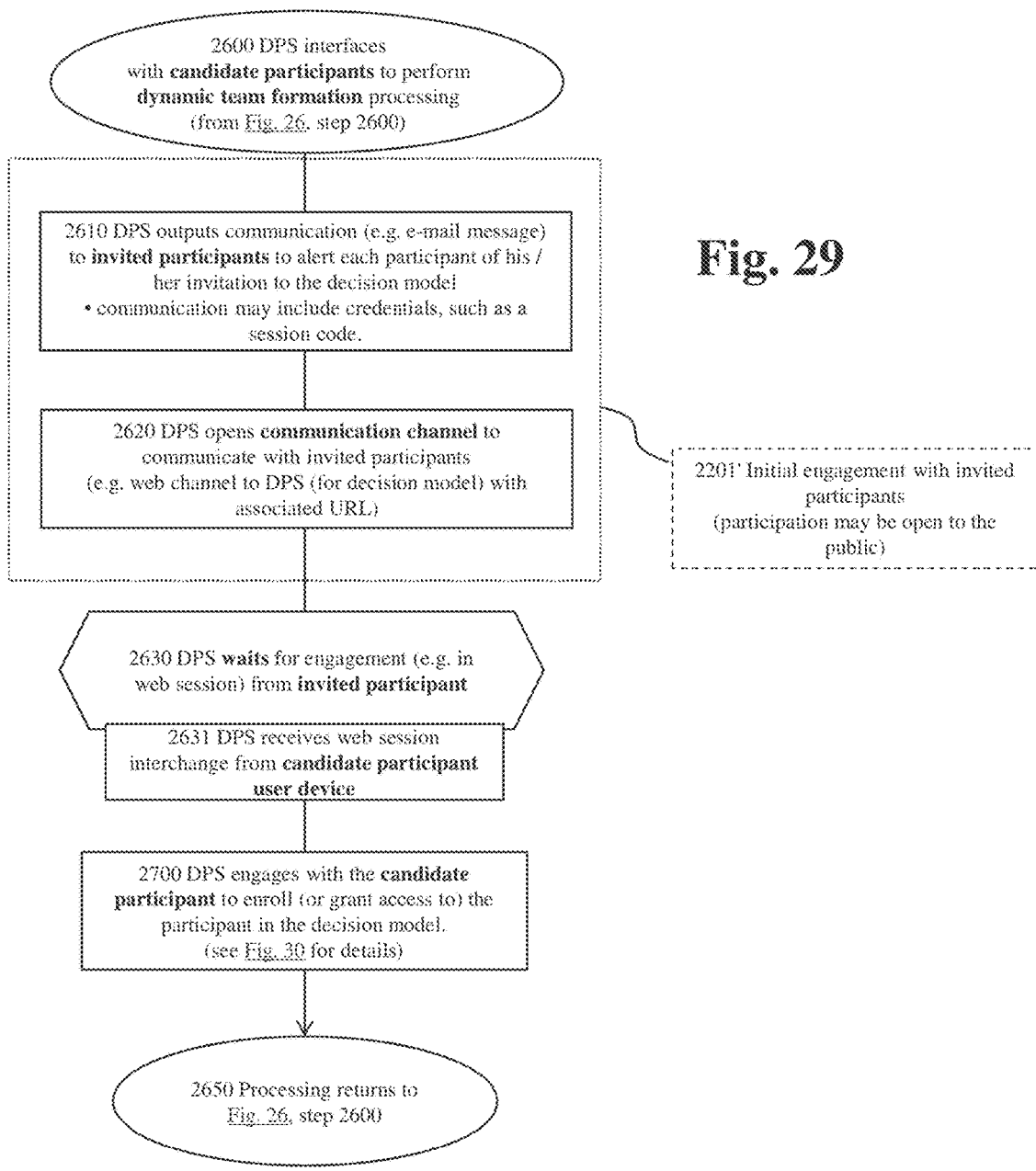
FIG. 29 is a flowchart showing in further detail the DPS interfaces with participants to perform dynamic team formation processing (step 2600 of FIG. 26), in accordance with at least one embodiment of the disclosure.

FIG. 29 is a flowchart showing in further detail the DPS interfaces with participants to perform dynamic team formation processing step 2600 of FIG. 26, in accordance with at least one embodiment of the disclosure. As shown, the process starts in step 2600 and passes to step 2610. In step 2610, the DPS outputs a communication, such as an email message, to invited participants to alert each participant of his or her invitation to the decision model. The communication may include credentials, such as a unique login link for the particular participant user. In accordance with at least one embodiment of the disclosure, email session codes may be used when the public is invited and/or when forming a team dynamically (i.e., when the system does not know who the actual participants are or their email addresses. The system may send a unique login link by email to team members that have been selected manually. By using a unique login link, the system may then know who that participant user is—when the particular participant user engages with the DPS.

Then, in FIG. 29, in step 2620, the DPS opens the communication channel to communicate with the invited participants. For example, such opening of a communication channel might include the activation of a particular URL or web channel to the DPS for the particular decision model—so as to allow a participant to engage with a particular decision model, assuming that any predetermined constraints are satisfied—such as the input of requisite credentials. As reflected in FIG. 29 at 2201', step 2610 and step 2620 reflects initial engagement with invited participants to engage in a particular decision model.

After the processing of step 2620, the process passes to step 2630. In step 2630, the DPS waits for engagement from an invited participant via the activated specified URL or other web link.

Then, step 2631 of FIG. 29 reflects the DPS receives a web session interchange from a user device of the candidate participant. That is, a candidate participant, via a user device of the candidate participant, establishes a web session with the DPS.

Then, in step 2700, the DPS engages with the candidate participant to enroll (or otherwise grant access to) the candidate participant in the particular decision model. Further details are described below with reference to FIG. 30. Then, process passes to step 2650. In step 2650, the processing returns to FIG. 26.

Figure 30:
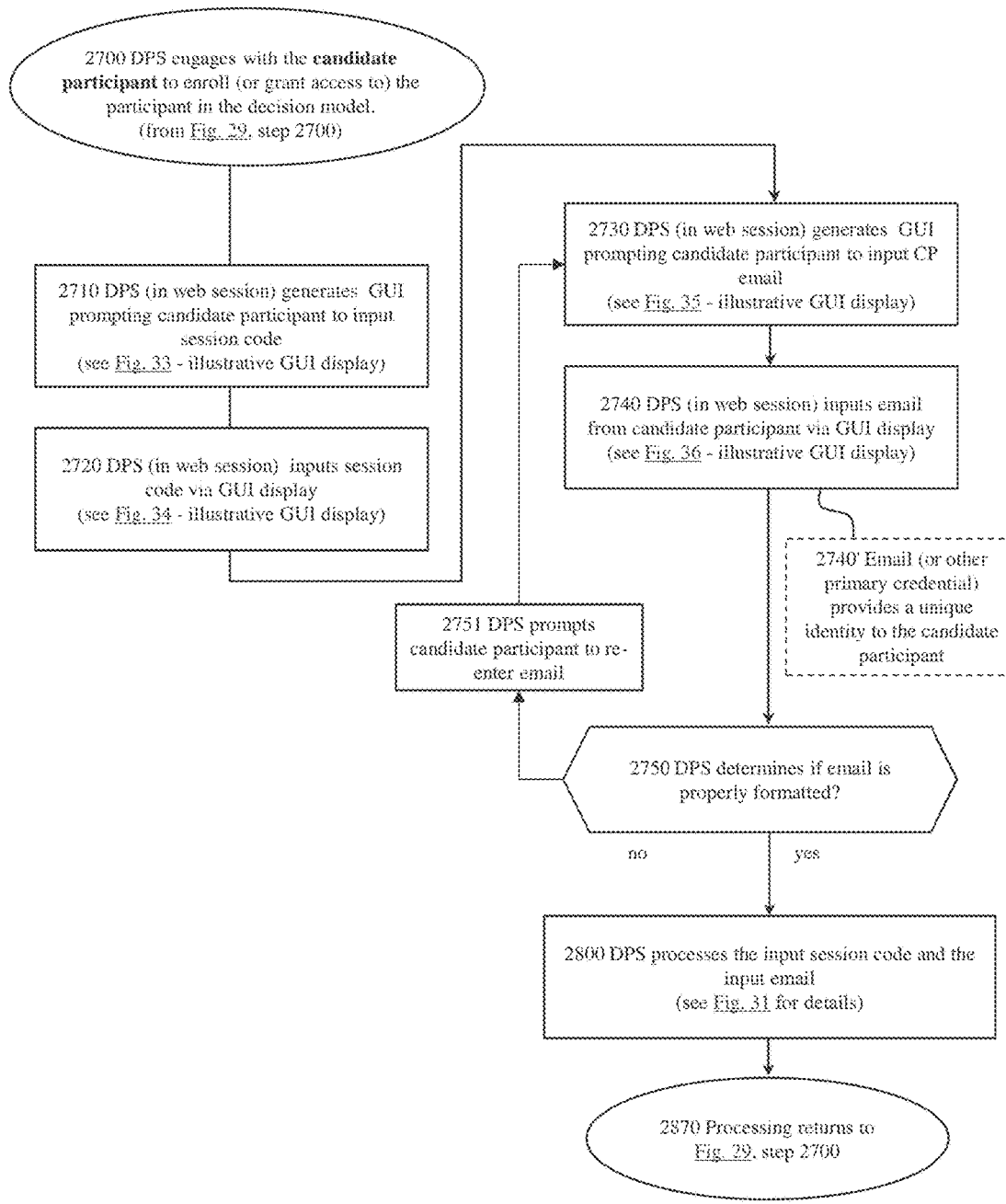
FIG. 30 shows further details of the DPS engages with the candidate participant to enroll (or grant access to) the participant in the decision model (step 2700 of FIG. 29), in accordance with at least one embodiment of the disclosure.

FIG. 30 shows further details of the DPS engages with the candidate participant to enroll (or grant access to) the participant in the decision model step 2700 of FIG. 29, in accordance with at least one embodiment of the disclosure. As shown, the process starts in step 2700 and passes to step 2710.

Figure 33:
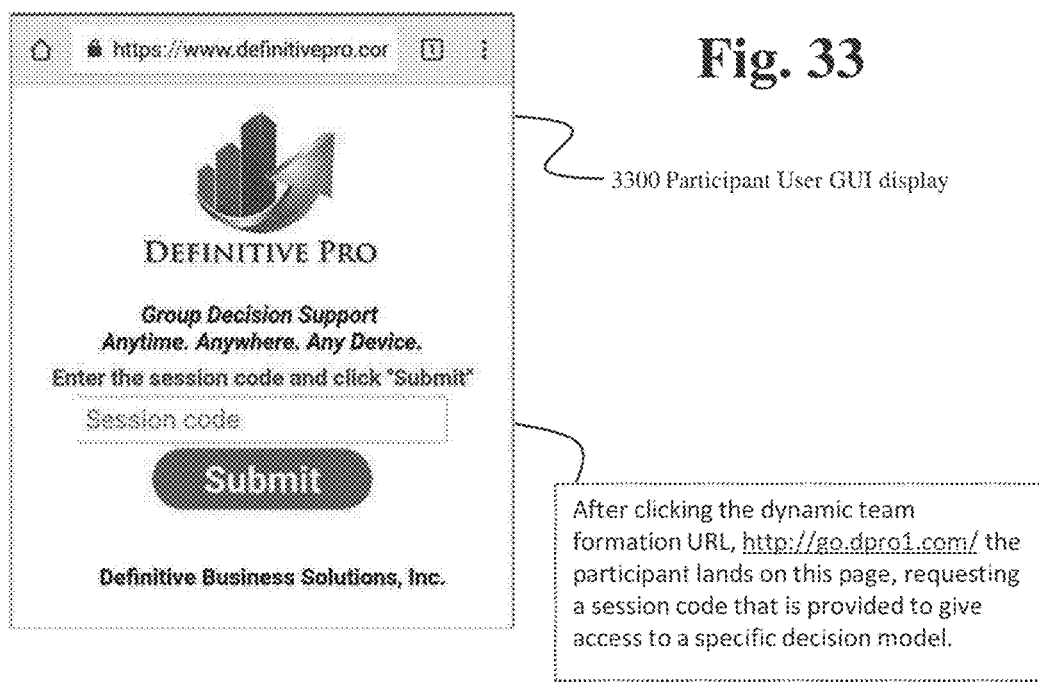
FIG. 33 is a further Participant User GUI display in accordance with at least one embodiment of the disclosure.
Figure 34:
FIG. 34 is a further Participant User GUI display in accordance with at least one embodiment of the disclosure.

In step 2710, the DPS (in a web session illustratively) generates a Participant User GUI prompting the candidate participant to input a session code. An illustrative Participant User GUI 3300 is shown in FIG. 33. Then, the process passes to step 2720. In step 2720, the DPS, in the web session, inputs the session code via the Participant User GUI display. An illustrative Participant User GUI display 3400 is shown in FIG. 34. Then, the process passes to step 2730.

Figure 35:
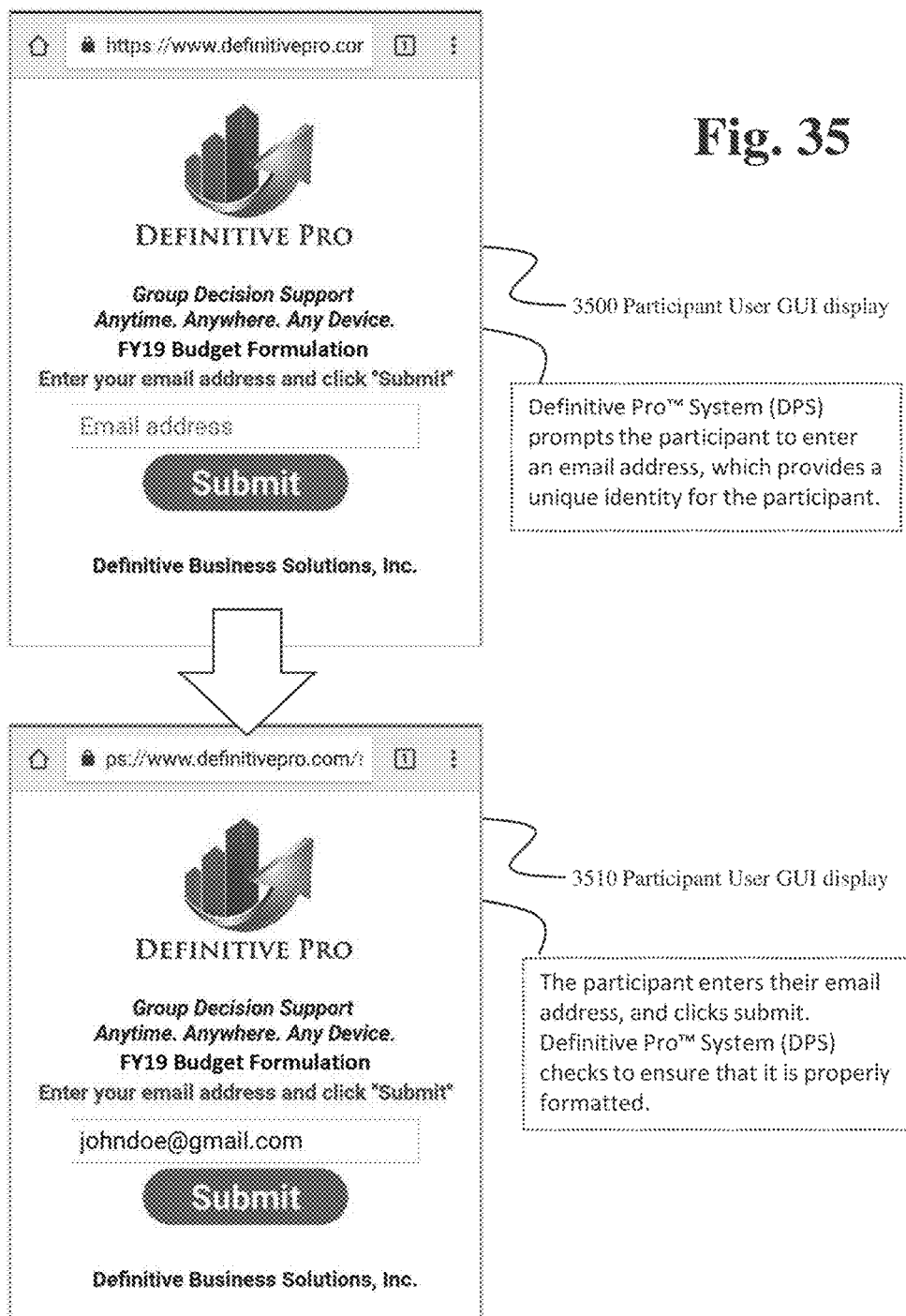
FIG. 35 are further Participant User GUI displays in accordance with at least one embodiment of the disclosure.

In step 2730, the DPS, in the web session, generates a Participant User GUI prompting the candidate participant to input the candidate participant email address. Such Participant User GUI display is shown in FIG. 35 as Participant User GUI display 3500. Then, the process passes to step 2740. In step 2740, the DPS, in the web session, inputs an email address from the candidate participant. FIG. 35 also shows an illustrative Participant User GUI display 3510. As reflected at 2740' in FIG. 30, the participant's email address or some other primary credential provides a unique identity to the particular candidate participant.

After step 2740, the process passes to step 2750. In step 2750, the DPS determines if the email address that was entered by the candidate participant (or whether another type of primary credential that is being utilized) is properly formatted and/or confirms to any requisite protocols. If no, then in step 2751, the DPS prompts the candidate participant to reenter the email information of the candidate participant and/or to reenter some other primary credential or credential. Processing then returns to step 2730 and continues as described above.

On the other hand, if yes in step 2750, the processing passes to step 2800. In step 2800, the DPS processes the input session code and the input email address. Further details are described below with reference to FIG. 31.

Then, the process passes to step 2870. In step 2870, the processing returns to FIG. 29.

Figure 31:
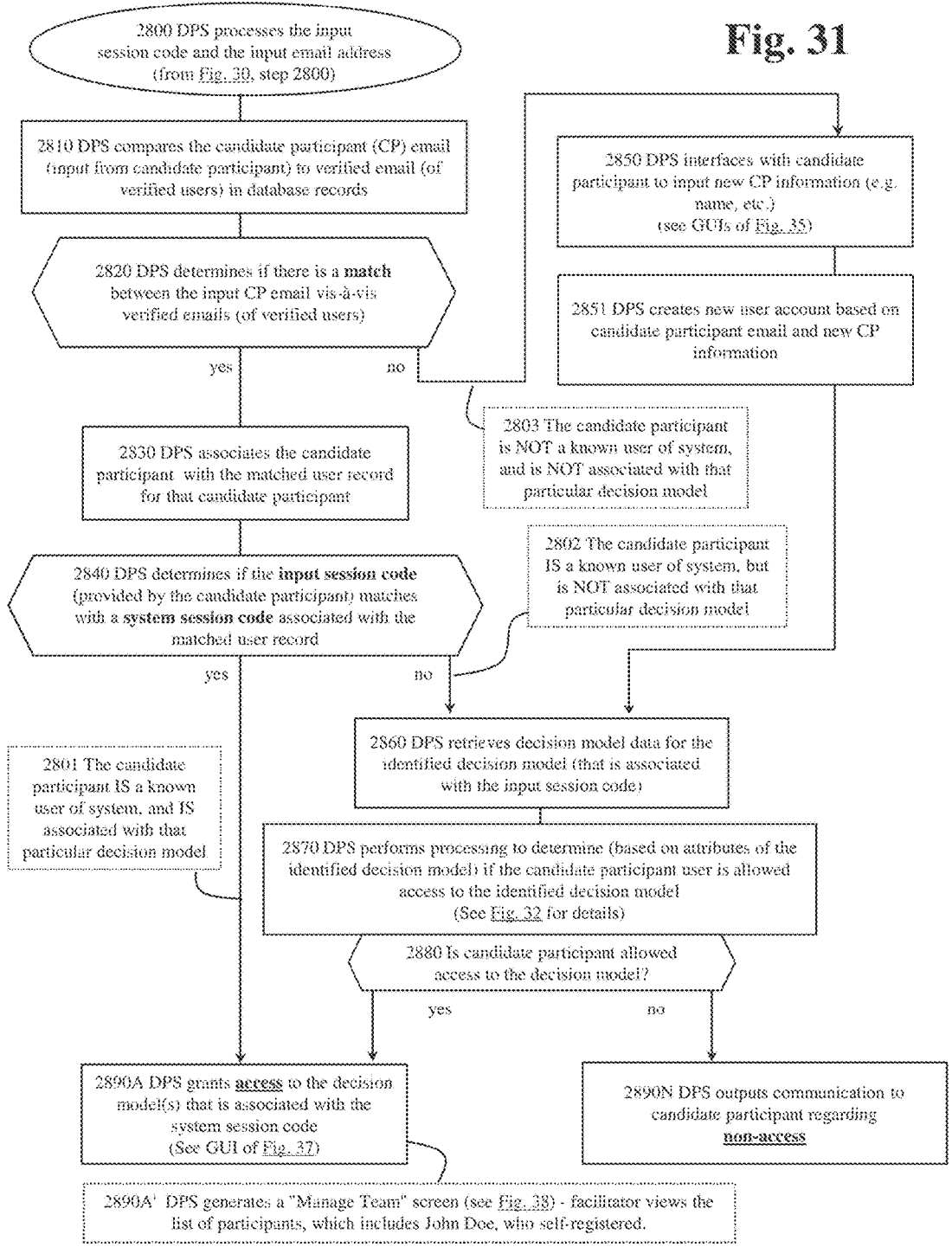
FIG. 31 is a flowchart showing in further detail the DPS processes the input session code and the input email address (step 2800 of FIG. 30), in accordance with at least one embodiment of the disclosure.

FIG. 31 is a flowchart showing in further detail the DPS processes the input session code and the input email address step 2800 of FIG. 30, in accordance with at least one embodiment of the disclosure.

As shown, the process starts in step 2800 and passes to step 2810. In step 2810, the DPS compares the candidate participant email address, which was input from the candidate participant, against verified email addresses of verified users of the system. Such verified email addresses may be disposed in suitable database records in the DPS. Then, the process passes to step 2820.

In step 2820, the DPS determines if there is a match between the input candidate participant email address vis-á-vis any of the verified emails (of verified users). If yes, then the process passes to step 2830. In step 2830, the DPS associates the candidate participant with the matched user record for that candidate participant. Then, in step 2840, the DPS determines if the input session code (provided by the candidate participant) matches with a system session code associated with the matched user record. In other words, does the user record of the particular candidate participant include attributes, such as the session code, that associates that particular user with the particular decision model to which access is sought (by the particular candidate participant). If yes, as reflected at 2801, such reflects that the candidate participant is a known user of the system and that the candidate participant is associated with the particular decision model for which access is requested. Accordingly, the process passes from step 2840 to step 2890A.

Figure 37:
FIG. 37 is a further Participant User GUI display in accordance with at least one embodiment of the disclosure.

In step 2890A, the DPS grants access to the decision model or decision models that are associated with the particular system session code and/or the user based on the above processing. An illustrative Participant User GUI display 3700 is shown in FIG. 37. Relatedly, as reflected at 2890A', the DPS generates a "Manage Team" screen that is illustratively shown in the Participant User GUI 3800 of FIG. 38. The "Manage Team" screen provides a portal through which the facilitator can view the list of participants, as well as various other data associated with the particular decision model. Illustratively, the Participant User GUI 3800 shows a person "John Doe" who self-registered for the particular decision model, and who is reflected in the name list.

Figure 38:
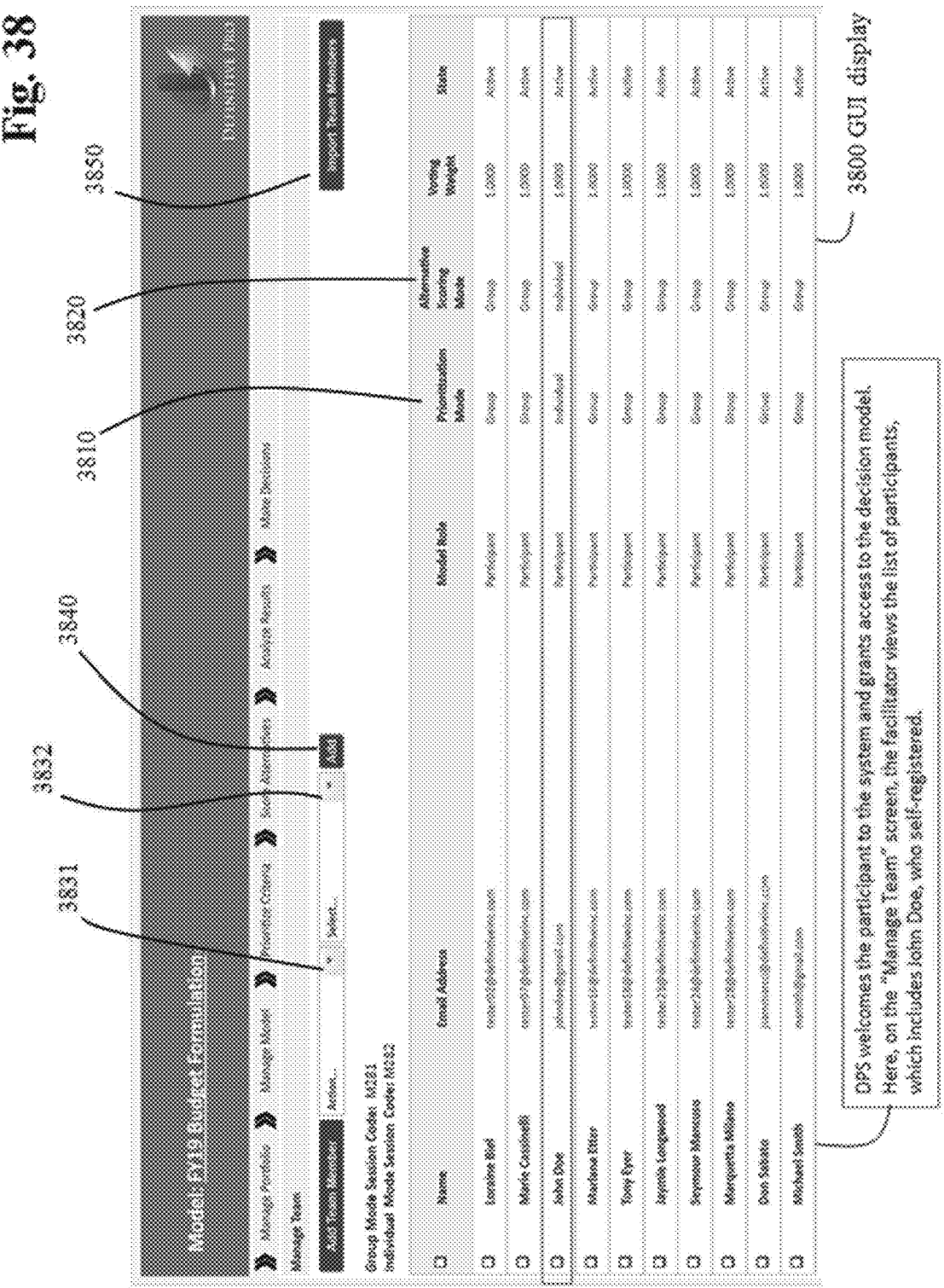
FIG. 38 is a further Participant User GUI display in accordance with at least one embodiment of the disclosure.

In accordance with at least one embodiment of the disclosure and this example, each model may be provided with two unique session codes, one for Group Mode: M281 and one for Individual Model, M282 (in this case as shown in FIG. 38). The system may then be configured to selectively share one or both codes with candidate participants—and such sharing may depend on the attributes of the particular candidate participant.

Those that self-register with the individual code session code are set up in "Individual" mode for pairwise comparisons (see the Criteria Prioritization Mode column 3810 in FIG. 38) and "Individual" mode for alternative scoring (see the Alternative Scoring Mode column 3820 in FIG. 38). For example, when in individual mode, participant users can proceed at their own pace.

In accordance with at least one embodiment of the disclosure, those that self-register with the group code session code are set up in "Group" mode for pairwise comparisons (see the Pairwise Comparison Mode column 3810 of FIG. 38) and "Group" mode for alternative scoring (see the Alternative Scoring Mode column 3820 of FIG. 38). In such processing, for example, the participants move through the process at the pace of the facilitator who controls which pairwise comparison or alternative is being processed.

In accordance with at least one embodiment of the disclosure, all users who enter a session code and self-register using dynamic team formation have a voting weight of 1.0 or other baseline weight. However, the system may be configured to adjust voting weight, for example, in controlled sessions where it is known who is participating in advance and so as to ensure balanced representation from various organizations and/or various persons, for example, as may be desired.

It is appreciated that additional session codes may be provided for a particular model. Each of such additional session codes may be associated with particular attributes, manners or particulars of processing. Accordingly, processing of the same model by may be administered in different manners using different session codes, in accordance with at least one embodiment of the disclosure.

The Participant User GUI 3800 of FIG. 38, which is presented to the facilitator user, also includes the functionality to add a further team member. Such functionality allows the facilitator to add team members during the course of implementing a decision model, in accordance with at least one embodiment of the disclosure. It is appreciated that the addition of participants, as well as the deletion of participants, may be subject to constraints and/or limitations as may be desired.

The GUI of FIG. 38 includes "action" 3831 and "select" 3832 drop-down menus associated with the "add team member". In accordance with at least one embodiment of the disclosure, the "Select" selection menu has a list of users in the system, that have previously added by the facilitator user. When manually adding participant users to the team, they may be selected in the menu and added to the team when the "Add" button is clicked.

In accordance with at least one embodiment of the disclosure, the "Add Team Member" button 3840 opens a menu to manually add a new user to the system and team. This may require, in some embodiments, adding a first name, last name, email address, role (participant), criteria prioritization mode, alternative scoring mode, and voting weight, for example.

In accordance with at least one embodiment of the disclosure, the facilitator user can import a list of team members (button 3850 of FIG. 38) using a template and/or existing database data—to avoid manual data entry. For example, the template may be made available for download when the button is clicked. This may ensure that the template is properly and uniformly formatted. Such processing conserves computer processing, that is required, and/or requires less transfer of data to provide the novel functionality of the invention. With further reference to FIG. 31, it may be determined in step 2840 that the input session code provided by the candidate participant did not match with a system session code associated with the particular user's record (in the system database). Accordingly, the process passes from step 2840 to step 2860. As reflected at 2802, such processing reflects that the candidate participant is a known user of the system, but is not associated with that particular decision model requested.

In step 2860, the DPS retrieves decision model data for the identified decision model, which is associated with the input session code. In other words, while the data record of the particular candidate participant may not reflect association with a given decision model, the data associated with the decision model itself may indeed dictate, by system processing, that the particular candidate participant should or may be provided access to the particular decision model.

Accordingly, in step 2870, the DPS performs processing to determine if the candidate participant user is allowed access to the identified decision model. Such processing of step 2870 is based on attributes of the identified decision model, attributes of the particular candidate participant, and/or other data. Further details of the processing of step 2870 are described below with reference to FIG. 32.

Based on such processing in step 2870, in step 2880, the system identifies if the candidate participant is allowed access to the decision model. If yes, then the process passes to step 2890A—and processing continues as described above. On the other hand, if no in step 2880, then the process passes to step 2890N. In step 2890N, the DPS outputs a communication to the candidate participant regarding non-access to the particular decision model requested by the candidate participant. In other words, the system may generate and output a suitable communication to the candidate participant indicating such non-access and that the user should contact the administrator and/or check the information utilized in the attempt to access the decision model, for example.

With further reference to step 2820 of FIG. 31, the DPS may determine that there is not a match between the input candidate participant email vis-á-vis verified emails of verified users. As a result, processing passes from step 2820 on to step 2850. Accordingly, such processing (as reflected at 2803) reflects that the candidate participant is not a known user of the system and is not associated with the particular decision model requested.

Figure 36:
FIG. 36 are further Participant User GUI displays in accordance with at least one embodiment of the disclosure.

In step 2850 of FIG. 31, the DPS interfaces with the candidate participant, who is not recognized by the DPS, to input new candidate participant information. For example, such new candidate information might include name information, as well as a variety of other information. Such processing to input such data is reflected in FIG. 36 that includes an illustrative Participant User GUI display 3600 and illustrative Participant User GUI display 3610.

After the processing in step 2850, in step 2851, the DPS creates a new user account based on the candidate participant's submitted email address and any further candidate participant information that was input by the system. Then, the process passes to step 2860. In step 2860, the processing advances as described above—to determine if the new user is provided access to the decision model, in accordance with at least one embodiment of the disclosure.

Figure 32:
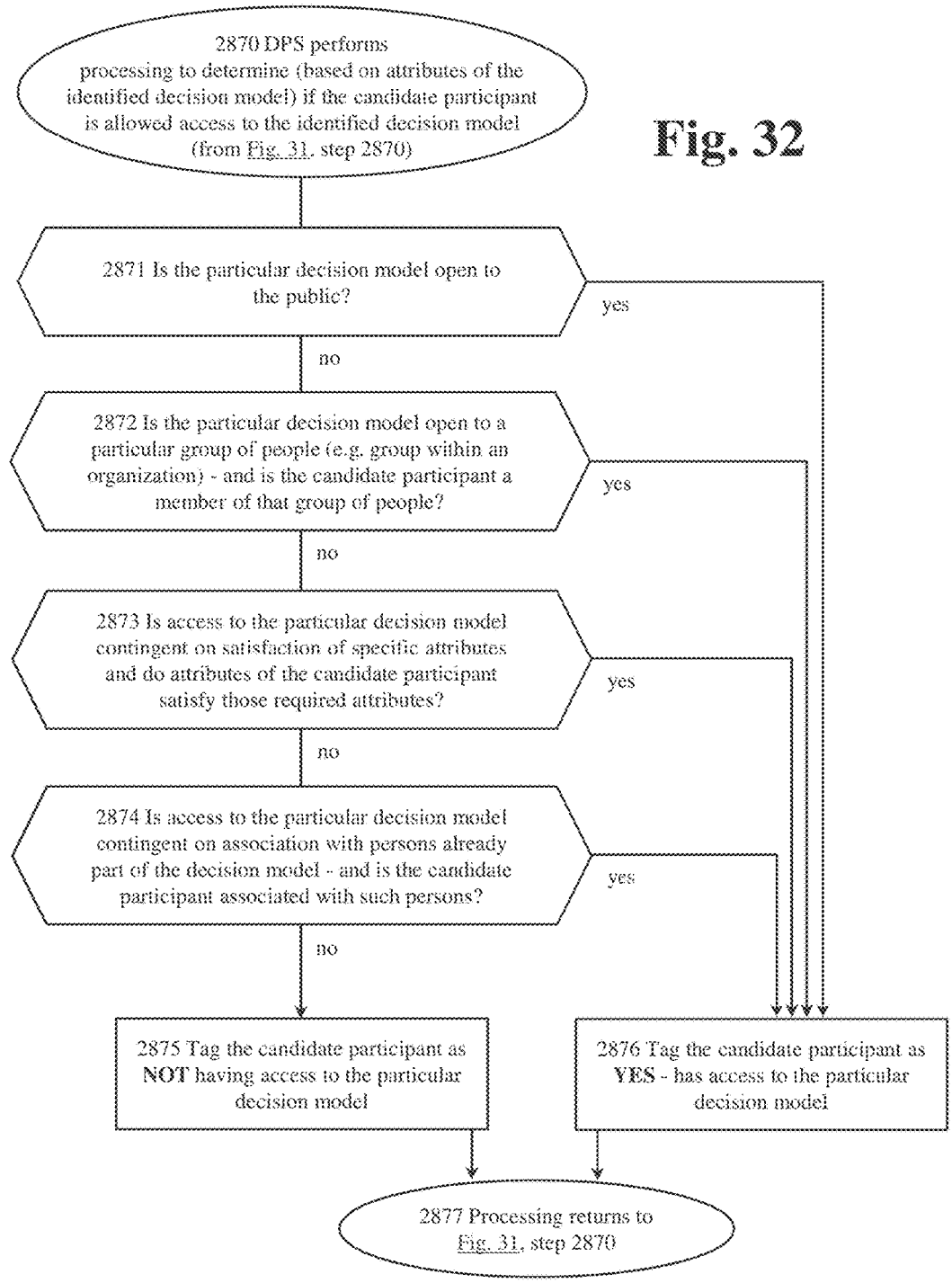
FIG. 32 is a flowchart showing in further detail the DPS performs processing (step 2870 of FIG. 31) to determine if the candidate participant is allowed access to the identified decision model, in accordance with at least one embodiment of the disclosure.

FIG. 32 is a flowchart showing in further detail the DPS performs processing to determine if the candidate participant is allowed access to the identified decision model, in accordance with at least one embodiment of the disclosure. Such processing may be based on attributes of the identified decision model, attributes of the candidate participant, as well as other information as may be desired.

The processing starts in step 2870 and passes to step 2871. In step 2871, the DPS determines if the particular decision model is indeed open to the public. If yes, the process passes to step 2876. In step 2876, the particular candidate participant is tagged as "yes" for subsequent processing in step 2880. That is, the particular candidate participant is indeed provided access to participate in the particular decision model.

If no in step 2871, then the process passes to step 2872. In step 2872, a determination is made by the DPS of whether the particular decision model is open to a particular group of people and is the candidate participant a member of that group of people. For example, the group of people might be an organization or a sub-group of people within an organization.

If yes in step 2872, the process passes to step 2876. In step 2876, the participant candidate is provided access as described above.

If no in step 2872, then the process passes to step 2873. In step 2873, a determination is made of whether access to the particular decision model is contingent on satisfaction of specific attributes and do attributes of the candidate participant satisfy those required attributes.

If yes in step 2873, the process passes to step 2876. In step 2876, the participant candidate is provided access as described above.

If no in step 2873, then further processing is performed to determine if the candidate participant is otherwise allowed access to the requested decision model. Specifically, the process passes to step 2874. In step 2874, the DPS determines, for example, whether access to the particular decision model is contingent on association with persons already part of the decision model and is a candidate participant indeed associated with such persons. Accordingly, such processing assesses a relationship between one or more persons and the requested decision model, as well as processes a relationship between the participant candidate vis-á-vis the one or more persons.

If yes in step 2874, the process passes to step 2876. In step 2876, the participant candidate is provided access as described above.

If no in step 2874, then the process passes to step 2875. In step 2875, the candidate participant is tagged as not having access to the particular decision model. In other words, such tagging is subsequently utilized in step 2880. After either of step 2875 or step 2876, the process passes to step 2877.

In step 2877, the processing returns to FIG. 31. In particular, the processing passes to step 2880 FIG. 31—and continues as described above.

In accordance with at least one embodiment of the disclosure, the processing may include a decisioning process of whether a candidate participant is or is not provided access to a decision model. For example, key attributes of a particular candidate participant vis-á-vis a particular decision model may be used to determine access and/or allowed manipulation of a decision model. In some embodiments, an email address, i.e. email attribute, may be used to grant and control access. As otherwise noted herein, other attributes that may be used (to control access and allowed action of a participant user) may include sex, age, organization, role, and/or geographic location, for example.

It should be appreciated that the decisioning shown in FIG. 32 is for purposes of illustration. Other processing and/or decisioning and be utilized to determine whether a particular candidate participant is provided access to—or is not provided access to—a particular decision model. Further, the disclosure is not limited to the particular linearity and/or order of processing depicted in FIG. 32.

Figure 39:
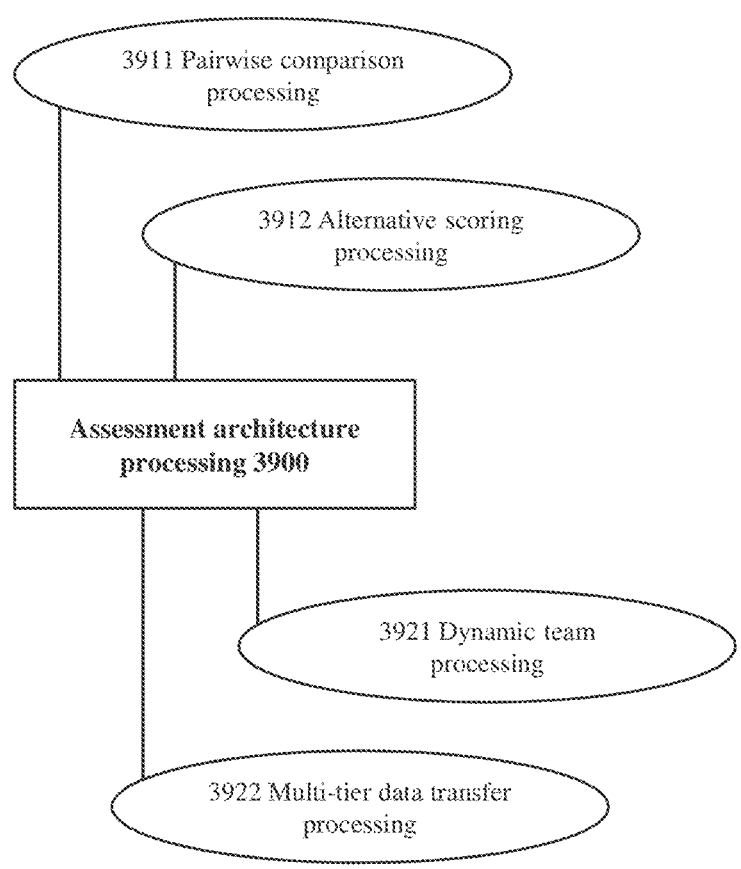
FIG. 39 is a diagram showing aspects of assessment architecture processing, in accordance with at least one embodiment of the disclosure.

FIG. 39 is a diagram showing aspects of assessment architecture processing 3900, in accordance with at least one embodiment of the disclosure. As shown, the assessment architecture 3900 may be associated with or include pairwise comparison processing 3911. For example, such pairwise comparison processing is illustrated in FIG. 3 and otherwise described in detail herein. As shown, the assessment architecture 3900 may be associated with or include alternative scoring processing 3912. For example, such alternative scoring processing 3912 is illustrated in FIG. 4 and otherwise described in detail herein. Additionally, as shown in FIG. 39, assessment architecture processing 3900 may also include or be associated with dynamic team processing 30 921. Additionally, assessment architecture processing 3900 may also include or be associated with multi-tier data transfer processing 3922.

It is appreciated that the systems and methods of the invention may include any combination of the processing illustrated in FIG. 39, as well as other processing described herein. Also, it is appreciated that the systems and methods of the invention may include any combination of portions of the processing illustrated in FIG. 39 and otherwise herein. Accordingly, for example, alternative scoring processing 3912 may be used in conjunction with dynamic team processing 3921 and/or in conjunction with multi-tier data transfer processing 3922.

The processing as described herein throughout, and reflected at a high level in FIG. 39, provides functionality that is lacking in known systems. Additionally, due to the efficient and effective synthesis and presentation of data described herein, the systems and methods of the invention provide desired functionality while conserving limited resources of available computer processing. For example, the GUIs of FIGS. 3 and 4 provide substantial data in an organized and digestible manner. As a result, for example, the innovative GUIs of FIGS. 3 and 4, for example, conserve computer processing requirements since a user need not switch or toggle back and forth (between different GUIs) so as to access the data—including volume of data—as presented on the GUIs of either FIG. 3 or FIG. 4.

In accordance with further aspects, this disclosure provides "multi-tier data transfer" (MDT) processing, as characterized herein. In such processing, a decision model may be selected to be the parent of another model (i.e., a child model). As a result of such association, the decision models become linked or associated with each other.

Figure 40:
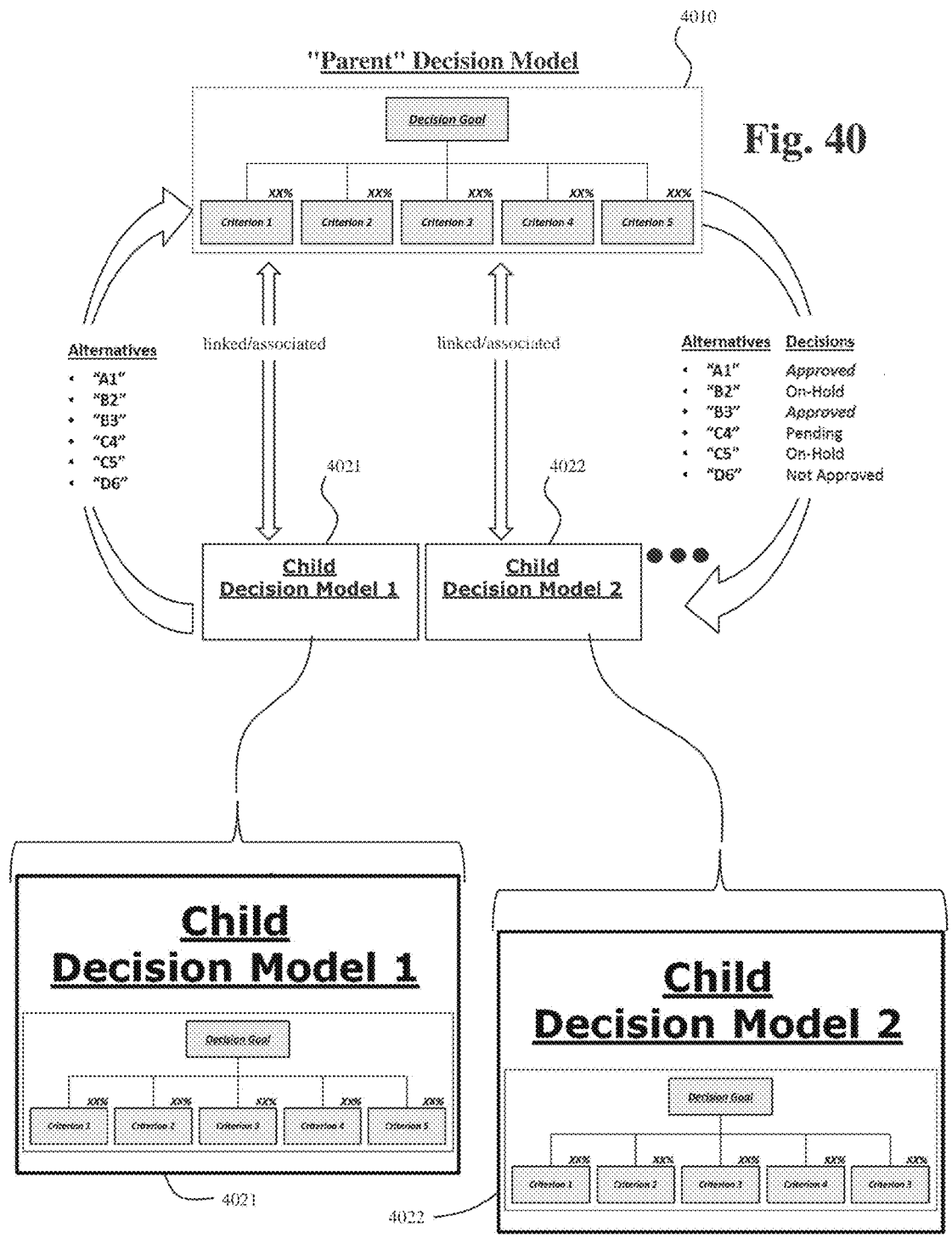
FIG. 40 is a diagram directed to multi-tier data transfer, in accordance with at least one embodiment of the disclosure.

FIG. 40 is a diagram showing such processing and features of the disclosure with regard to "multi-tier data transfer" (MDT) processing. The diagram of FIG. 40 includes a parent decision model 4010. The diagram of FIG. 40 also includes a plurality of child decision models 4021, 4022. Each child model 4021, 4022 is linked to the parent decision model 4010.

In MDT processing of the disclosure, after an alternative is scored in a child model, and a decision is made to approve the alternative in the child model, the particular alternative is promoted to the parent model, in accord with an embodiment of the disclosure. Further, the alternative, which was promoted, may be automatically added to the list of alternatives in the parent model.

Figure 41:
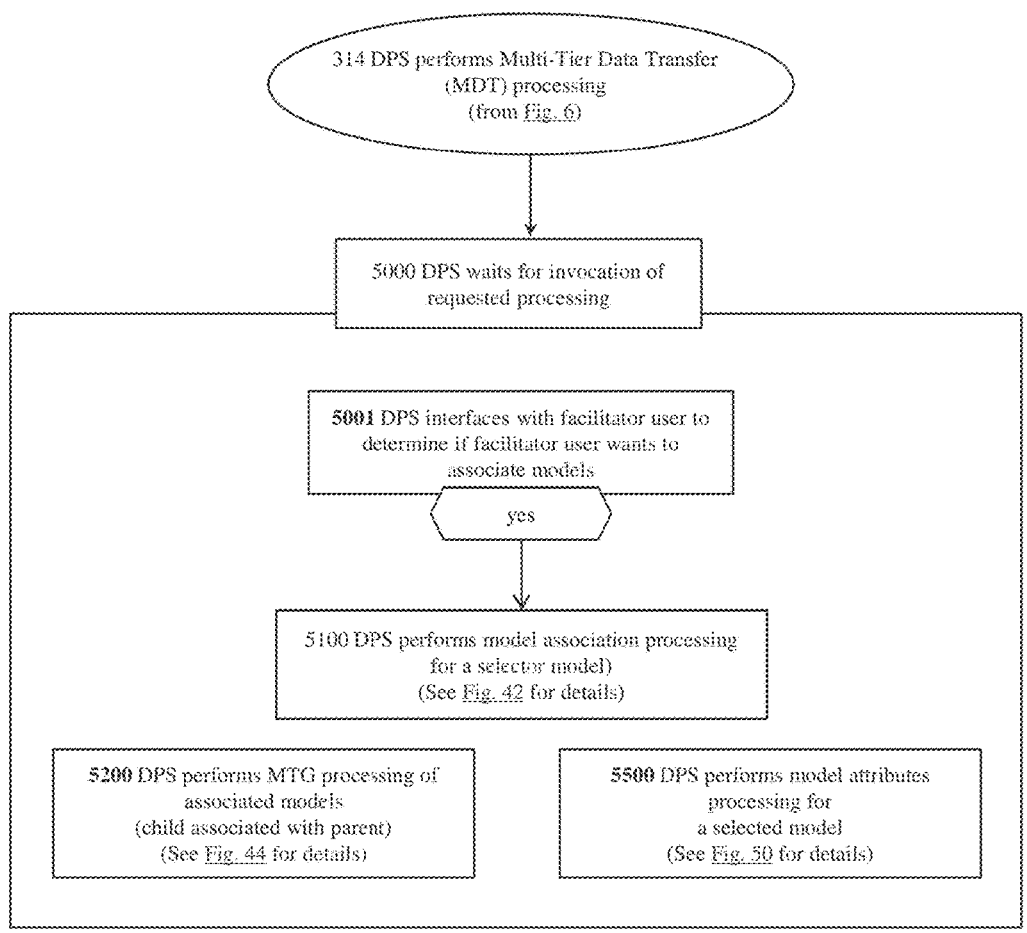
FIG. 41 is a flowchart showing details of multi-tier data transfer (MDT) processing performed by the DPS, in accordance with at least one embodiment of the disclosure.

Relatedly, when a promoted alternative is scored in the parent model (typically against a different set of criteria with a different set of decision participants), the resulting decision to approve or reject the promoted alternative is recorded in the parent model. This decision, obtained through the processing in the parent model, is then sent back to the child/promoting model, in accordance with at least one embodiment of the disclosure. Such MDT processing provides for multi-tier group decision-making that is efficient and seamless. It is appreciated that any number of models may be linked together. Various further features are described below. The disclosure provides effective and efficient processing in the manner that multi-tier data transfer is performed in that, as described in detail below, changes in a $1^{st}$ model need not be manually extrapolated to a $2^{nd}$ model through a burdensome and processor intensive series of steps. Rather, in accordance with embodiments of the disclosure related to multi-tier data transfer processing, changes in a child model are automatically passed on to a parent model, as well as changes in a parent model are automatically passed on to a child model, for example. Such processing conserves computer processing, that is required, and/or requires less transfer of data to provide the novel functionality of the invention. FIG. 41 is a flowchart showing details of multi-tier data transfer (MDT) processing performed by the DPS, in accordance with at least one embodiment of the disclosure. The processing starts in step 313, as shown in FIG. 41, and passes to step 5000. In step 5000, the system waits for invocation of requested MDT processing. As shown, various processing may be invoked or called upon in the processing of step 5000.

In accordance with at least one embodiment of the disclosure, in step 5001 of FIG. 41, the system interfaces with the facilitator user to determine if the facilitator user wants to "associate" models. If an input of "yes" is received in step 5001, the processing passes to step 5100. In step 5100, the system performs model association processing for the particular model selected by the facilitator user. More specifically—a "selector" model is associated with a "selected" model. In other words, a "selector" model is a model to which another model (the "selected" model is associated). The "selector" model may be either a parent model or a child model. The "selected" model may be either a parent model or a child model. Further details of such processing are described below with reference to FIG. 42.

As also shown in FIG. 41, further processing that may be invoked includes the processing of step 5200. In step 5200, the system performs MDT processing of associated models. In particular, such processing relates to (1) various processing and related exchange of data for a child model associated with a parent model and relatedly, (2) various processing and related exchange of data for a parent model associated with a child model. Further details of the processing of step 5500 are described below with reference to FIG. 44.

Yet further processing that may be invoked includes the processing of step 5500. In step 5500, the system performs model attributes processing for one or more selected models. In such processing, various details of selected models may be provided, as well as details regarding association(s) between such models. Further details of such processing are described below with reference to FIG. 50.

As described above, FIG. 42 is a flowchart showing in further detail the system "performs model association processing" for what is herein characterized as a "selector" model step 5100 of FIG. 41, in accordance with at least one embodiment of the disclosure. The processing of FIG. 42 starts in step 5100 and passes to step 5110. In step 5110, the DPS displays a list of models that are associated with the facilitator user. Then, in step 5120, the system inputs a selection from the facilitator user of a "selector" model. As used herein, the "selector" model is a model to which a "selected" model will be associated. Then, the processing passes to step 5130.

Figure 42:
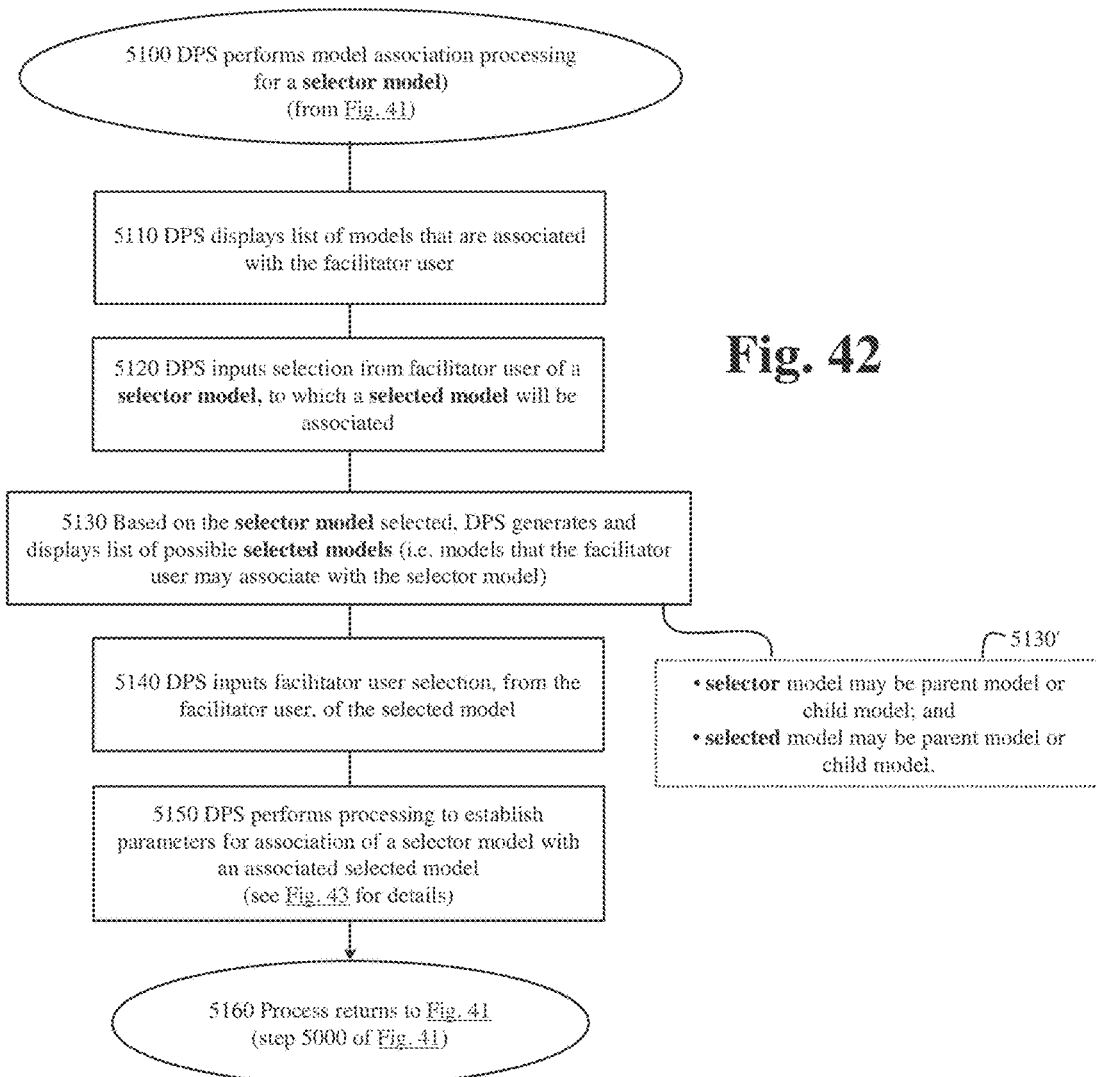
FIG. 42 is a flowchart showing in further detail the system "performs model association processing" for what is herein characterized as a "selector" model step 5100 of FIG. 41, in accordance with at least one embodiment of the disclosure.

In step 5130, based on the selector model selected (by the facilitator user through interface with the system), the system generates and displays a list of possible "selected" models. That is, the list of possible selected models may include models that the facilitator user may associate with the selector model. As shown in FIG. 42 at 5130', the "selector" model may be a parent model or a child model. Also, the "selected" model may be parent model or a child model.

However, it is appreciated that in accordance with some embodiments of the disclosure, a "selector" model can only be a child model, where the parent model is selected. In some embodiments, each model can have only one parent. In embodiments in which a selector model is a parent model, i.e. where the child model is selected, processing may be provided to ensure that the child model doesn't already have a parent model. In accordance with some embodiments of the disclosure, a parent model may select multiple child models.

After the processing of step 5130 as shown in FIG. 42, the process passes to step 5140. In step 5140, the system inputs a selection, from the facilitator user, of the selected model. Then, in step 5150, the system performs processing to establish parameters for association between the "selector" model and the associated "selected" model. Further details are described below with reference to FIG. 43. After the processing of step 5150, the process passes to step 5160.

In step 5160, the process returns to FIG. 41. Specifically, the processing passes back to step 5000 of FIG. 41. Processing then continues as described above.

Figure 43:
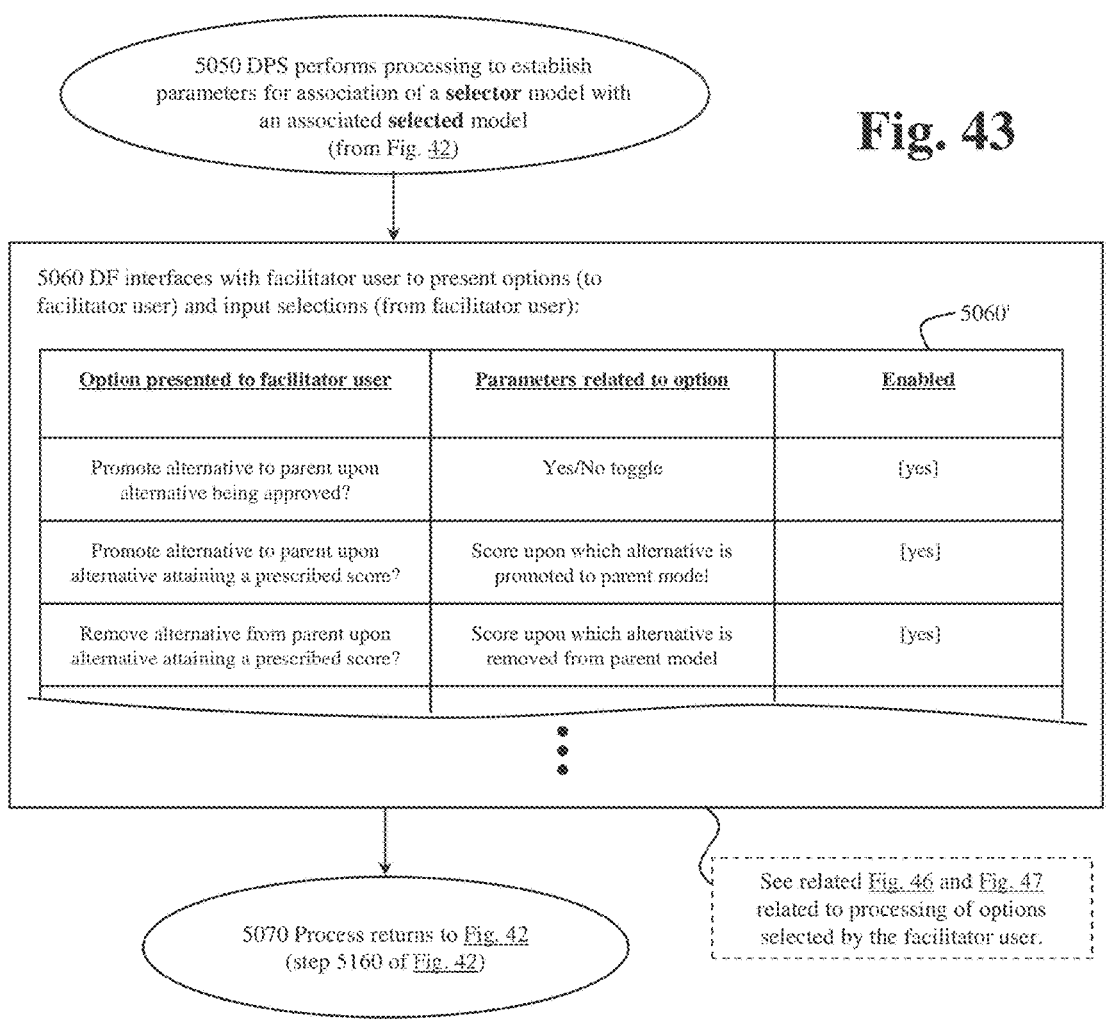
FIG. 43 is a flowchart showing in further detail the DPS performs processing to establish parameters for association of a selector model with an associated selected model step 5050 of FIG. 42, in accordance with at least one embodiment of the disclosure.

FIG. 43 is a flowchart showing in further detail the DPS performs processing to establish parameters for association of a selector model with an associated selected model step 5050 of FIG. 42, in accordance with at least one embodiment of the disclosure. The processing starts in step 5050 and passes to step 5060.

In step 5060, the DPS interfaces with the facilitator user to present options, to the facilitator user, and to input selections of those options, from the facilitator user. In other words, upon a child model being associated with a parent model and/or a parent model being associated with a child model, various parameters may be utilized to control the association. Accordingly, as reflected in FIG. 43 at 5060', various options may be presented to a facilitator user in conjunction with parameters that relate to the particular option. Additionally, each option may be either enabled or not enabled. Whether or not each option is enabled or not enabled may be hard-coded into the system such that a particular facilitator user is dictated whether she or he is provided the option. Whether an option is enabled or disabled may vary between facilitator users based on attributes associated with each respective facilitator user. On the other hand, whether or not an option is enabled may be selectable by a facilitator user. This too may depend on particular attributes of the facilitator user. It is appreciated that some facilitator users may be able to select options, while other facilitator users are not able or restricted in selecting options.

One option presented to the facilitator user, as shown in FIG. 43, may include the option to promote an alternative to an associated parent upon the alternative being approved in the child model. The parameters related to such option may include a yes/no toggle. The option may be enabled or not enabled. In this example, if such option is enabled, then the facilitator user may be presented with a selection box by which the facilitator user may choose yes or no.

As shown in FIG. 43, in accordance with at least one embodiment of the disclosure, a further option is to promote a particular alternative (to an associated parent) upon the alternative attaining a prescribed score. A parameter related to such option is the particular score upon which the alternative is promoted to the parent model. If the option is enabled, then the facilitator user may be presented with a dialog box to input the particular score upon which the alternative will be promoted to the parent model. In general, the DSP may interface with the facilitator user to input various operating parameters including thresholds, time criteria and/or time windows, for example.

As shown in FIG. 43, a further option is to remove a particular alternative from an associated parent upon the alternative falling below a prescribed score. A parameter related to such option is the particular score upon which the alternative is removed from the parent model. If the option is enabled, then the facilitator user may be presented with a dialog box to input the particular score upon which the alternative will be removed from the parent model.

Figure 46:
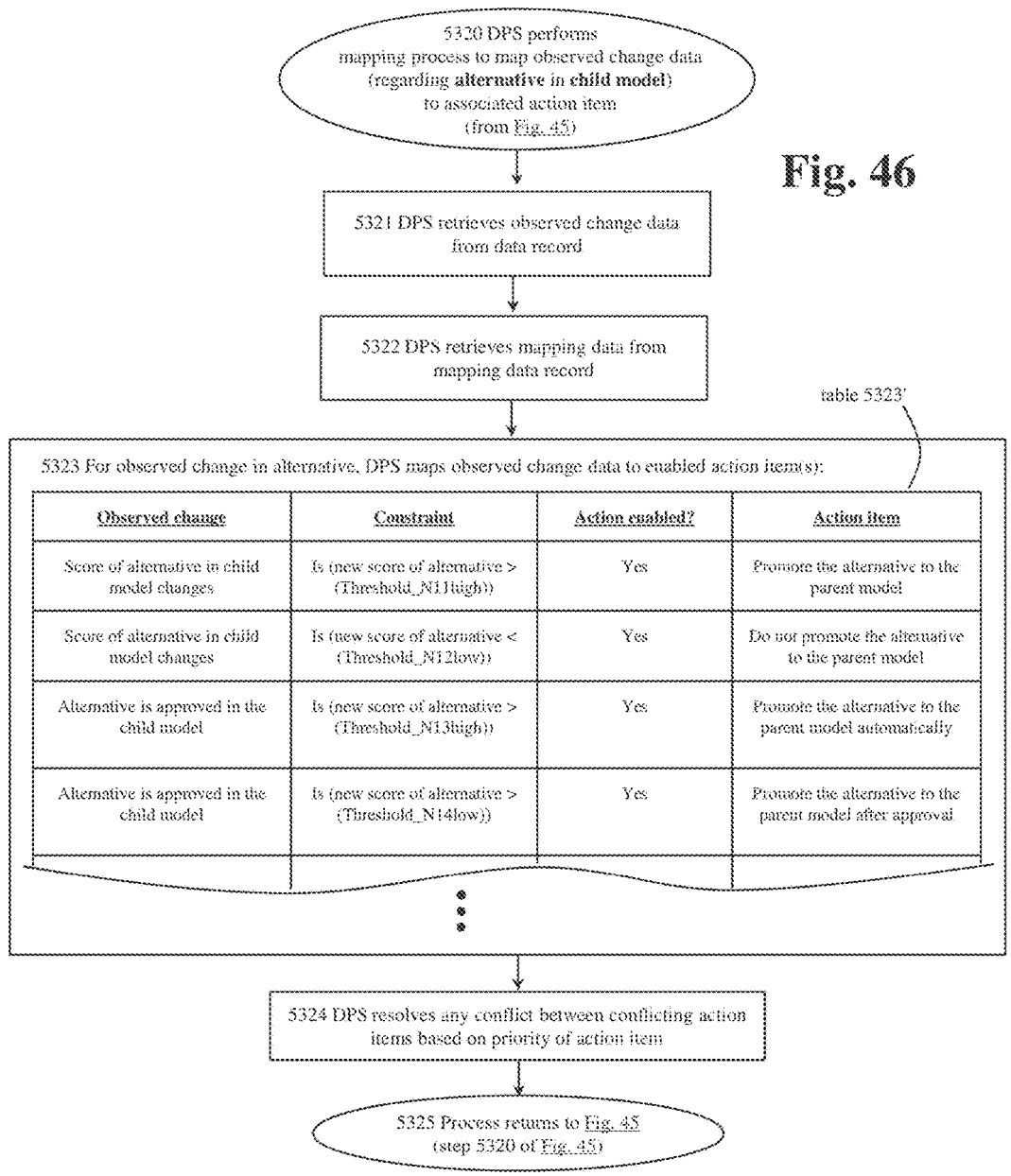
FIG. 46 is a flowchart showing in further detail the system performs mapping process to map observed change data (regarding an alternative in a child model) to an associated action item step 5320 of FIG. 45, in accordance with at least one embodiment of the disclosure.
Figure 47:
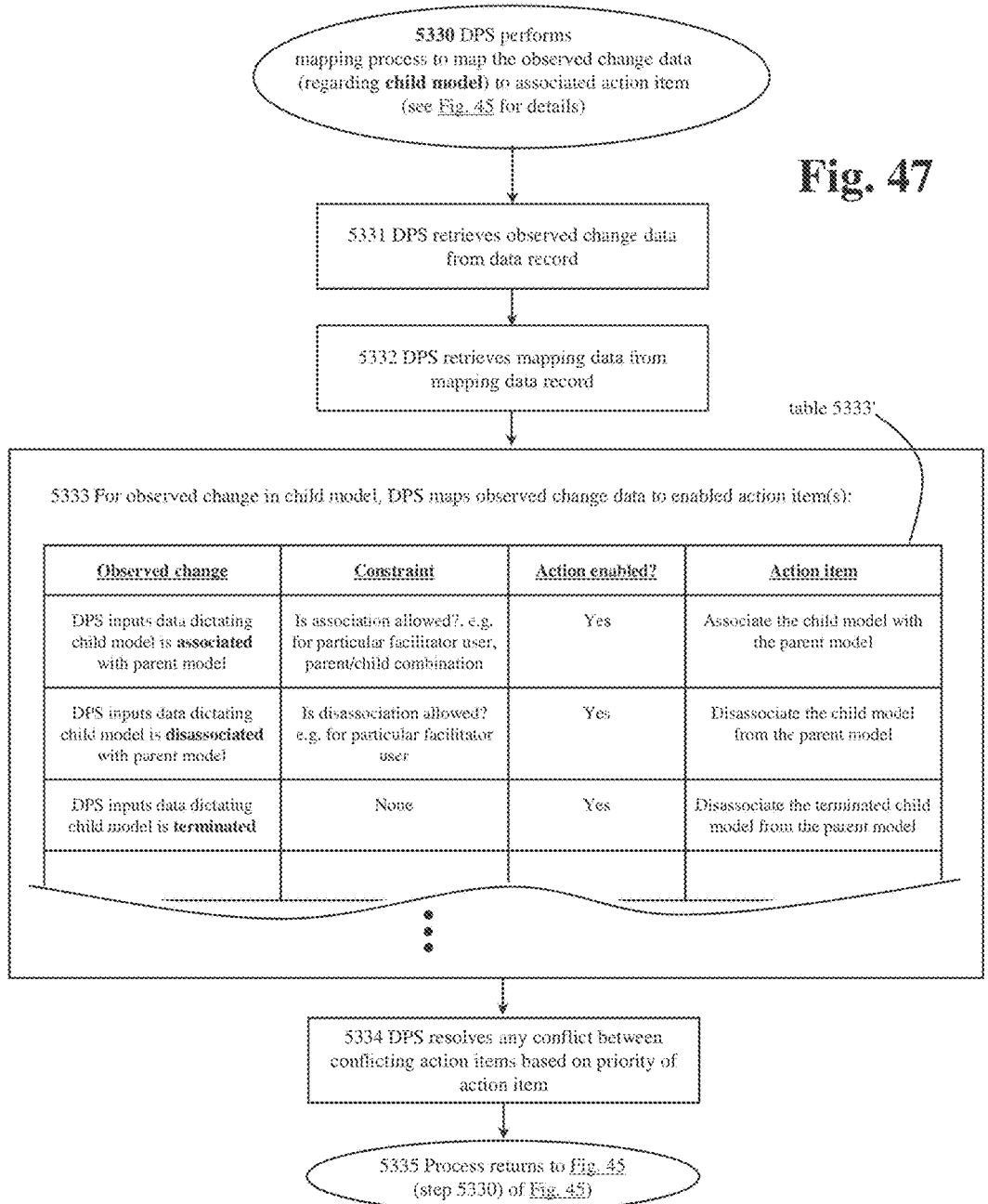
FIG. 47 is a flowchart showing in further detail the system performs mapping process to map observed change data (regarding a change in a child model) to an associated action item step 5330 of FIG. 45, in accordance with at least one embodiment of the disclosure.

As reflected in FIG. 43, processing of options selected by the facilitator user is performed in the processing of FIG. 46 and FIG. 47, for example. Various other options to control processing of an association (between parent and child) may be utilized as well as parameters associated with such additional options. For example, such additional options may relate to time criteria and/or time windows, for example. For example, a particular alternative might be removed from a parent after a specified time has passed. The parameter associated with such option would be the specified time.

As shown in FIG. 43, after options are presented and selected by the facilitator user in step 5060, the processing passes to step 5070. In step 5070, the process returns to FIG. 41. Specifically, the process passes to step 5160 FIG. 41.

Figure 44:
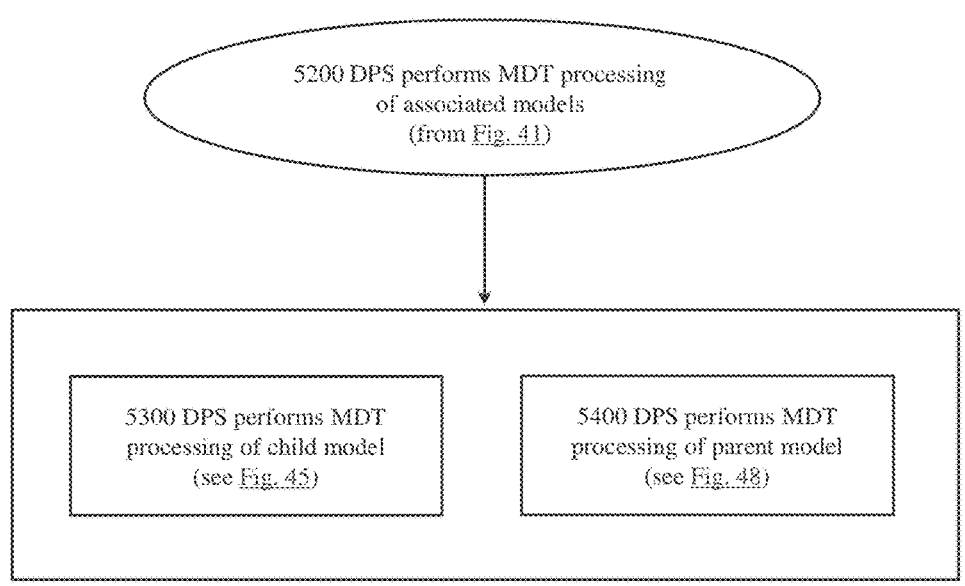
FIG. 44 is a flowchart showing in further detail the system performs "MDT processing of associated models" step 5200 of FIG. 41, in accordance with at least one embodiment of the disclosure.

FIG. 44 is a flowchart showing in further detail the system performs "MDT processing of associated models" step 5200 of FIG. 41, in accordance with at least one embodiment of the disclosure. As shown in FIG. 44, the processing may invoke step 5300 and/or step 5400. Such step 5300 and/or step 5400 may be invoked in parallel or in serial, as well as invoked in multiple instances of one or the other of such steps 5300 and 5400.

Figure 45:
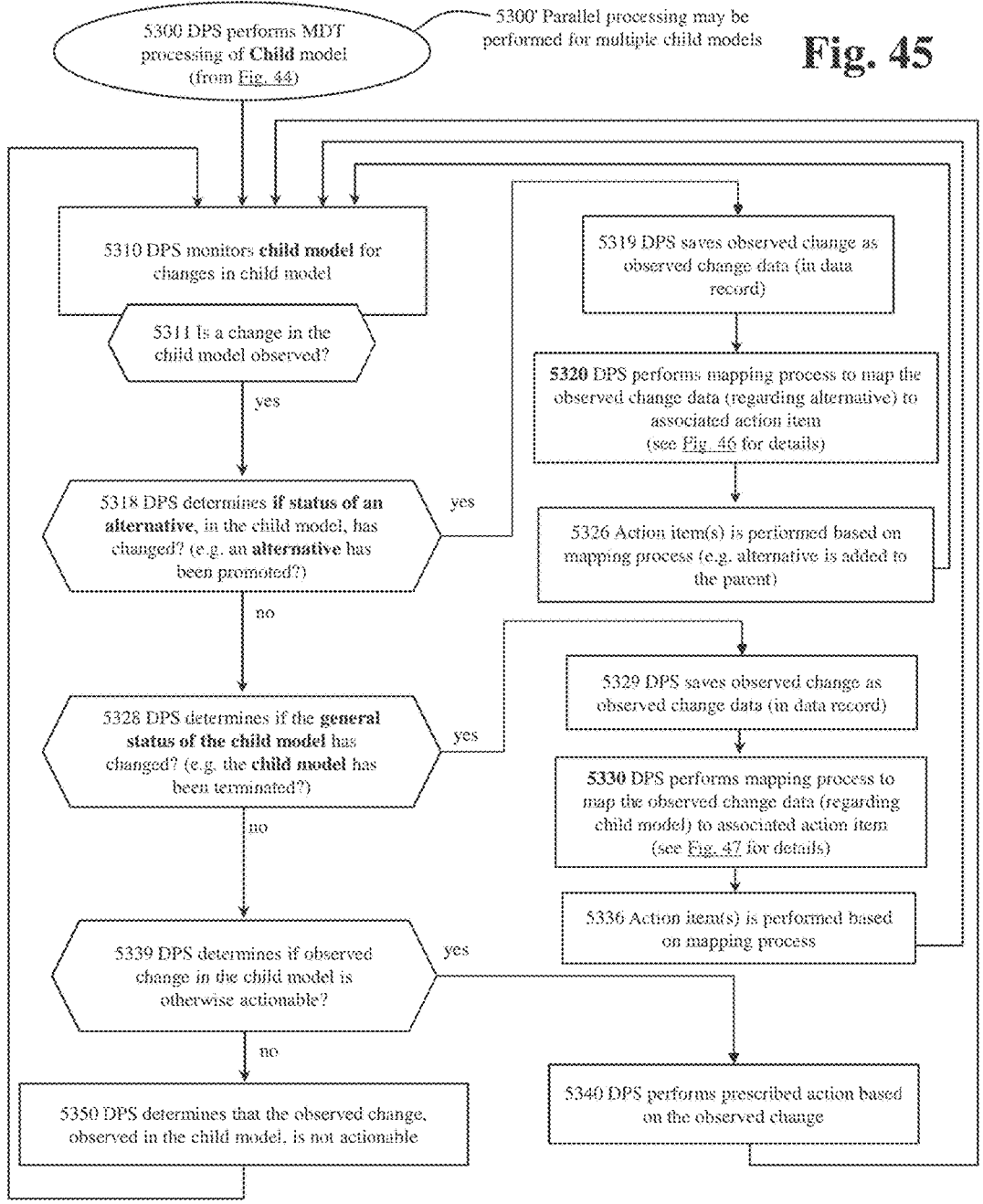
FIG. 45 is a flowchart showing further details the system performs "MDT processing of a child model" step 5300 of FIG. 44, in accordance with at least one embodiment of the disclosure.

In step 5300, the system performs MDT processing of a child model. Further details are described below with reference to FIG. 45. On the other hand, in step 5400, the system performs MDT processing of a parent model. Further details are described below with reference to FIG. 48. FIG. 45 is a flowchart showing further details of the system performs "MDT processing of a child model" step 5300 of FIG. 44, in accordance with at least one embodiment of the disclosure. As shown, the processing starts in step 5300 and passes to step 5310. As reflected at 5300', parallel processing and/or multiple instances of step 5300 may be performed for multiple child models.

In step 5310, the DPS monitors a child model for changes in the child model. Such changes of the child model, may include changes in data record(s) associated with the particular model, changes in the particular model, and/or changes associated with the particular model, for example. Relatedly, step 5311 reflects that the system performs decisioning to determine if a change of the child model is observed by the system. Upon the decisioning in step 5311 determining "yes" (i.e., there is an observed change of the child model), the processing passes to step 5318.

In step 5318, the system determines if the status of an alternative, in the child model, has changed. For example, the change in the child model might be an alternative that has been promoted. If the decision of step 5318 is determined to be "yes", then the processing passes to step 5319. In step 5319, the DPS saves the observed change as observed change data. Such information may be saved in an appropriate data record. The processing then passes to step 5320.

In step 5320, the DPS performs a mapping process to map the observed change data (regarding the particular change in the alternative of the child model) to one or more associated action items. Further details are described below with reference to FIG. 46. Then, the process passes to step 5326.

In step 5326, the action item that was identified in step 5320 is performed. In other words, the action item that was identified based on the mapping processing of step 5320 is performed. For example, in response to an alternative being promoted in the child model, a corresponding action item might be that the particular alternative is added to one or more parent models (that is/are associated with the child).

After the processing of step 5326, the process returns to step 5310. In step 5310, the DPS continues to monitor the child model for additional changes in the child model, as described above.

With further reference to step 5318 of FIG. 45, on the other hand, the decision of step 5318 may be that the status of an alternative, in the child model, has not changed (i.e., the determination is "no" in step 5318). As a result, the processing passes to step 5328. In step 5328, the DPS determines if a "general" status of the child model has changed. In other words, the processing of step 5328 relates to the processing or disposition of the child model overall and not particularly to an alternative in the child model. For example, a "general" change in disposition of the overall child model might be that the child model has been terminated. If the decision of step 5328 is yes (the status of the child model has changed) the processing passes to step 5329. In step 5329, the DPS saves the observed change as observed change data in a suitable data record. The processing then passes to step 5330.

In step 5330, the system performs a mapping process to map the observed change data (regarding the particular child model) to one or more associated action items. Further details are described below with reference to FIG. 47. After the processing of step 5330, the process passes to step 5336. In step 5336, the action item, as determined in step 5330, is performed. Thereafter, the processing passes back to step 5310. Monitoring is then performed in the manner as described above.

With further reference to step 5328 of FIG. 45, on the other hand, the decision of step 5328 may be that the status of the child model has not changed (i.e., the determination is "no" in step 5328). As a result, the process then passes to step 5339 of FIG. 45.

In step 5339, the system determines if the observed change in the child model is otherwise actionable. In other words, the processing of step 5339 reflects the possibility that changes might be observed in the child model, or associated with the child model, that may not fit into the processing of steps 5318, 5320 or steps 5328, 5330. Illustratively, a change in the interrelationship between two associated child models might be captured in the processing of step 5339 and, in the case of a yes determination in step 5339—the resulting processing of step 5340. Accordingly, in step 5340, the DPS performs the prescribed action based on the observed change, i.e. based on a mapping of the particular observed change to an action item.

On the other hand, if "no" in step 5339, processing passes to step 5350, and the DPS saves the determination, that the observed change is not actionable, in a suitable data record. After the processing of step 5350, the process returns to step 5310.

FIG. 46 is a flowchart showing in further detail the system performs mapping process to map observed change data (regarding an alternative in a child model) to an associated action item—step 5320 of FIG. 45, in accordance with at least one embodiment of the disclosure. In other words, the processing of FIG. 46 relates to identifying a change in an alternative (of a child model) and associating such observed change with an action item to be performed.

The processing of FIG. 46 starts in step 5320 and passes to step 5321. In step 5321, the system retrieves observed change data from a suitable data record, as was saved in step 5319 of FIG. 54.

Then, in step 5322, the system retrieves mapping data from a mapping data record. Then, the process passes to step 5323.

In step 5323, based on the observed change in the particular alternative, the DPS maps the observed change to an enabled action item or items. Table 5323' includes various data associated with such mapping in accordance with an embodiment. Specifically, table 5323' includes the data relating to the observed change, one or more constraints associated with the observed change, whether or not the action is enabled, and the associated action item. Accordingly, in one embodiment, if a specified change is observed and that change satisfies predetermined constraints or criteria—then the observed change will be mapped to an action item, assuming the action item is enabled.

In particular, it is appreciated that a particular change in an alternative that may be observed is a "promotion" of an alternative. Relatedly, in accordance with embodiments of the disclosure, promotions of alternatives in a child model may be done automatically based setting predetermined thresholds and/or the observation of predetermined events. The promotion of alternatives in a model may or may not have manual components, i.e. such as certain "gates" at which processing performed by the system engages with an administrator user—prior to proceeding on to further processing.

After the processing of step 5323, the process passes to step 5324, as shown in FIG. 46. In step 5324, the system resolves any conflict between conflicting action items. Such resolution of conflict(s) might be based on priority of observed change and/or priority of each action item. Then, the process passes to step 5325. In step 5325, the process returns to FIG. 45. Specifically, the process passes to step 5320 of FIG. 45.

FIG. 47 is a flowchart showing in further detail the system performs a mapping process to map observed change data (regarding a change in a child model) to an associated action item—step 5330 of FIG. 45, in accordance with at least one embodiment of the disclosure. In other words, the processing of FIG. 46 relates to identifying a "general" change in a child model and associating such observed "general" change with an action item.

The processing of FIG. 47 starts in step 5330 and passes to step 5331. In step 5331, the system retrieves observed change data from a suitable data record. Then, in step 5332, the system retrieves mapping data from a mapping data record. Then, the process passes to step 5333.

In step 5333, based on the observed change in the child model, the DPS maps the observed change to enabled action item or action items. Table 5333' includes various data associated with such mapping in accordance with an embodiment. Specifically, table 5333' includes data relating to the observed change, one or more constraints associated with the observed change, whether or not the action is enabled, and the associated, or mapped to, action item. Accordingly, in one embodiment, if a specified change is observed and that change satisfies predetermined constraints or criteria—then the observed change will be mapped to an action item, assuming the action is enabled.

Figure 48:
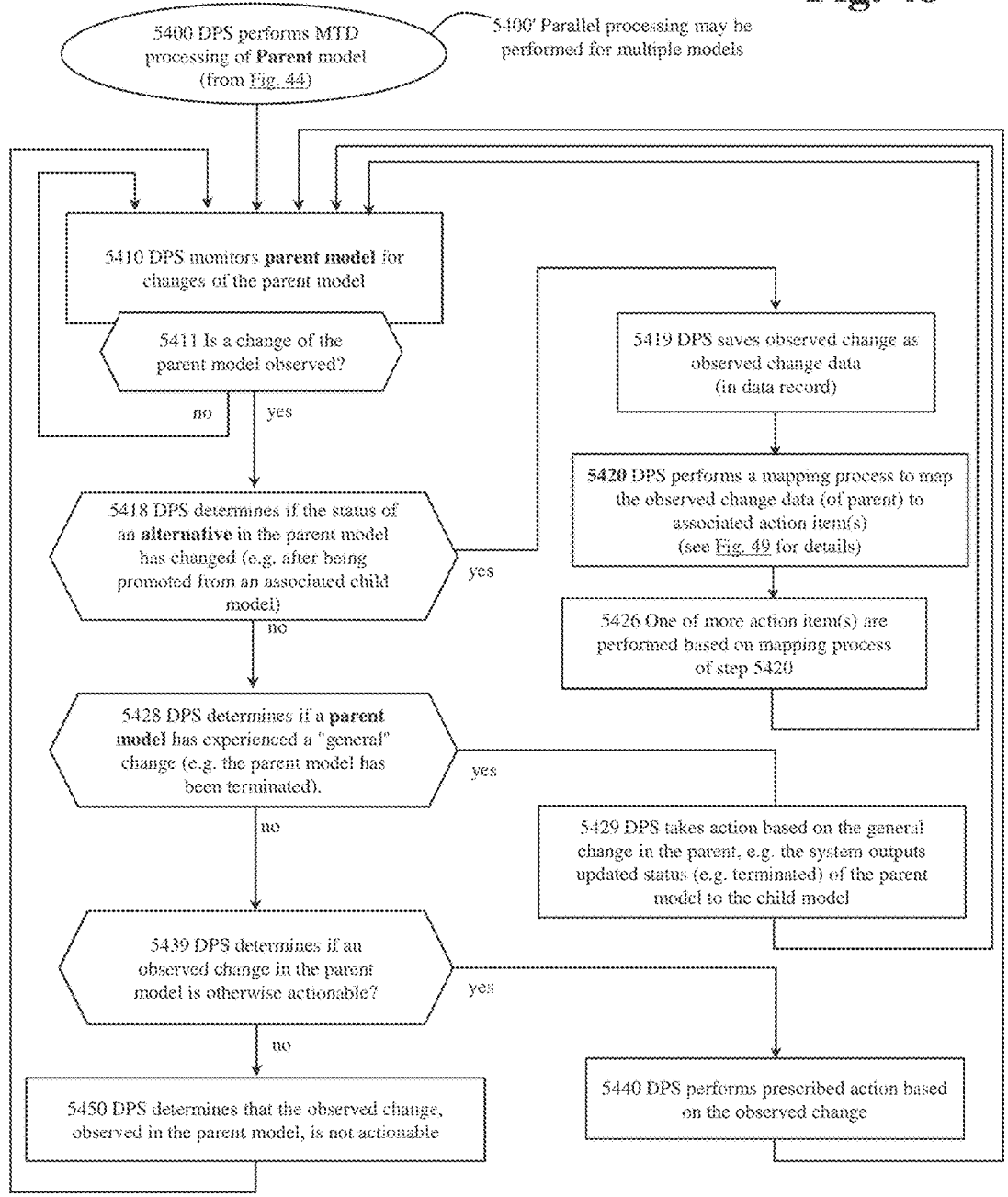
FIG. 48 is a flowchart showing further details of the "DPS performs MDT processing of a parent model" step 5400 of FIG. 44 in accordance with at least one embodiment of the disclosure.

After the processing of step 5333, the process passes to step 5334 as shown in FIG. 47. In step 5334, the system resolves any conflict between conflicting action items. Such resolution of conflict might be based on priority of observed change and/or priority of each action item. Then, the process passes to step 5335. In step 5335, the process returns to FIG. 45. Specifically, the process passes back to step 5330 of FIG. 45 and processing further proceeds as described herein. FIG. 48 is a flowchart showing further details of the "DPS performs MDT processing of a parent model" step 5400 of FIG. 44, in accordance with at least one embodiment of the disclosure. As reflected at 5400', parallel processing and/or multiple instances of step 5400 may be performed for multiple child models.

As shown, the process starts in step 5400 and passes to step 5410. In step 5410, the DPS monitors the parent model for changes in the parent model" such as changes in or associated with the parent model. Relatedly, decisioning is performed in step 5411 of whether a change in the parent model has been observed. If "no" in step 5411, then the processing continues to monitor the parent model in step 5410.

On the other hand, if "yes" in step 5411, then the process passes to step 5418. In step 5418, the DPS determines if status of an alternative, which has been promoted to the parent model from a child model, (i.e., a child model associated with the particular parent model), has changed. For example, the particular alternative may have been scored in the parent model. If yes in step 5418, then the processing passes to step 5419. In step 5419, the DPS saves the observed change as observed change data, which may include saving data in a suitable data record, for example. Then, the process passes to step 5420.

In step 5420, the system performs a mapping process to map the observed change data (reflecting the change of the parent) to one to more associated action item(s). Further details are described below with reference to FIG. 49. The processing then passes to step 5426.

In step 5426, one of more action item(s) are performed based on the mapping process of step 5420 (i.e., based on what action items were identified in step 5420), as corresponding to the observed change in the alternative, in the parent model.

After the processing step 5426, the process passes back to step 5410. In step 5410, the system continues to monitor the parent model for further changes, as described above.

On the other hand, the decisioning of step 5418 may yield a result of "no" in that the system determines that an alternative has not experienced a status change in the parent model. As a result, the process passes to step 5428.

In step 5428, the system determines if a parent model has experienced a "general" change that may affect the parent model in general. For example, such a change might be constituted by the parent model being terminated. If "yes" in step 5428, then the processing passes to step 5429. In step 5429, DPS takes action based on the general change in the parent, e.g. the system outputs updated status (e.g. terminated) of the parent model to the child model. That is, such action is, in this example, the prescribed action that is taken based on the parent model being terminated, for example. The processing of step 5429 may also or alternatively include other processing that is performed based on other observed general changes in the parent model.

After the processing of step 5429, the process passes back to step 5410. In step 5410, as described above, the DPS monitors the parent model for further changes of the parent model, such as changes in or associated with the parent model.

With further reference to step 5428 (of FIG. 48), on the other hand, the decisioning of step 5428 may yield a result of "no" (i.e., the parent model has not experienced a "general" status change). Accordingly, the process passes to step 5439.

In step 5439, the system determines if the observed change in or associated with, the parent model is otherwise actionable. If yes, then the process passes to step 5440. In step 5440, the system performs a prescribed action based on the observed change associated with the parent model. Then, the process passes again to step 5410, with the system monitoring changes associated with the parent model, as described above.

On the other, if "no" in step 5439, the processing passes to step 5450. In step 5450, the system determines that the observed change in the parent model is not actionable. Accordingly, the process passes to step 5410. In step 5410, as described above, the DPS monitors the parent model for changes in or associated with the parent model.

Figure 49:
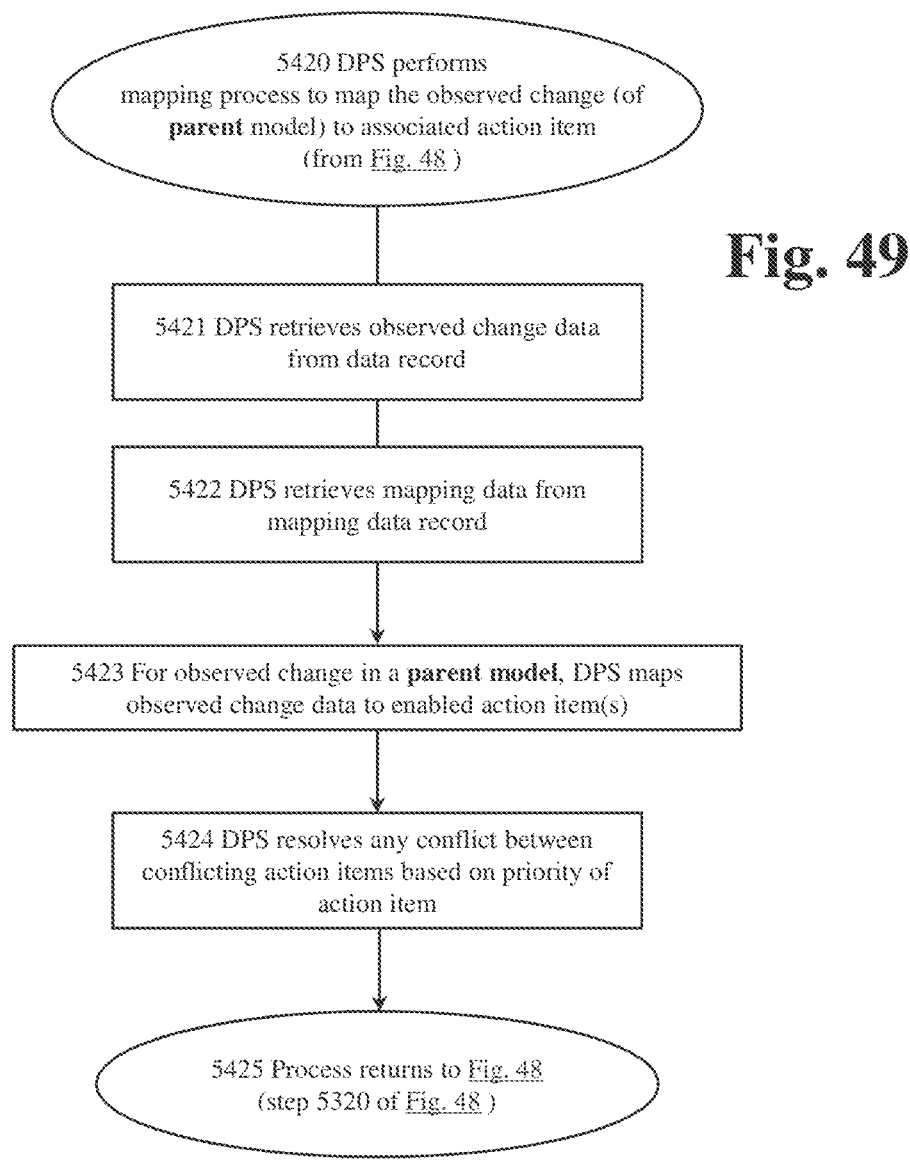
FIG. 49 is a flowchart showing "DPS performs mapping process to map the observed change (of parent model) to associated action item step 5420 of FIG. 45, in accordance with at least one embodiment of the disclosure.

FIG. 49 is a flowchart showing "DPS performs mapping process to map the observed change (of parent model) to associated action item step 5420 of FIG. 48, in accordance with at least one embodiment of the disclosure.

As shown, the process starts in step 5420 and passes to step 5421. In step 5421, DPS retrieves observed change data from the appropriate data record. Then, in step 5422, the DPS retrieves mapping data from a mapping data record. Then, the process passes to step 5423. In step 5423, for the observed change in the parent, the DPS maps observed change data to enabled action items. For example, an observed change in the parent might indeed be the termination of the parent. As a result, the action item may be disassociation of the parent model with the child model. Various other observed change(s) may be identified, resulting in associated, predetermined action items.

After the processing of step 5423, the process passes to step 5424. In step 5424, the DPS resolves any conflict between conflicting action items based on priority of the action item, for example. Then, the process passes to step 5425. In step 5425, the process returns to FIG. 48. Specifically, the process passes to step 5320 of FIG. 48, and processing further proceeds as described herein.

Figure 50:
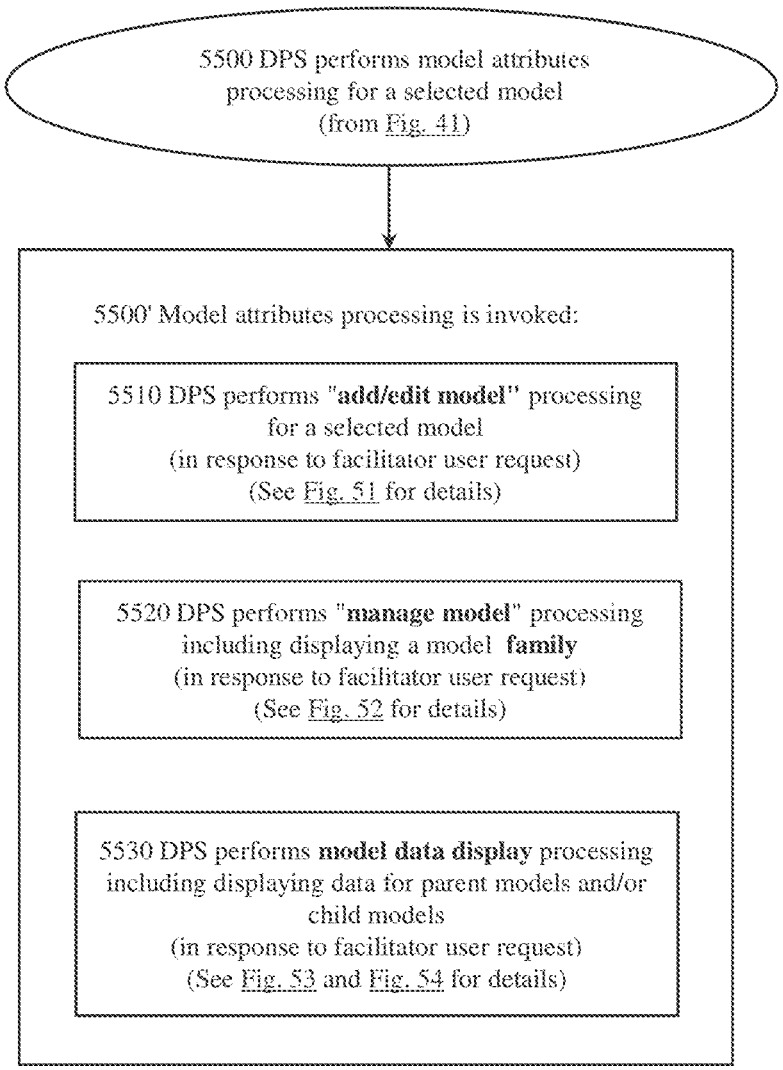
FIG. 50 is a flowchart showing further details of the system performs model attributes processing for a selected model(s) step 5500 of FIG. 41, in accordance with at least one embodiment of the disclosure.

FIG. 50 is a flowchart showing further details of the system performs model attributes processing for a selected model(s) step 5500 of FIG. 41, in accordance with at least one embodiment of the disclosure. As shown in FIG. 50, the processing starts in step 5500 and passes to step 5500'. In step 5500', various model attributes processing may be invoked, as selected by the facilitator user.

Illustratively, in step 5510, the DPS may be invoked to perform add/edit processing for a selected model or models, in accordance with at least one embodiment of the disclosure. Further details are described below with reference to FIG. 51.

Illustratively, in step 5520 of FIG. 50, the DPS may be invoked to perform "manage model" processing including displaying a model family—in response to a facilitator user request. Further details of the display of such information and related content are described below with reference to the GUI of FIG. 52.

Illustratively, in step 5530 of FIG. 50, the DPS may be invoked to perform model data display processing including displaying data for parent models and/or child models—in response to a facilitator user request. Further details of such processing are described below with reference to the GUI of FIG. 53 and the GUI of FIG. 54.

Figure 51:
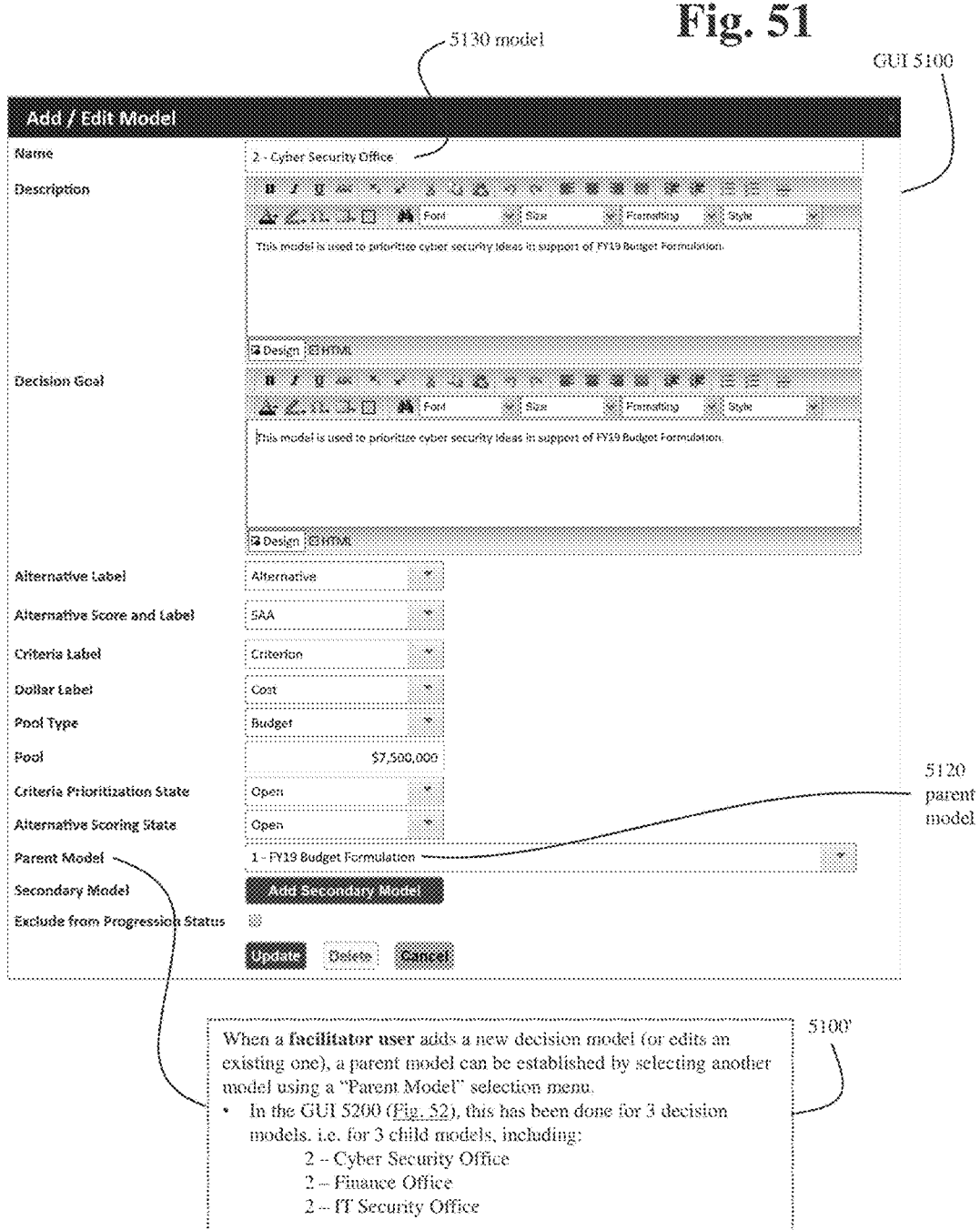
FIG. 51 is a diagram showing a GUI 4800, in accordance with at least one embodiment of the disclosure.

As referenced above, FIG. 51 is a diagram showing a GUI 5100, in accordance with at least one embodiment of the disclosure. The GUI 5100 illustrates add/edit model processing of the disclosure. The example of FIG. 51 relates to a model 5130 entitled Cyber Security Office. As shown, the GUI 5100 may include a variety of information relating to such model.

As reflected at 5100', when a facilitator user adds a new decision model, or edits an existing decision model, a parent model can be established by selecting another model using a "parent model" selection menu. In the example of FIG. 51, a parent model 5120 has been selected to be the parent model to the child model cyber security office, illustratively. In this example, the parent model is FY19 Budget Formulation.

It is appreciated that a particular parent model may be associated with multiple child models. On the other hand, a particular child model may be associated with multiple parent models. Different parent models may be associated with different alternatives in a particular child model, for example. With further reference to the GUI 5100 of FIG. 51 and the GUI 5200 of FIG. 52, three child models 5231, 5232, 5233 have been associated with the parent model, FY19 Budget Formulation 5220.

As referenced above, in step 5520 of FIG. 50, the DPS may be invoked to perform "manage model" processing including displaying a model family—in response to a facilitator user request. Further details of the display of such information and related content are described below with reference to the GUI of FIG. 52. Accordingly, FIG. 52 is a diagram showing a GUI 5200, in accordance with at least one embodiment of the disclosure.

Figure 52:
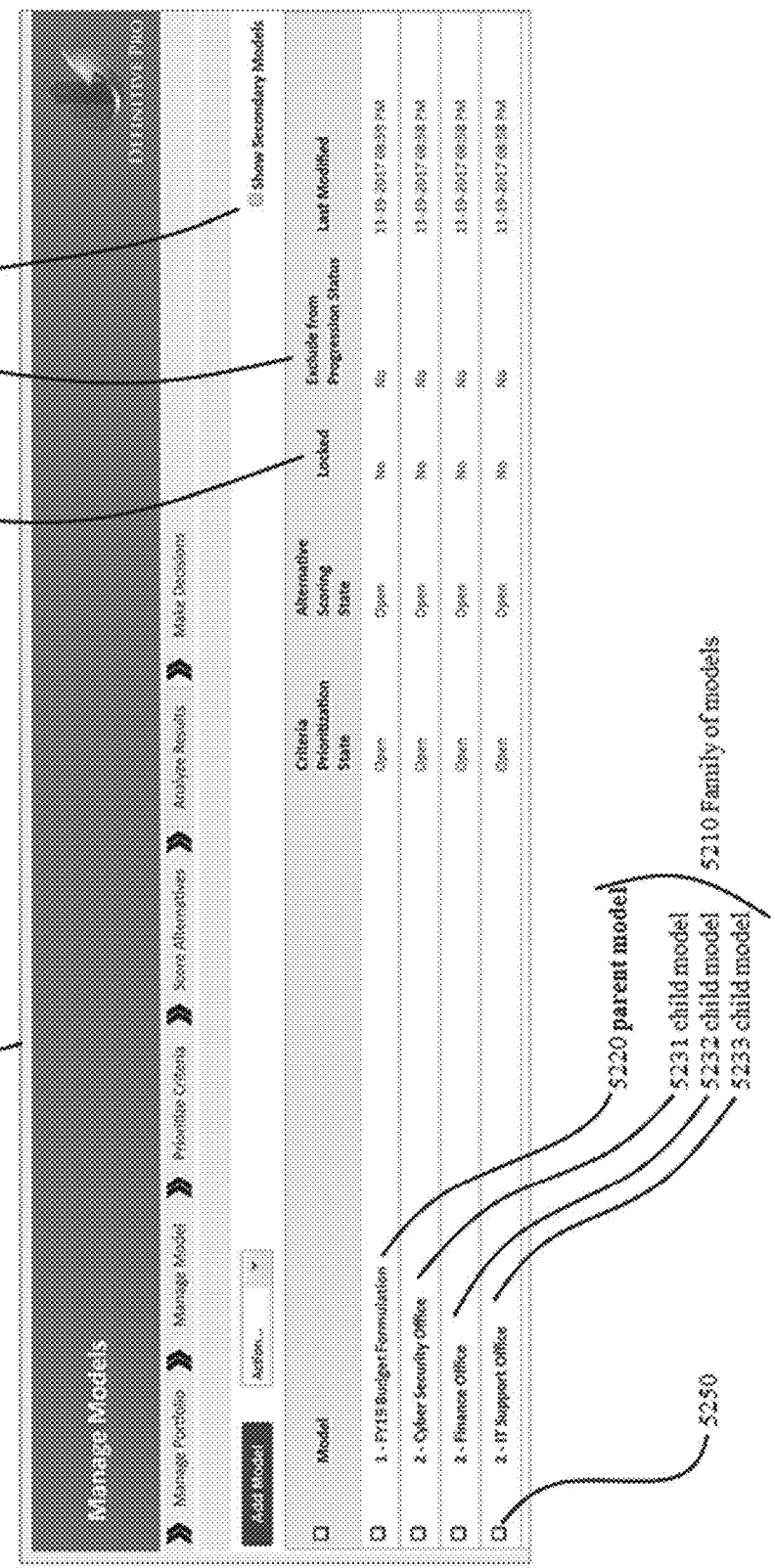
FIG. 52 is a diagram showing a GUI 4900, in accordance with at least one embodiment of the disclosure.

With reference to FIG. 52, the GUI 5200 is directed to "manage model" processing and displays various information regarding what might be characterized as a family of models 5210. In this illustrative example, the family of models includes parent model 5220, child model 5231, child model 5232, and child model 5233. Further details of the interrelated processing of the parent model and the child models are described below with reference to FIG. 53 and FIG. 54.

As shown in FIG. 52, the GUI 5200 includes selection boxes 5250. The selection boxes 5250 are provided to check one or more models and processing may be provided to use "action" drop-down menus, for example, to perform a desired action on the one or more models. The possible actions may be Copy, Delete, Lock, Review Log, and Unlock, for example, in accordance with at least one embodiment of the disclosure.

With further reference to FIG. 52, the GUI 5200 may include "Locked" column or option 5251. In accordance with at least one embodiment of the disclosure models that are locked can't be edited, updated, or deleted. The GUI 5200 may also include "Exclude from Progression Status" column or option 5252. This option may be used to selectively exclude one or more models from system analysis and statistics, e.g. such as might be used to enforce a quota. For example, this functionality might be used when a facilitator user wants to make a copy of an existing model for backup purposes.

With further reference to FIG. 52, the GUI 5200 may include "Show Secondary Models" option 5253. This option is associated with associating a further model. By adding a further or secondary model, the facilitator user can score the same set of alternatives against a second set of criteria (e.g., risk) to produce a richer analysis. Checking the box will display associated secondary models. In accordance with at least one embodiment of the disclosure, a model can have or be associated with only one secondary model.

Figure 53:
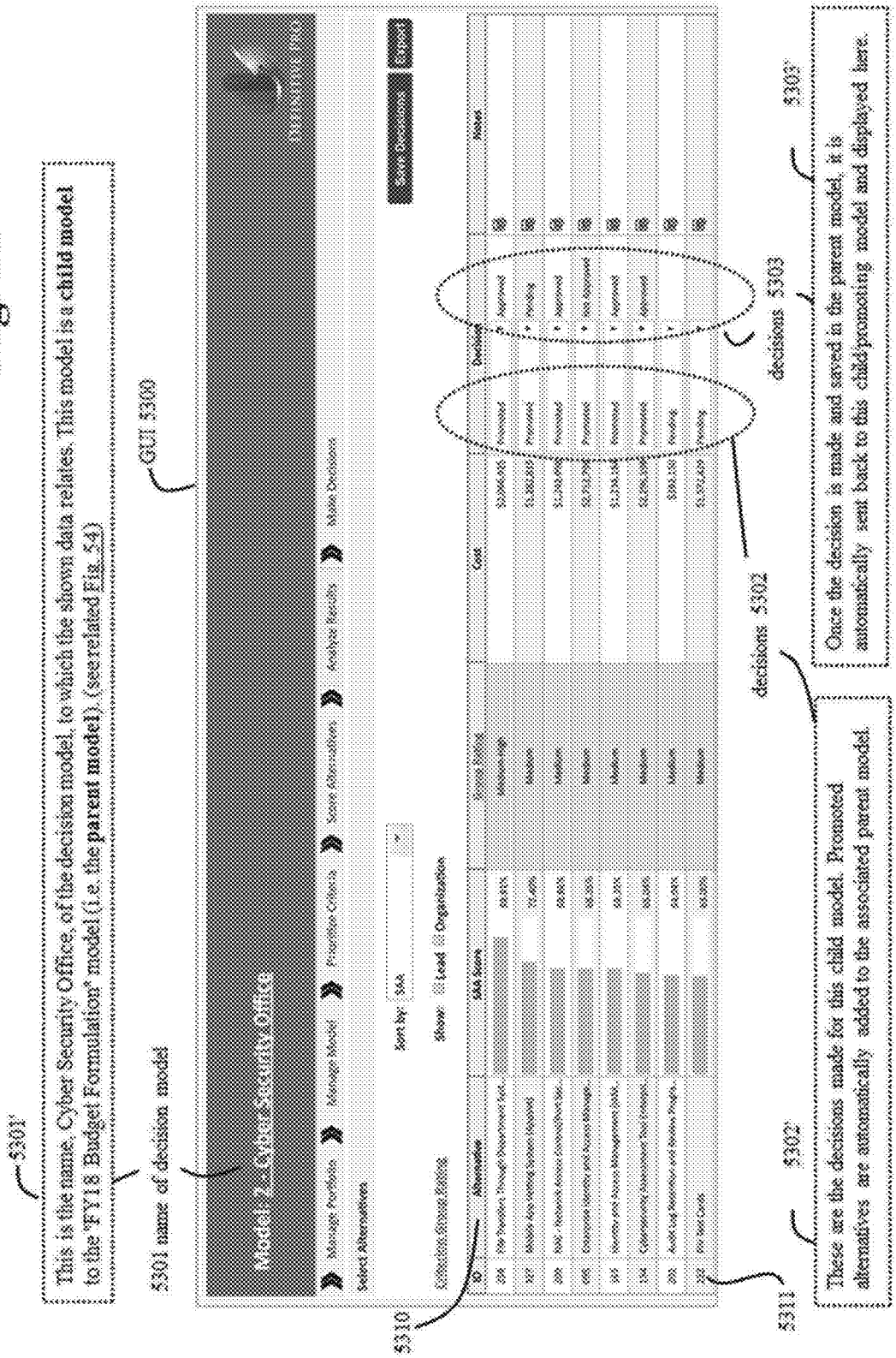
FIG. 53 is a diagram showing a further GUI 5000 showing details of a "child" model, in accordance with at least one embodiment of the disclosure.

As referenced above, FIG. 53 is a diagram showing a further GUI 5300 showing details of a "child" model, in accordance with at least one embodiment of the disclosure. The GUI 5300 includes the name of the decision model 5301. As reflected at 5301', Cyber Security Office is the name of the decision model, to which the shown data relates. The model Cyber Security Office is a child model to the FY19 Budget Formulation model, in this example. Accordingly, the FY19 Budget Formulation model is the parent model in this example.

As is shown in FIG. 53, the GUI 5300 includes a plurality of decisions 5302. As reflected at 5302', the decisions 5302 are the decisions made for this particular child model. More specifically, the decisions 5302 are respective decisions made for each alternative 5310 in the particular decision model 5301. Each alternative in the decision model 5301 may be associated with an ID 5311. As reflected at 5302', promoted alternatives are automatically added to the associated parent model.

Once an alternative is promoted to a parent model, that alternative is processed in the parent model, in accordance with at least one embodiment of the disclosure. In particular, such processing in the parent model may result in the particular alternative being approved or not approved, as reflected in FIG. 53. Prior to approval or disapproval, as shown by the decision indicia 5303, an alternative may be reflected as pending.

As shown at 5303' in FIG. 53, once a decision regarding a particular alternative is made in the parent and saved in the parent model, that decision may, in accordance with at least one embodiment of the disclosure, the automatically sent back to the child model. The decisions 5303 of FIG. 53 show such disposition (as rendered in the parent model) being sent back to the child model.

Figure 54:
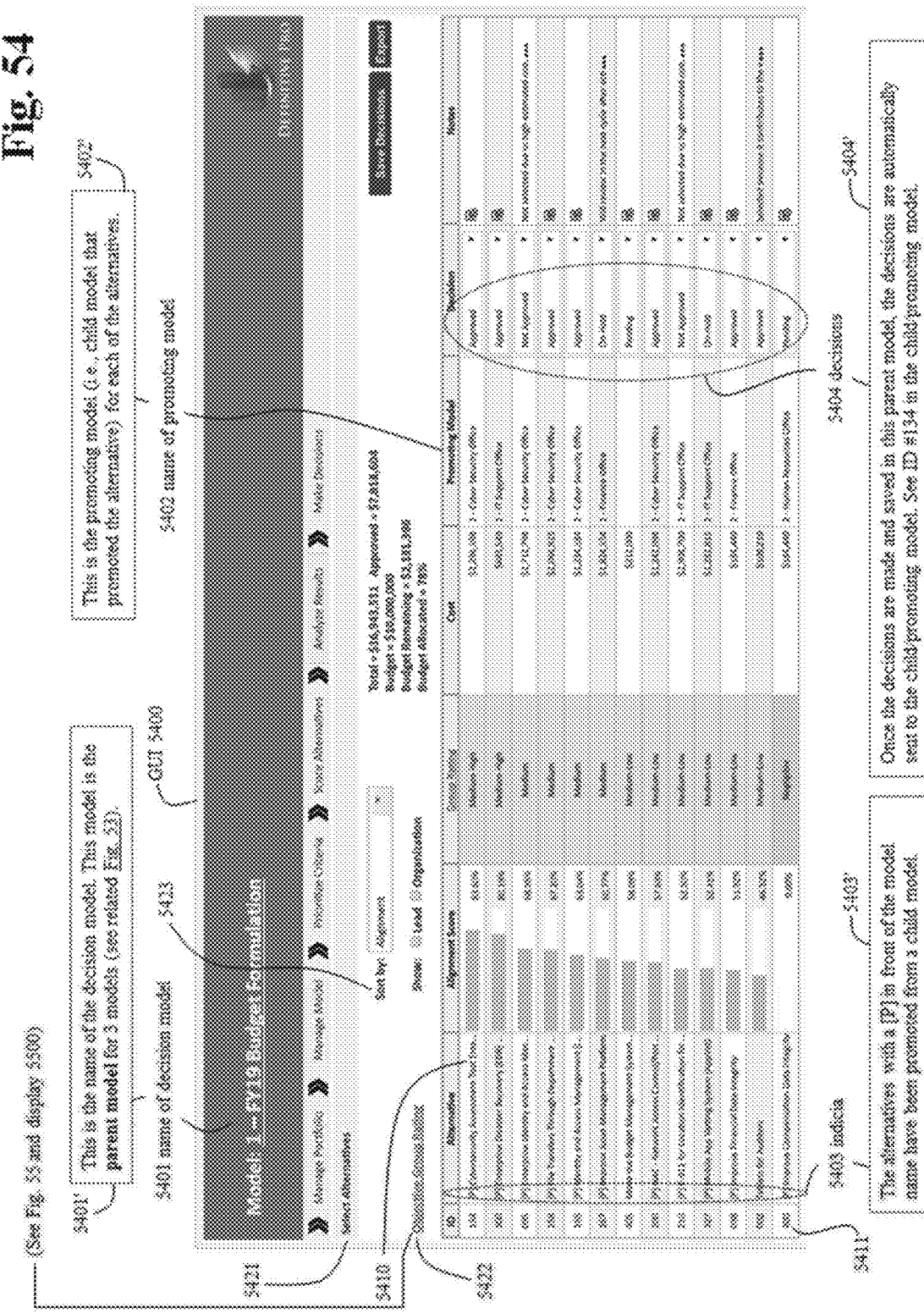
FIG. 54 is a diagram showing a GUI 5100 showing details of a "parent" model 5101, in accordance with at least one embodiment of the disclosure.

As described above, FIG. 53 is a GUI showing details of an illustrative child model. On the other hand, FIG. 54 is a diagram showing a GUI 5400 of a parent model 5401, in accordance with at least one embodiment of the disclosure. As reflected at 5401', the model 5401 is the parent model for three models, in this example. Various details of the decision model 5401 are shown in FIG. 54, including a listing of alternatives 5410 that are associated with the decision model 5401. Each alternative may be associated with an ID 5411 as shown in FIG. 54.

The GUI 5400 also includes a listing that includes the name of 5402 of the various promoting models that are associated with the parent model 5401. That is, as reflected at 5402', the GUI 5400 includes a listing of promoting models for each of the alternatives that have been promoted from a child model. Not all the alternatives shown in the GUI 5400 are associated with a child model. In other words, not all of the alternatives shown in the GUI 5400 have been promoted from a child model. Illustratively, the alternative identified by the ID 405 has not been promoted from a child model in this example. Relatedly, the GUI 5400 may include indicia 5403 that reflects whether a particular alternative has or has not been promoted from a child model. In this example, the alternatives with a [P] in front of the model name have been promoted from a child model.

As shown in FIG. 54 and reflected at 5404', once a decision regarding a particular alternative is made in the parent model and saved in the parent model, each decision may be automatically sent back to the child/promoting model. For example, as shown in FIG. 54, the alternative with ID 134 has been approved in the parent model 5401. As a result, this decision (based on the processing and the parent model) is sent back to the child model. As a result, FIG. 53 shows that alternative 134 has been approved.

The GUIs of FIG. 53 and FIG. 54 show various data associated with a child model and a parent model, respectively. It is appreciated that various other data may also be included as may be desired.

With further reference to FIG. 54, the GUI 5400 includes a "Select Alternatives" option 5421. This indicia is a screen-name. In accordance with at least one embodiment of the disclosure, every screen may be provided with a name in the upper-left corner that corresponds to the menu/sub-menu item, for example.

With further reference to FIG. 54, the GUI 5400 includes an "Objective-Group Rating" link or option 5422. Such option may be provided to provide relationship data between mathematical scores and conversion of such (mathematical scores) into a group rating. In particular, link 5422 provides a table 5500 (as shown in FIG. 55) to show how mathematical scores are converted into a group rating for scoring an alternative against a criteria (in this case an objective). In particular, FIG. 55 is a table 5500 showing association or mapping between "mean score" windows or ranges and a "group rating" in accordance with at least one embodiment of the disclosure.

With further reference to FIG. 54, the GUI 5400 further includes a "sort by" selection menu option 5423. Such option 5423 provides functionality such that the facilitator user can sort a list of alternatives, as presented on the GUI 5400, by any of various provided column headers, i.e. by selecting the desired sort option from the drop-down list. Sort options may be provided as desired.

Various aspects of the disclosure will now be described.

According to the present disclosure, an apparatus is provided to interface with users to perform group assessment processing and display of results in conjunction with the selection of items, the apparatus in the form of a tangibly embodied computer processor, the computer processor implementing instructions on a non-transitory computer medium disposed in a database, the database in communication with the computer processor, the apparatus comprising: a communication portion that provides communication between the computer processor and electronic user devices; the database; and the computer processor, the computer processor performing processing including: (A) storing an assessment architecture; (B) interfacing with a first facilitator user to populate the assessment architecture, such interfacing including: populating a decision goal parameter of the architecture, populating a plurality of decision criteria associated with the decision goal parameter, and populating a plurality of decision weight parameters; (C) generating, based on the decision criteria, a plurality of decision criteria pairs, and each decision criteria pair including at least two of the decision criteria; (D) interfacing, respectively, with a plurality of participant users, to fulfill the assessment architecture for each decision criteria pair, such interfacing including: (a) outputting a decision criteria pair, in conjunction with the decision goal parameter, (b) inputting a selection of a selected decision criteria, of the output decision criteria pair, (c) inputting, for the selection, a decision weight, and (d) associating the decision weight with the particular selection; (E) saving the selection, along with the associated decision weight, as discrete judgment data, and each discrete judgment data, obtained from the plurality of participant users, being collectively aggregated to constitute response aggregated data; and (F) interfacing with a first case observing user to output the response aggregated data, such interfacing including: displaying, for the first case observing user, the response aggregated data including a collection of the selections, of the selected decision criteria, along with the weight associated with such selected decision criteria.

According to the present disclosure, each decision criteria pair may include only two decision criteria.

According to the present disclosure, the response aggregated data may be in the form of a response graph.

According to the present disclosure, the response aggregated data may be in the form of a response grid.

According to the present disclosure, the computer processor may perform further processing including: further interfacing, respectively with the plurality of participant users, including: (a) presenting respectively each of a plurality of criteria-alternatives, for each decision criteria, along with a plurality of alternative scoring ratings (ASRs); (b) inputting a selected ASR, of the plurality of ASRs, in conjunction with each respective presenting of a corresponding criteria-alternative, and (c) saving the selected ASR in association with the corresponding criteria-alternative and decision criteria, as discrete alternative judgment data, and each, of such discrete alternative judgment data obtained from the plurality of participant users, being collectively aggregated to constitute alternative response aggregated data.

According to the present disclosure, the computer processor may perform further processing including: interfacing with the first case observing user to output the alternative response aggregated data.

According to the present disclosure, the interfacing with the first case observing user, to output the alternative response aggregated data, may include: displaying, for the first case observing user, the alternative response aggregated data including a collection of the selected ASRs, with corresponding criteria-alternative and decision criteria.

According to the present disclosure, each of the plurality of ASR ratings may be associated with natural language content.

According to the present disclosure, each of the natural language content may be associated with a numerical value.

According to the present disclosure, alternative response aggregated data may be in the form of a response graph.

According to the present disclosure, the alternative response aggregated data may be in the form of a response grid.

According to the present disclosure, the computer processor displaying, for the first case observing user, the response aggregated data may include displaying the decision goal parameter.

According to the present disclosure, the communication portion may provide communication, between the computer processor and electronic user devices, over a network.

According to the present disclosure, the electronic user devices may each utilize a web browser that interfaces with the computer processor over the network, and the network is the Internet.

According to the present disclosure, each decision weight may be associated with natural language content.

According to the present disclosure, each of the natural language content may be associated with a numerical value.

According to the present disclosure, the displaying the response aggregated data including a collection of the selections, of the selected decision criteria, along with the weight associated with such selected decision criteria, may include, respectively, associating weights with the participant users in the displaying.

According to the present disclosure, an apparatus is provided to interface with users to perform group assessment processing and display of results in conjunction with selection of items, the apparatus in the form of a tangibly embodied computer processor, the computer processor implementing instructions on a non-transitory computer medium disposed in a database, the database in communication with the computer processor, the apparatus comprising: a communication portion that provides communication between the computer processor and electronic user devices; the database; and the computer processor, the computer processor performing processing including: (A) storing an assessment architecture associated with the group assessment processing; (B) interfacing with a facilitator user to input team formation data for the assessment architecture, the team formation data dictating selection of a plurality of candidate participants for the assessment architecture; (C) generating a respective communication for each of the plurality of candidate participants to invite each candidate participant to participate in the assessment architecture, and the plurality of candidate participants including a first candidate participant; (D) sending the respective communication to each of the plurality of candidate participants, including the first candidate participant, to invite each candidate participant to participate in the assessment model; and (E) engaging with each of the plurality of candidate participants, including the first candidate participant, over an electronic network to populate the assessment architecture.

According to the present disclosure, the computer processor generating the respective communication, for each of the plurality of candidate participants, including generating a session code; and the sending the respective communication, to each of the plurality of candidate participants, may include sending the session code.

According to the present disclosure, the computer processor may perform decisioning to determine that the first candidate participant, of the plurality of candidate participants, is provided access to the assessment architecture.

According to the present disclosure, the assessment architecture may be constituted by a decision model.

According to the present disclosure, the team formation data may include at least one selected from the group consisting of duration attributes, communication channel selection attributes, participant composition attributes, and requisite credential attributes.

According to the present disclosure, the team formation data may include participant composition attributes that identifies a group, and the sending the respective communication, to each of the plurality of candidate participants, may include sending an invitation to each candidate participant based on association with the group.

According to the present disclosure, the team formation data may include communication channel selection attributes that include data regarding (a) a first communication channel, and (b) a second communication channel; and the sending the communication to each of the plurality of candidate participants including sending a respective invitation, for the assessment architecture, over the first communication channel; and the computer processor engaging with each of the plurality of candidate participants, to populate the assessment architecture, performed over the second communication channel.

According to the present disclosure, the first communication channel may be constituted by an email channel and the second communication channel constituted by web browser engagement over the Internet.

According to the present disclosure, the computer processor may generate the respective communication including generating a first session code, the first session code for associating the first candidate participant with the assessment architecture.

According to the present disclosure, the sending the respective communication may include sending the first session code to the first candidate participant.

According to the present disclosure, the engaging with each of the plurality of candidate participants, to populate the assessment architecture, may include the computer processor engaging the first candidate participant using the first session code to associate the first candidate participant with the assessment architecture.

According to the present disclosure, the engaging with each of the plurality of candidate participants, to populate the assessment architecture, may include the computer processor using the same first session code for the other plurality of candidate participants, such that the same session code is used for all the plurality of candidate participants.

According to the present disclosure, the engaging with each of the plurality of candidate participants, to populate the assessment architecture, may include the computer processor using a respective different session codes for each of the other plurality of candidate participants.

According to the present disclosure, the computer processor performing further processing may include (A) interfacing with a first facilitator user to populate the assessment architecture, such interfacing including: populating a decision goal parameter of the architecture, populating a plurality of decision criteria associated with the decision goal parameter, and populating a plurality of decision weight parameters; (B) generating, based on the decision criteria, a plurality of decision criteria pairs, and each decision criteria pair including at least two of the decision criteria; (C) interfacing, respectively with a plurality of participant users, to fulfill the assessment architecture for each decision criteria pair, such interfacing including: (a) outputting a decision criteria pair, in conjunction with the decision goal parameter, (b) inputting, a selection of a selected decision criteria, of the output decision criteria pair, (c) inputting, for the selection, a decision weight, and (d) associating the decision weight with the particular selection; (D) saving the selection, along with the associated decision weight, as discrete judgement data, and each discrete judgement data, obtained from the plurality of participant users, being collectively aggregated to constitute response aggregated data.

According to the present disclosure, the processor: interfacing with a first case observing user to output the response aggregated data, such interfacing including: displaying, for the first case observing user, the response aggregated data including a collection of the selected decision criteria, along with the weight associated with such selected decision criteria.

According to the present disclosure, the decision criteria pair may consist of two decision criteria.

According to the present disclosure, the response aggregated data may be in the form of a response graph.

According to the present disclosure, the computer processor performing further processing may include: further interfacing, respectively with the plurality of participant users, including: (A) presenting respectively each of a plurality of criteria-alternatives, for each decision criteria, along with a plurality of alternative scoring ratings (ASRs); (B) inputting a selected ASR, of the plurality of ASRs, in conjunction with each respective presenting of a corresponding criteria-alternative, and (C) saving the selected ASR in association with the corresponding criteria-alternative and decision criteria, as discrete alternative judgement data, and each, of such discrete alternative judgement data obtained from the plurality of participant users, being collectively aggregated to constitute alternative response aggregated data.

According to the present disclosure, the engaging with the first candidate participant may include inputting a request, from the first participant user, to engage the assessment architecture.

According to the present disclosure, an apparatus is provided to interface with users to perform group assessment processing and display of results in conjunction with selection of items, the apparatus in the form of a tangibly embodied computer processor, the computer processor implementing instructions on a non-transitory computer medium disposed in a database, the database in communication with the computer processor, the apparatus comprising: a communication portion that provides communication between the computer processor and electronic user devices; the database; and the computer processor, the computer processor performing processing including: (A) storing first assessment architecture data associated with a first assessment architecture for group assessment processing; (B) storing second assessment architecture data associated with a second assessment architecture for group assessment processing; (C) interfacing with a user, to input linking data related to linking the first assessment architecture with the second assessment architecture; (D) based on the linking data, linking the first assessment architecture with the second assessment architecture; (E) identifying a data content change in either the first assessment architecture or the second assessment architecture; (F) mapping the data content change to an action item; and (G) performing the action item in the other of the first assessment architecture or the second assessment architecture.

According to the present disclosure, the interfacing with the user, to input linking data related to linking the first assessment architecture with the second assessment architecture, may include: (a) providing the user with a listing of the second assessment architecture; (b) retrieving, in response to a user selection, a plurality of candidate selected architectures, one of which is the first assessment architecture; and (c) inputting a selection from the user to select the first assessment architecture, as a selected architecture, to link to the second assessment architecture.

According to the present disclosure, the first assessment architecture may be a parent model to the second assessment architecture, and the second assessment architecture may be a child model to the first assessment architecture.

According to the present disclosure, the data content change may relate to a first alternative being processed in the second assessment architecture.

According to the present disclosure, the data content change may relate to a first alternative being approved in the second assessment architecture.

According to the present disclosure, the action item may include promoting the first alternative, which was approved, to the first assessment architecture.

According to the present disclosure, the action item may further include adding the first alternative to a list of alternatives in the first assessment architecture, which is the parent model.

According to the present disclosure, a further data content change may relate to the first alternative being approved in the first assessment architecture.

According to the present disclosure, a further action item may include outputting data to the second assessment architecture, indicating that the first alternative was approved in the first assessment architecture.

According to the present disclosure, the data content change may relate to an alternative being approved in the first assessment architecture.

According to the present disclosure, the action item may include outputting data to the second assessment architecture, indicating that the alternative was approved in the first assessment architecture.

According to the present disclosure, the content change may relate to the second assessment architecture experiencing a change, and the action item includes the apparatus outputting data, representing the second assessment architecture experiencing the change, to the first assessment architecture.

According to the present disclosure, the second assessment architecture experiencing a change may be constituted by termination of the second assessment architecture.

According to the present disclosure, the first assessment architecture may be a parent model to the second assessment architecture, and the second assessment architecture may be a child model to the first assessment architecture.

According to the present disclosure, the first assessment architecture may be a child model to the second assessment architecture, and the second assessment architecture may be a parent model to the first assessment architecture.

According to the present disclosure, the data content change may relate to a first alternative being processed in the second assessment architecture; and the first alternative being processed in the second assessment architecture may be constituted by scoring the first alternative in the second assessment architecture.

Hereinafter, further aspects of the disclosure will be described.

As used herein, any term in the singular may be interpreted to be in the plural, and alternatively, any term in the plural may be interpreted to be in the singular.

It is appreciated that a feature of one embodiment of the disclosure as described herein may be used in conjunction with features of one or more other embodiments as may be desired.

Hereinafter, further aspects of implementation of the systems and methods of the disclosure will be described.

As described herein, at least some embodiments of the system of the disclosure and various processes, of embodiments, are described as being performed by one or more computer processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the disclosure on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the disclosure may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the disclosure. Rather, any number of different programming languages may be utilized as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the disclosure may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be characterized as a user. Further, it is contemplated that a user interface utilized in the system and method of the disclosure may interact partially with another processing machine or processing machines, while also interacting partially with a human user.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, process step, region, layer or section from another region, layer or section. Thus, a first element, component, process step, region, layer or section could be termed a second element, component, process step, region, layer or section without departing from the teachings of the present disclosure.

Spatially and organizationally relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially and organizationally relative terms are intended to encompass different orientations of or organizational aspects of components in use or in operation, in addition to the orientation or particular organization depicted in the drawing figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, process steps, operations, elements, and/or components, but do not preclude the presence or addition of one or more other features, integers, process steps, operations, elements, components, and/or groups thereof.

Embodiments of the disclosure are described herein with reference to diagrams, flowcharts and/or other illustrations, for example, that are schematic illustrations of idealized embodiments (and intermediate components) of the disclosure. As such, variations from the illustrations are to be expected. Thus, embodiments of the disclosure should not be construed as limited to the particular organizational depiction of components and/or processing illustrated herein but are to include deviations in organization of components and/or processing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

While the subject matter has been described in detail with reference to exemplary embodiments thereof, it will be apparent to one skilled in the art that various changes can be made, and equivalents employed, without departing from the scope of the disclosure.

All references and/or documents referenced herein are hereby incorporated by reference in their entirety.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. An apparatus to interface with users to perform group assessment processing and display of results in conjunction with selection of items, the apparatus in the form of a tangibly embodied computer processor, the computer processor implementing instructions on a non-transitory computer medium disposed in a database, the database in communication with the computer processor, the apparatus comprising:

a communication portion that provides communication between the computer processor and electronic user devices;

the database; and the computer processor, the computer processor performing processing including:

storing first assessment architecture data, in the form of data records that include data representing alternatives, associated with a first assessment architecture for group assessment processing;

storing second assessment architecture data, in the form of further data records that include data representing alternatives, associated with a second assessment architecture for group assessment processing;

interfacing with a user, to input linking data related to linking the first assessment architecture with the second assessment architecture;

based on the linking data, linking the first assessment architecture with the second assessment architecture;

identifying a data content change in either the first assessment architecture or the second assessment architecture;

mapping, by accessing data in the database, the data content change to an action item; and if the data content change that relates to a first alternative of at least being processed or being approved was identified in the first assessment architecture, then perform the action item in the second assessment architecture, such that the performing processing including changes in the first assessment architecture are automatically passed on to the second assessment architecture; or if the data content change that relates to a second alternative of at least being processed or being approved was identified in the second assessment architecture, then perform the action item in the first assessment architecture, such that the performing processing including changes in the second assessment architecture are automatically passed on to the first assessment architecture; and the first assessment architecture being a parent model to the second assessment architecture, and the second assessment architecture being a child model to the first assessment architecture.

2. The apparatus of claim 1, the interfacing with the user, to input linking data related to linking the first assessment architecture with the second assessment architecture, including:

providing the user with a list of items associated with the second assessment architecture, and each of the items in the list of items being selectable, by the user, through the interfacing with the user;

retrieving, in response to a user selection of the selectable items, a plurality of candidate selected architectures, one of which is the first assessment architecture; and inputting a selection from the user to select the first assessment architecture, as a selected architecture, to link to the second assessment architecture.

3. The apparatus of claim 1, the data content change relates to a first alternative being processed in the second assessment architecture.

4. The apparatus of claim 1, the data content change relates to a first alternative being approved in the second assessment architecture.

5. The apparatus of claim 4, the action item includes promoting the first alternative, which was approved, to the first assessment architecture.

6. The apparatus of claim 4, the action item further includes adding the first alternative to a list of alternatives in the first assessment architecture, which is the parent model.

7. The apparatus of claim 6, wherein a further data content change relates to the first alternative being approved in the first assessment architecture.

8. The apparatus of claim 7, a further action item includes outputting data to the second assessment architecture, indicating that the first alternative was approved in the first assessment architecture.

9. The apparatus of claim 1, the data content change relates to an alternative being approved in the first assessment architecture.

10. The apparatus of claim 9, the action item includes outputting data to the second assessment architecture, indicating that the alternative was approved in the first assessment architecture.

11. The apparatus of claim 2, the data content change relates to the second assessment architecture experiencing a change, and the action item includes outputting data, representing the second assessment architecture experiencing the change, to the first assessment architecture.

12. The apparatus of claim 11, the second assessment architecture experiencing the change is constituted by termination of the second assessment architecture.

13. The apparatus of claim 1, the data content change relates to a first alternative being processed in the second assessment architecture; and the first alternative being processed in the second assessment architecture is constituted by scoring the first alternative in the second assessment architecture.

* * * * *